Feb. 22, 1966 R. J. MALONE ETAL 3,237,187

CODE CONVERTER

Filed Feb. 12, 1962

35 Sheets-Sheet 1

INVENTORS
RICHARD J. MALONE
WILLIAM J. OSTERMAN
BEN A. HARRIS

BY John A. Harvey
ATTORNEY

| | | 1 | 2 | 3 | 4 | 5 | 6 | 7 | 8 |
|---|---|---|---|---|---|---|---|---|---|
| | | EXIT 1 | EXIT 2 | EXIT 3 | CONTROL EXIT | EXIT 1 | EXIT 2 | EXIT 3 | CONTROL EXIT |
| CODE EXITS | A | BLANK | BLANK | BLANK | BLANK | 13 | 13 | 13 | 13 |
| | B | 1 | 1 | 1 | 1 | 14 | 14 | 14 | 14 |
| | C | 2 | 2 | 2 | 2 | 15 | 15 | 15 | 15 |
| | D | 3 | 3 | 3 | 3 | 16 | 16 | 16 | 16 |
| | E | 4 | 4 | 4 | 4 | 23 | 23 | 23 | 23 |
| | F | 5 | 5 | 5 | 5 | 24 | 24 | 24 | 24 |
| | G | 6 | 6 | 6 | 6 | 25 | 25 | 25 | 25 |
| | H | 12 | 12 | 12 | 12 | 26 | 26 | 26 | 26 |
| CODE AND CONTROL ENTRIES | I | BLANK | 4 | 6 | NON PUNCH | BLANK | 4 | 6 | NON PUNCH |
| | J | 1 | 5 | 7 | AUTO L.F. | 1 | 5 | 7 | AUTO L.F. |
| | K | 2 | 45 | 67 | STOP | 2 | 45 | 67 | STOP |
| | L | 3 | | 8 | SHIFT TO LTRS | 3 | | 8 | SHIFT TO LTRS |
| | M | 12 | | | SHIFT TO FIGS | 12 | | | SHIFT TO FIGS |
| | N | 13 | | | LTRS PRECED | 13 | | | LTRS PRECED |
| | O | 23 | | GAP ENTRY | FIGS PRECED | 23 | | GAP ENTRY | FIGS PRECED |
| | P | 123 | | GAP EXIT | NO PRECED | 123 | | | NO PRECED |
| | Q | | | | | | 5 CHANNEL | 6, 7, CHANNEL | ALL CODES |
| | R | | | | FIGS C. PAR. EXIT | | | INPUT | |
| | S | | POWER SOURCE | | | | | | |
| SELECTORS 8 TH BIT | T | T | T | T | T | T | T | T | T |
| | U | N | N | N | N | N | N | N | N |
| | V | C | C | C | C | C | C | C | C |
| SELECTORS 123 BITS | W | ENT BLANK | ENT 1 | ENT 2 | ENT 3 | ENT 1 | ENT 1 | ENT 2 | ENT 1 |
| | X | EXIT | EXIT | EXIT | EXIT | EXIT 2 | EXIT 3 | EXIT 3 | EXIT 2 3 |
| SELECTORS 456 BITS | Y | ENT BLANK | ENT 4 | ENT 5 | ENT 6 | ENT 4 | ENT 4 | ENT 5 | ENT 4 |
| | Z | EXIT | EXIT | EXIT | EXIT | EXIT 5 | EXIT 6 | EXIT 6 | EXIT 5 6 |
| | | 1 | 2 | 3 | 4 | 5 | 6 | 7 | 8 |

Fig. 1a

| | 9 EXIT 1 | 10 EXIT 2 | 11 EXIT 3 | 12 CONTROL EXIT | 13 EXIT 1 | 14 EXIT 2 | 15 EXIT 3 | 16 CONTROL EXIT | |
|---|---|---|---|---|---|---|---|---|---|
| A | 34 | 34 | 34 | 34 | 125 | 125 | 125 | 125 | |
| B | 35 | 35 | 35 | 35 | 126 | 126 | 126 | 126 | |
| C | 36 | 36 | 36 | 36 | 134 | 134 | 134 | 134 | |
| D | 45 | 45 | 45 | 45 | 135 | 135 | 135 | 135 | |
| E | 46 | 46 | 46 | 46 | 136 | 136 | 136 | 136 | |
| F | 56 | 56 | 56 | 56 | 145 | 145 | 145 | 145 | |
| G | 123 | 123 | 123 | 123 | 146 | 146 | 146 | 146 | |
| H | 124 | 124 | 124 | 124 | 156 | 156 | 156 | 156 | |
| I | BLANK | 4 | 6 | NON PUNCH | BLANK | 4 | 6 | NON PUNCH | |
| J | 1 | 5 | 7 | AUTO L.F. | 1 | 5 | 7 | AUTO L.F. | |
| K | 2 | 45 | 67 | STOP | 2 | 45 | 67 | STOP | |
| L | 3 | | 8 | SHIFT TO LTRS | 3 | | 8 | SHIFT TO LTRS | |
| M | 12 | | | SHIFT TO FIGS | 12 | | | SHIFT TO FIGS | |
| N | 13 | | | LTRS PRECED | 13 | | | LTRS PRECED | |
| O | 23 | | GAP ENTRY | FIGS PRECED | 23 | | GAP ENTRY | FIGS PRECED | |
| P | 123 | | | NO PRECED | 123 | | | NO PRECED | |
| Q | TAPE | FEED | EXITS | | PICK ENTRY | PICK EXIT | DROP ENTRY | DROP EXIT | SPECIAL SELECTOR 1 |
| R | | | | | | T | T | T | |
| S | | | | | | N | N | N | |
| T | | | | | | 1C | 2C | 3C | |
| U | | | | | | | | | |
| V | | | | | | | | | |
| W | | | | | | | | | |
| X | TAPE SKIP | | | | | | | | |
| Y | SKIP RESTORE | | | | | | | | |
| Z | | | | | | | | | |
| | 9 | 10 | 11 | 12 | 13 | 14 | 15 | 16 | |

Fig. 1b

| | 17 | 18 | 19 | 20 | 21 | 22 | 23 | 24 |
|---|---|---|---|---|---|---|---|---|
| | EXIT 1 | EXIT 2 | EXIT 3 | CONTROL EXIT | EXIT 1 | EXIT 2 | EXIT 3 | CONTROL EXIT |
| A | 234 | 234 | 234 | 234 | 356 | 356 | 356 | 356 |
| B | 235 | 235 | 235 | 235 | 456 | 456 | 456 | 456 |
| C | 236 | 236 | 236 | 236 | 1234 | 1234 | 1234 | 1234 |
| D | 245 | 245 | 245 | 245 | 1235 | 1235 | 1235 | 1235 |
| E | 246 | 246 | 246 | 246 | 1236 | 1236 | 1236 | 1236 |
| F | 256 | 256 | 256 | 256 | 1245 | 1245 | 1245 | 1245 |
| G | 345 | 345 | 345 | 345 | 1246 | 1246 | 1246 | 1246 |
| H | 346 | 346 | 346 | 346 | 1256 | 1256 | 1256 | 1256 |
| I | BLANK | 4 | 6 | NON PUNCH | BLANK | 4 | 6 | NON PUNCH |
| J | 1 | 5 | 7 | AUTO L.F. | 1 | 5 | 7 | AUTO L.F. |
| K | 2 | 45 | 67 | STOP | 2 | 45 | 67 | STOP |
| L | 3 | | 8 | SHIFT TO LTRS | 3 | | 8 | SHIFT TO LTRS |
| M | 12 | | | SHIFT TO FIGS | 12 | | | SHIFT TO FIGS |
| N | 13 | | | LTRS PRECED | 13 | | | LTRS PRECED |
| O | 23 | | GAP ENTRY | FIGS PRECED | 23 | | GAP ENTRY | FIGS PRECED |
| P | 123 | | | NO PRECED | 123 | | | NO PRECED |
| Q | IND | EPEND | ENT | | PICK ENTRY | PICK EXIT | DROP ENTRY | DROP EXIT |
| R | SE | LECTO | R | T | T | T | T | T |
| S | | | ADD TO | N | N | N | N | N |
| T | | | SEL 1 | 1C | 2C | 3C | 4C | 5C |
| U | | | | | | | | |
| V | | | | | | | | |
| W | | | | | | | | |
| X | | | | | | | | |
| Y | | | | | | | | |
| Z | | | | | | | | |
| | 17 | 18 | 19 | 20 | 21 | 22 | 23 | 24 |

SPECIAL SELECTOR 2

Fig. 1c

| | 25 | 26 | 27 | 28 | 29 | 30 | 31 | 32 |
|---|---|---|---|---|---|---|---|---|
| | EXIT 1 | EXIT 2 | EXIT 3 | CONTROL EXIT | EXIT 1 | EXIT 2 | EXIT 3 | CONTROL EXIT |
| A | 1345 | 1345 | 1345 | 1345 | 3456 | 3456 | 3456 | 3456 |
| B | 1346 | 1346 | 1346 | 1346 | 12345 | 12345 | 12345 | 12345 |
| C | 1356 | 1356 | 1356 | 1356 | 12346 | 12346 | 12346 | 12346 |
| D | 1456 | 1456 | 1456 | 1456 | 12356 | 12356 | 12356 | 12356 |
| E | 2345 | 2345 | 2345 | 2345 | 12456 | 12456 | 12456 | 12456 |
| F | 2346 | 2346 | 2346 | 2346 | 13456 | 13456 | 13456 | 13456 |
| G | 2356 | 2356 | 2356 | 2356 | 23456 | 23456 | 23456 | 23456 |
| H | 2456 | 2456 | 2456 | 2456 | 123456 | 123456 | 123456 | 123456 |
| I | BLANK | 4 | 6 | NON PUNCH | BLANK | 4 | 6 | NON PUNCH |
| J | 1 | 5 | 7 | AUTO L.F. | 1 | 5 | 7 | AUTO L.F. |
| K | 2 | 45 | 67 | STOP | 2 | 45 | 67 | STOP |
| L | 3 | | 8 | SHIFT TO LTRS | 3 | | 8 | SHIFT TO LTRS |
| M | 12 | | | SHIFT TO FIGS | 12 | | | SHIFT TO FIGS |
| N | 13 | | | LTRS PRECED | 13 | | | LTRS PRECED |
| O | 23 | | GAP ENTRY | FIGS PRECED | 23 | | GAP ENTRY | FIGS PRECED |
| P | 123 | | | NO PRECED | 123 | | | NO PRECED |
| Q | IND | EPEND | ENT | | PICK ENTRY | PICK EXIT | DROP ENTRY | DROP EXIT |
| R | SE | LECTO | R | T | T | T | T | T |
| S | | | ADD TO | N | N | N | N | N |
| T | | | SEL 1 | 1C | 2C | 3C | 4C | 5C |
| U | | | | | | | | |
| V | | | | | | | | |
| W | | | | | | | | |
| X | | | | | | | | |
| Y | | | | | | | | |
| Z | | | | | | | | |
| | 25 | 26 | 27 | 28 | 29 | 30 | 31 | 32 |

SPECIAL SELECTOR 3

Fig. 1d

Feb. 22, 1966 R. J. MALONE ETAL 3,237,187

CODE CONVERTER

Filed Feb. 12, 1962

35 Sheets-Sheet 6

Feb. 22, 1966 R. J. MALONE ETAL 3,237,187

CODE CONVERTER

Filed Feb. 12, 1962

35 Sheets-Sheet 7

Feb. 22, 1966 R. J. MALONE ETAL 3,237,187

CODE CONVERTER

Filed Feb. 12, 1962 35 Sheets-Sheet 13

Feb. 22, 1966 R. J. MALONE ETAL 3,237,187

CODE CONVERTER

Filed Feb. 12, 1962

35 Sheets-Sheet 14

CODE CONVERTER

Filed Feb. 12, 1962 35 Sheets-Sheet 15

Feb. 22, 1966 R. J. MALONE ETAL 3,237,187

CODE CONVERTER

Filed Feb. 12, 1962 35 Sheets-Sheet 16

CODE CONVERTER

Filed Feb. 12, 1962 35 Sheets-Sheet 17

Feb. 22, 1966

R. J. MALONE ETAL 3,237,187

CODE CONVERTER

Filed Feb. 12, 1962

35 Sheets-Sheet 19

Feb. 22, 1966 R. J. MALONE ETAL 3,237,187

CODE CONVERTER

Filed Feb. 12, 1962 35 Sheets-Sheet 20

Feb. 22, 1966 R. J. MALONE ETAL 3,237,187

CODE CONVERTER

Filed Feb. 12, 1962

35 Sheets-Sheet 27

Feb. 22, 1966 R. J. MALONE ETAL 3,237,187

CODE CONVERTER

Filed Feb. 12, 1962

35 Sheets-Sheet 30

Feb. 22, 1966 R. J. MALONE ETAL 3,237,187

CODE CONVERTER

Filed Feb. 12, 1962

35 Sheets-Sheet 31

United States Patent Office 3,237,187
Patented Feb. 22, 1966

3,237,187

CODE CONVERTER

Richard J. Malone, Penfield, and William J. Osterman, Ben A. Harris, and Gilbert A. Denis, Rochester, N.Y., assignors, by mesne assignments, to Friden, Inc., San Leandro, Calif., a corporation of Delaware Filed Feb. 12, 1962, Ser. No. 172,634
32 Claims. (Cl. 340—347)

Figures 1, 2, 3, 4:
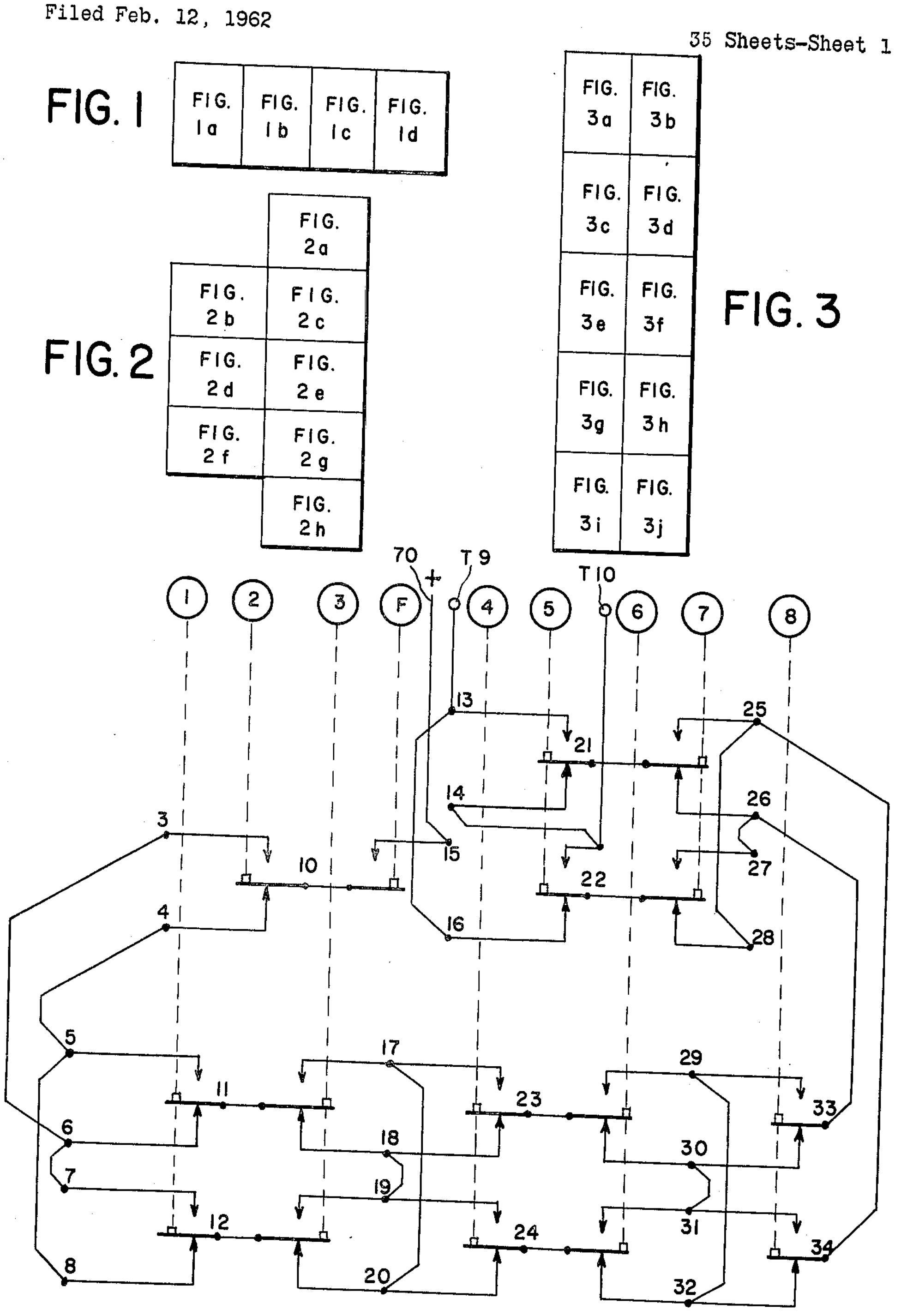

The present invention relates to code converters which receive successive permutation codes representative of coded information and which convert each such code to a corresponding code employing a different permutation code form. While the invention has utility in numerous and diverse applications, it has particular utility in deriving from a punched tape information punch recorded by use of any selected one of a number of available permutation codes and in converting the information to a new permutation code form and punch recording such newly coded information in another tape.

There are many present-day applications where information is recorded, for later use or reference, in a punched tape by use of an appropriate punch code conventionally having as few as five code bits (commonly called a five level or five channel code) and as many as eight code bits (an eight level or eight channel code). Where transmission of the recorded information to a remote point is anticipated, the recording code selected is usually one having the smallest suitable number of code bits. For example, one form of telecommunications system employs a five channel code for this purpose. Tape controlled business machines, on the other hand, usually are arranged to translate such a variety of alphanumeric and functional-control information that recording of this information may require a code form utilizing as high as an eight channel code.

When the information recorded in the punched tape is utilized, the tape is read by a tape reader which is arranged to read the same level of code as used in the recording of the information and each information-item code is properly interpreted by a code translator controlled by the tape reader. Permutation codes are not standardized as between tape machines of various manufacturers, so that tape machines of one manufacturer may not be capable of properly reading and interpreting a punched tape produced by a tape machine of another manufacturer even though the information code used has the same code level. Further, each type of machine of a line marketed by a given manufacturer usually will properly read and interpret only punched tapes using a recording code of given code level but not one where the recording code used has a lesser or greater code level.

To improve communication between tape machines of differing types and of various manufacture, and to minimize the need for independent manual fabrication of each tape recording according to the particular machine with which it is to be used, it would be desirable automatically to duplicate essential information from one tape recording to another while at the same time automatically converting any of several code forms which may have been employed for the first tape recording to a different code form of the same or different code level in the second recording. This, by way of example, would then permit essential information of a six to eight level tape to be recorded in a five level tape, and vice versa, for origination and ultimate utilization of information by business machines but with intervening transmission of the information to a remote point by telecommunications equipments.

It is an object of the invention to provide a new and improved code converter characterized by unusual flexibility and diversity of the nature and extent of code conversions which may be accomplished by it.

It is a further object of the invention to provide a novel code converter which automatically duplicates information from one punched tape recording to another with automatic code conversion between the recordings, and one exhibiting high accuracy, reliability, and efficiency of operation.

It is an additional object of the invention to provide an improved code converter which in operating automatically to duplicate information from one recording using one code format to another recording using a different code format will automatically halt operation to await manual supervisory action should a spurious or erroneous or non-assigned code appear in the first recording or should a condition be detected which would lead to an error in the second recording.

It is yet a further object of the invention to provide a code converter adapted to read a first coded-information tape recording and to reproduce therefrom a second code-conversion tape recording with skip-over omission from the recording of the second tape, and under skip control of information read from the first tape, of one or more selectable portions of the information read from the first tape.

Other objects and advantages of the invention will appear as the detailed description thereof proceeds in the light of the drawings forming a part of this application and in which:

FIGS. *1a–1d* arranged as in FIG. 1 illustrate the positioning on a control panel of exit and entry wiring hubs which are used in accomplishing desired code conversions in numerous and diverse applications of the converter;

FIG. 2 is a circuit diagram representing the electrical circuit arrangement of the present code converter;

FIGS. *3a–3j* arranged as in FIG. 3 show the electrical interconnections of the contacts of the code conversion relays used in the converter and the connections of these contacts to the code exit hubs of the control panel;

FIG. 4 shows electrical circuit interconnections of a parity contact system operated by the output punch unit of the converter;

FIGS. *5a–5d*, arranged in the same manner as FIGS. *1a–1d*, illustrate the wiring of the control panel in a typical application of the converter when used to convert an 8 channel code of an input tape to a 6 channel Graphotype code in an output tape;

FIGS. *6a–6d*, arranged in the same manner as FIGS. *1a–1d*, illustrate the wiring of the control panel in a further illustrative application of the converter as used to convert from an 8 channel code of an input tape to a 5 channel telecommunications code in an output tape; and FIGS. *7a–7d* arranged in the same manner as FIGS. *1a–1d*, illustrate the wiring of a control panel in a further representative application of the code converter when used to convert from a 5 channel telecommunications code of an input tape to an 8 channel code in an output tape.

GENERAL ORGANIZATION AND OPERATION

The punched tape code converter herein described is adapted to read information encoded in a punched tape using a given permutation code, and to produce an output punched tape recording the same information encoded by use of a different permutation code. The tape which is read to supply the encoded information is conveniently referred to hereinafter as the input tape, while the tape which is produced by operation of the converter is conveniently referred to as the output tape. Encoding of the information in the input and output tapes may, in the system hereinafter described, employ any five or six channel code, any seven channel code containing one redundant (parity) channel, or any eight channel code which contains one redundant channel and which uses the eighth channel to represent limited control functions such as the carriage return keylever function of a tape controlled typewriter. Thus, to use an example, the input tape may have information encoded by use of an eight level code such as that disclosed in the Blodgett et al. Patent No. 2,905,298 and this information may be converted to a five channel telecommunications code including the "letters" and "figures" special codes of the latter for encoding in the output tape.

The input tape reader includes plural electrical transfer contact assemblies, of which there is one assembly individual to each of the eight code channels that the tape reader is adapted to read. The input tape reader has the general construction and characteristic mode of operation disclosed and described in the Blodgett et al. Patent No. 2,905,298 or the Blodgett Patent No. 2,927,158, and includes eight code aperture sensing pins which sense the presence and absence of code apertures in each of the eight code channels of successively presented code-bit-aperture groups of the punched tape transported step-by-step through the reader. An aperture sensed in a given code channel of the tape causes the corresponding electrical contact assembly to transfer, and the absence of an aperture restrains the contact assembly in non-transferred position.

Those reader contact assemblies which correspond to code channels 1, 2 and 3 control the individual energizations of eight code conversion relays of which one is energized if there are no code bits in the 1, 2 or 3 code channel of a code-bit group read at a given time or otherwise an individual one of the remaining seven relays is energized according to the particular one of the seven possible permutations of code bits appearing within these three channels. Similarly, the reader contact assemblies corresponding to code channels 4, 5 and 6 control the individual energizations of a further group of eight code conversion relays of which one relay is energized when there are no code bits appearing within these three code channels or otherwise an individual relay of this group is energized to indicate that there is a particular permutation of code bits appearing in these three channels of the code-bit group read at that time. The seventh and eighth code channel reader contact assemblies individually, but not collectively, energize a further code conversion relay to indicate that there is a seventh channel or eighth channel code bit appearing in the code-bit group read at the time.

Each of these code conversion relays, with the exception of the seven-eight channel relay, operate multiple electrical contacts which are so electrically interconnected between the various relays as to complete an electrical circuit between each of four input energizable circuits and four output or exit circuits which terminate in plug receptacles or hubs. In particular, one of the input energizable circuits is a control circuit energized in point of time ahead of the remaining three circuits which are energized concurrently and, under control of the code conversion relays, effect energization of a control exit hub and three code exit hubs for each one of the sixty-four possible permutations which can be formed from the code channel one through the code channel six code bits (including the absence of any bit) of each code-bit group read by the input tape reader. The control exit hub of each group of four may be plug-hub wired to one of a number of control entry hubs which control certain aspects of the code converter operation as will be described more fully hereinafter. The remaining code exit hubs in each group of four are ordinarily plug-hub wired to energize one or more of the code entry hubs connected to the punch magnets of an output tape punch unit according to the particular code conversion desired. The tape punch unit may have the same general construction and mode of operation as disclosed and described more fully in either of the aforementioned Blodgett patents. The code conversion relay controlled by the seven or eight code channel has multiple transfer contacts which terminate only in input and exit hubs. These may be plug-hub wired, as will be explained more fully hereinafter, to effect code conversion modifications of the plug hub wiring between the code exit hubs and the code entry hubs of the tape punch unit and thereby assist in a desired code conversion involving an input seven channel or eight channel code.

The exit hubs and entry hubs just mentioned are mounted on a common control panel of the converter as illustrated in FIGS. 1*a*, 1*b*, 1*c* and 1*d* arranged as in FIG. 1. This panel is divided into four sections each having 208 hubs, or a total of 832 hubs for the complete panel. The panel hubs are arranged in columns numbered 1 through 32 and in rows identified as rows A through Z, and each hub has two electrically connected plug receptacles into which wiring plugs may be inserted. Each of these hubs may have its position on the panel identified by reference to the row and column in which the hub appears; thus hub A1 refers to the hub in the upper left-hand corner of the panel, and hub Z32 refers to the hub in the lower right-hand corner of the panel. It will be noted that the code exit hubs appear in rows A through H across the top of each of the four sections of the panel, that the code and control entry hubs appear in rows I through P and in general are duplicated eight times across the panel, and that certain auxiliary exit and entry hubs described more fully hereinafter appear in rows Q through Z of certain sections of the panel.

It can readily be shown that the six code bits of a six-channel code can provide 64 different permutations including a blank code which has no code bit in any of the six-code channels. It was earlier mentioned that the code conversion relays of the converter energize a group of four exit hubs for each of these sixty-four code permutations. These four exit hubs occupy the same row but adjacent columns of the panel, the adjacent columns of each group being identified as "Exit 1," "Exit 2," "Exit 3" and "Control Exit" columns. The numerals associated with each code exit hub identify the permutation code which must be read by the input tape reader to effect energization of this hub. For example, exit hubs A1, A2, A3 and A4 are energized when the input tape reader reads a code having no code bits in any of the code channels 1 through 6, whereas exit hubs H13, H14, H15, and H16 are energized when the input tape reader reads a code having a code bit in the first, fifth and sixth code channels. In this, and as noted above, the Exit 1, Exit 2 and Exit 3 hubs are concurrently energized while the Control Exit hub is energized prior to energization of the three exit hubs last mentioned. The plural code exits provided for each permutation code read by the input tape reader is merely for convenience to facilitate plug-hub wiring between these code exit hubs and the code entry hubs of the output tape punch. Also, for reasons of convenience, it will be noted that the permutation code exit hubs are arranged on the panel in ascending numeric sequence from left to right starting with a blank code exit hub in position A1 and ending with the 1–2–3–4–5–6 permutation code in the last position H32.

The code entry hubs energize the punch magnets of the output tape punch, and are energized by wiring to the code exit hubs in such manner as to cause the punching in the output tape of the desired converted permutation code. The numeric labels applied to the code entry hubs indicate the output channel or channels in which code bits will be punch recorded by energization of that code entry hub. Eight identical sets of code entry hubs are provided on the panel, and corresponding hubs of the sets are electrically connected together. While one set of code entry hubs would be sufficient, the use of eight separate sets of code entry hubs simplifies the wiring of these hubs to the code exit hubs and eliminates the need for long wires extending across the complete panel board. The first of these eight sets of code entry hubs are located in columns 1–4 and in rows I–P, the second set of hubs is in columns 5–8 and rows I–P, etc. The convenience flowing from the use of these multiple sets of code entry hubs may best be illustrated by two examples. Assume that whenever a 1–2 permutation code is read by the input tape reader it is desired that a conversion code 1–3–4–5–7 be punched in the output tape. The wiring to accomplish this would include a connection from the 1–2 code exit hub H1 to the code entry hub N1 to effect punching of a 1–3 code portion, a connection from the 1–2 code exit hub H2 to the code entry hub K2 to effect punching of the 4–5 portion of the output code, and a connection from the code exit hub H3 to the code entry hub J3 to provide punching of the seven code bit of the output code. Again assume that a 3–4–5 permutation code read by the input tape reader is to be converted to a 1–2–5–6–7 code in the output tape. Electrical connections would then be provided between the 3–4–5 exit hub G17 and the code entry hub M17 to punch the 1–2 portion of the output code, an electrical connection would be provided between the code exit hub G18 and the code entry hub J18 to punch the five bit portion of the output code, and an electrical connection would be provided between the code exit hub G19 and the code entry hub K19 to punch the 6–7 portion of the output code. The "blank" code entry hubs, for example hub I1, should be energized only if the code read by the input tape reader is to produce in the output tape a blank code having no code bits in any code channel of the output tape. It will be evident from these examples that the exit and entry hubs are so arranged that a code exit hub can be electrically connected to a code entry hub found in the same vertical column with it. The reason for providing double plug receptacles for each exit and entry hub is to permit "leap frog" electrical connections where several code exits in a given vertical column are to energize the same code entry hub directly below it in the column.

The control entry hubs are located at positions O3, P3, and I4 through P4 of the first code and control entry section and in corresponding positions of the remaining seven code and control entry sections of the panel. The functions performed by energization of these control entry hubs will now be briefly considered.

The non-punch hub I4 should be energized whenever a given input code read by the input tape reader is not to produce the punching of a corresponding code in the output tape. Each one of the 64 permutation codes that the code converter recognizes should either be wired to punch a corresponding code in the output punched tape or in the alternative should be wired to the non-puch hub I4 (or a convenient non-punch hub in another of the control panel sections). If a given input code is wired to the non-punch hub, it will be ignored in the conversion process. If a given input code is neither wired to punch a corresponding output code nor wired to the non-punch hub, the code converter will automatically halt to await a manual supervisory operation. Thus the non-punch hub can serve as a check against forbidden code combinations and also provides a valuable check against certain machine malfunctions since the failure of the converter to punch an output code when an assigned input code is read will likewise effect an automatic halt of operations awaiting a manual supervisory correction.

The stop control entry hub K4 (and corresponding hubs K8, K12, K16, K20, K24, K28 and K32) when energized will cause the converter operation to halt. The input code selected as the stop code may also be wired to punch a corresponding output code if desired. In this, however, it should be noted that a stop code is not required at the end of a tape transported through the input tape reader since the operation of the reader will halt automatically when the end of the input tape is reached.

The shift to letters control entry hub L4 (and corresponding hubs of the remaining control entry sections) is employed only in those applications which involve a five channel input or output tape. This is true also for the shift to figures control entry hub M4. Energization of the shift to letters control entry hub or the shift to figures control entry hub is by the control exit hub of letters and figures input codes, and effects energization of a letters memory relay or a figures memory relay of the code converter. These relays when energized control the automatic punching of figures shift and letters shift codes in a five channel output tape, or permit proper interpretation between a letters code and a figures code of identical code format read from a five channel input tape. Energization of either of these relays will effect automatic deenergization of the other relay.

The letters precedence control entry hub N4 (N8, N12, N16, etc.), the figures precedence control entry hub O4 (O8, O12, etc.), and the no precedence control entry hub P4 (P8, P12, etc.) are concerned with the punching of codes into a five channel output tape by the tape punch of the code converter. These entry hubs are energized from the control exit hubs of letters and figures codes. The letters precedence hub when energized causes the immediate punching of a 1–2–3–4–5 letters shift code into the output tape if the letters memory relay is not already energized, and in this event the letters memory relay is automatically energized and the figures memory relay is automatically deenergized. The punching of this letters shift code will occur prior to the punching of the output code corresponding to the input code which was read by the tape reader and which caused energization of the letters precedence hub. In similar manner, the figures precedence hub when energized will cause the immediate punching of a 1–2–4–5 figures shift code into the output tape if the figures memory relay is not already energized, and in this event the figures memory relay is automatically energized and the letters memory relay is automatically deenergized. The punching of this figures shift code precedes the punching of the output code corresponding to the input code which was read by the tape reader and which effected energization of the figures precedence hub. Ordinarily in applications involving the punching of a five channel output tape there are certain input codes which, when read, should punch output codes which are common to both the figures shift and letters shift type of code. For example, a five channel carriage return code, a line feed code, or a space code are common to both figures shift and letters shift codes. The input codes which are to cause punching in the output tape of these no precedence codes should have their code exit hubs wired to a no precedence control hub, leapfrog wiring previously discussed conveniently enabling several input codes to be wired to one no precedence control hub.

In addition to the last mentioned use of the no precedence control hub, these no precedence hubs have direct application where the output tape utilizes 6, 7 or 8 code channels. The no precedence hub in position P8 should, in these applications, be wired to the all codes exit hub in position Q8 which is energized each time a code is read by the input tape reader. This will inform the code converter that no letters or figures precedence whatever will be punched into the output tape, and in this case neither the letters precedence hub nor the figures precedence hub will ever be energized in the application in question.

The automatic line feed control entry hub J4 (J8, J12, etc.) is used in those applications of the code converter which involve a code conversion to a standard telecommunications code and the punching of this code into a five channel output tape. By energization of the automatic line feed hub, it is possible to generate in the telecommunications code format a carriage return code followed by a line feed code whenever a carriage return code is read from the input tape. Furthermore, in the event that several consecutive carriage return codes are read from the input tape, only the first of the series will cause the punching into the output tape of the carriage return code followed immediately by the punching of a line feed code and all succeeding carriage return codes of the series merely cause corresponding single line feed codes to be punched into the output tape thus conforming to standard telecommunications practice. Assume, for example, that a 1–2 code in the input tape is to be considered the carriage return code and that the reading of this code from the input tape is to effect an automatic punching in the output tape of the standard communications carriage return code (a channel 4 code bit only) followed immediately by the automatic punching of the standard telecommunications line feed code (a channel 2 code bit only). The 1–2 code control exit H4 is wired to energize the automatic line feed control entry hub J4, and the 1–2 code exit hub H1 is wired to energize the code entry hub K1. It was previously explained that the control exit hubs are energized prior in time to energization of the Exit 1, Exit 2 and Exit 3 hubs; by reason of this, energization of the automatic line feed hub J4 will cause the immediate punching of a carriage return (4) code in the output tape and the subsequent energization of the code exit hub H1 will energize the code entry hub K1 to effect punching in the output tape of a line feed code (2) following the punching of the automatic carriage return code.

When the automatic line feed hub J4 is energized as last described, it energizes a relay in the code converter which permits only one punching of a carriage return code into the output tape so that succeeding carriage return codes read from the input tape merely are effective to cause a corresponding succession of line feed codes to be punched in the output tape by energization of the code entry hub K1. For the operation just described, the no precedence hub P4 is not energized by a carriage return code read from the input tape although it would normally be so wired as explained above by reason of the fact that this code is common to letters and figures codes. If the automatic line feed hub is to be used in a code conversion application to create an output tape utilizing a code other than the standard telecommunications code, the previously described energization of the no precedence control entry hub P8 by the all codes exit hub Q8 is omitted and each code exit other than the carriage return code exit is wired to energize a no precedence control entry hub (leapfrog wiring conveniently permitting a plurality of code exit hubs to be wired to one no precedence control entry hub).

The output tape produced by the present converter often is used to supply data to a computer, and in these applications there occasionally is a requirement that the output tape include intermessage gaps of from 7 to 10 blank codes at specific locations in the tape. The gap entry control hubs O3 (O7, O11, etc.) are provided for this purpose. The gap entry control hub is energized by an individual code, or individual codes, read from the input tape at points where gaps are to be produced in the output tape. The input code which causes the gap to be generated may or may not itself be converted to a code which is then punched in the output tape prior to the creation of the required gap, depending upon the requirements of the particular application. Assume, for example, that a 2–6 code read from the input tape is to be converted to a 1–3–4–5–6–7 code in the output tape followed by the intermessage gap, the 2–6 code exit hubs H5, H6 and H7 are wired to energized the appropriate code entry hubs to cause punching of the 1–3–4–5–6–7 code in the output tape, and the 2–6 code control exit hub H8 is wired to energize the gap entry hub O7 below it. The latter hub when energized energizes a relay in the code converter which causes the output tape punch to progress through a number of successive cycles as required to provide the number of blank codes used to establish an intermessage gap in the particular application. This relay also halts the input tape reader until the output tape punch has completed the preselected number of cycles required in the generation of the intermessage gap.

While there are several gap entry control hubs O3, O7, O11, etc., a single gap exit hub P3 is provided on the panel and this exit hub is energized from any of the gap entry hubs through normally open contacts of the gap relay just mentioned. The purpose of the gap exit hub P3 is to permit it to energize the non-punch control hub I4 by jumper connection thereto if the input code which initiates the intermessage gap is not to be punched into the output tape just prior to the intermessage gap as previously explained. In this event, the normal wiring between the code exit hubs and the code entry hubs are omitted (retaining, of course, the wiring between the control exit hub and the gap entry hubs O3, O7, etc.). It is possible to have several different input codes create an intermessage gap in the output tape so long as all of these codes either cause a corresponding output code to be punched into the output tape or so long as none of the codes cause a corresponding code to be punched into the output tape. It is for this reason that only one gap exit hub P3 is provided whereas there are eight gap entry hubs provided, the one gap exit hub serving all codes that create an intermessage gap in the output tape.

It will be noted that there is an exit control hub R7 labelled "input" and two adjacent control entry hubs Q6 and Q7 respectively labelled "5 channel" and "6, 7 channel." These three hubs are concerned with the particular number of code channels used by the input tape read by the tape reader of the converter. If the input hub R7 is wired to energize the 6, 7 channel hub Q7, the code converter is conditioned to handle 6, 7 or 8 channel input tapes. On the other hand, if the input hub R7 is wired to energize the 5 channel hub Q6, the converter is conditioned to accept 5 channel input tape. Operation of the converter with the input hub R7 wired to the 6, 7 channel hub Q7 for use with 6, 7 or 8 channel input tape concerns code conversion of the code bits appearing in the 6 and 7 code channels of the input tape by selective use of the sixth channel or seventh channel code bit and is accomplished in similar manner to code conversion of the code bits appearing in the lower levels of the input tape. However, wiring of the input hub R7 to energize the 5 channel control hub Q6 merits particular consideration.

In a 5 channel code there are only 32 distinct code permutations possible (including a "blank" code), rather than 64 permutations available in a 6 or 7 channel code. By use of figures shift and letters shift codes, however, the 32 possible permutations of the 5 level code may provide the theoretical equivalent of 64 permutations. In practice, only 58 permutations are acknowledged since several codes are common to both shifts (for example, the carriage return code, the space code, and the line feed code). The present code converter takes advantage of the fact that there can be no 6 channel code bits read from the input tape, and utilizes the energized and deenergized states of the figures relay earlier mentioned for respectively inserting or omitting an artificial 6 channel code bit according to whether a given input code is preceded by a figures shift code or by a letters shift code. The resulting operation is such that when the 32 possible permutation codes which may be read from the input tape are all preceded by a figure shift code 32 corresponding sets of code exit hubs are energized whereas these same 32 permutation codes when preceded by a letter shift code will cause 32 different sets of code exit hubs to be energized. For example, if a 1 code is read from the input tape and is preceded by a letters shift code the code exit hubs B1, B2, B3 and B4 are energized whereas the reading of the same 1 code but preceded by a figures shift code causes the exit hubs D5, D6, D7 and D8 (corresponding to a 1–6 code) to be energized.

The portion of the control panel shown in FIG. 1*b* includes four tape feed exit hubs, which are all energized during the interval that a manual tape feed switch of the converter is manually actuated to closed-contact position to energize a tape feed relay within the converter. Each new period of operation of the converter usually begins with a manual tape feed operation to feed a short length of output tape through the output tape punch, although it will be understood that a tape feed operation may be performed at any time as desired in a particular application. During the tape feed operation, a selected tape feed code is punched into the output tape once each punch cycle. This code is created by wiring the tape feed exit hubs to appropriate ones of the code entry hubs immediately above. Assume, for example, that the tape feed code desired is a 1–2–3–4–5–6–7 code. The creation of this code can be accomplished by wiring the tape feed exit hub Q9 to the code entry hub P9 to punch the 1–2–3 portion of the tape feed code, by wiring the tape feed exit hub Q10 to the code entry hub K10 to punch the 4–5 portion of the tape feed code, and by wiring the tape feed exit hub Q11 to the code entry hub K11 to punch the 6–7 portion of the tape feed code desired.

The code converter has a single figures code parity exit hub R4 which is used for the following purpose. In a conversion application involving the creation of a 5 channel output tape, it is possible to create an artificial parity check to check the accuracy of the converter's code conversion wiring circuitry and the operation of the tape reader and tape punch mechanisms. This is accomplished by wiring the code entry hubs of the control panel in such a manner that the seventh channel bit is added to any 5 channel output code that has an even number of bits in its format, thus causing each converted code supplied to the output tape punch to have an odd number of bits. While this method of parity checking causes the 7th channel punch pin of the output tape punch to operate, the 7th channel code bit is not actually punched into the output tape which is only sufficiently wide physically as to receive a 5 channel code within its width. Accordingly a 1–2 output code becomes a 1–2–7 code, a blank code becomes a 7 code, a 1–4 code becomes a 1–4–7 code, but a 1–2–3 code remains a 1–2–3 code or a 1 code remains a 1 code. This method of accuracy checking assures that an odd number of punch pins are always operated during each punch cycle, and the parity contacts (hereinafter described) which are operated by the actuation of the punch pins maintains a parity error relay of the converter deenergized to indicate freedom from parity error so long as each punch operation involves movement of an odd number of punch pins to punch position. Detection of a parity error will halt operation of the converter automatically. This method of parity checking is satisfactory for all codes of a standard telecommunications 5 channel code except for the 1–2–4–5 figures shift code which has an even number of code bits and is automatically punched by energization of the figures precedence control hub as previously explained. It is the purpose of the figures code parity exit hub R4 to permit the 7th channel code bit to be added to the figures shift code as thus automatically punched, and this is accomplished by wiring the figures code parity exit hub R4 to the 7th channel code entry hub J3. The figures code parity exit hub R4 becomes energized each time the figures shift code is automatically punched into the output tape, and accordingly the wiring last described causes the 7th channel code bit to be added to the figures shift code for parity checking purposes.

The control panel portion shown in FIG. 1*a* shows the entry and exit hubs of eight "8th Bit" selectors with the hubs of each arranged in sets positioned in an individual one of the columns 1 through 8. The entry hub of each set is positioned in row V and is labelled "C" (common), one exit hub of each set is located in row U and is labelled "N" (normal), and the second exit hub of each set is located in row T and is labelled "T" (transferred). These selectors are comprised by eight sets of transfer contacts operated by the eighth channel code conversion relay of the converter. In the deenergized state of this relay, an electrical connection is completed between the "C" entry hub and the "N" exit hub of each of the eight selectors. Upon energization of the eight channel code conversion relay by a selected one of the seventh channel or eighth channel code bits appearing in the input tape read by the input tape reader, in a manner explained more fully hereinafter, the selector contacts are transferred to interrupt the electrical connection between the "C" and "N" hubs and to complete an electrical connection between "C" and "T" hubs. This transferred connection will be maintained only during the reader cycle in which the selected seventh channel or eighth channel code bit is read by the input tape reader.

The purpose of these selectors ordinarily is to allow the recognition of eighth channel code bits read by the input tape reader. For example, in the eight channel code shown in the aforementioned Blodgett et al. Patent No. 2,905,298 the eighth channel code bit is used alone to represent a carriage return functional operation. To illustrate the use of the selectors, assume that a carriage return code is read from an input tape using the code last mentioned and that this code is to be converted to a 1–2–3–5–6 carriage return code for punching into the output tape. Upon reading the carriage return code from the input tape, there will be no code bits in any of channels 1 through 7 and accordingly the "blank" code exits A1, A2, A3 and A4 only will be energized. However, in the code shown in the Blodgett et al. patent last mentioned a hyphen is represented by a code bit appearing only in the seventh channel so that the reading of a hyphen code will also cause the "blank" code exit hubs A1, A2, A3 and A4 to be energized. The blank code as such is not used in the code of the Blodgett et al. patent, and this fact enables differentiation between the reading of a hyphen code and a carriage return code by use of the eighth bit selectors. This is accomplished by wiring the "blank" code exit hubs A1, A2 and A3 to respective ones of the eighth bit selector common entry hubs V1, V2 and V3, by wiring the normal hubs U1, U2 and U3 of the selectors to appropriate ones of the code entry hubs immediately above them on the control panel as required to create an output code representative of a hyphen, and by wiring the eighth bit selector transfer exit hubs T1, T2 and T3 to the code entry hubs immediately above them on the control panel to create the desired output carriage return code 1–2–3–5–6. The reading of a hyphen code (7) from the input tape does not energize the eighth channel code conversion relay and accordingly the energization of the "blank" code exit hubs A1, A2 and A3 is transferred through the common and normal hubs of the eighth bit selector to the code entry hubs to generate the desired output hyphen code. Similarly the reading of an eighth channel carriage return code (8) from the input tape will effect energization of the eighth channel code conversion relay with consequent transfer of the selector contacts, and the energization of the "blank" code exit hubs A1, A2 and A3 is now transferred through the common and transferred hubs of the eight bit selectors to energize code entry hubs and create the desired output 1–2–3–5–6 carriage return code. The control exit hub A4 of the "blank" code is not used since there is no function to be performed other than the punching of the hyphen or carriage return output code. Assume by way of further example that a hyphen code read from the input tape is not to be converted to a corresponding output code. In this event the eighth bit selector normal exit hubs U1, U2 and U3 would not be wired to the code entry hubs, but rather one of the normal hubs (say the hub U3) would be wired to the non-punch control entry hub I4 to cause the converter to ignore the reading of an input hyphen code.

Eight pairs of entry-exit hubs of "123 Bit" selectors, operated by various permutations of code bits in channels 1, 2 and 3 read from the input tape, are located in rows W and X and columns 1 through 8 of the control panel. Eight additional pairs of the entry-exit hubs of "456 Bit" selectors concerned with the reading of channel 4, 5 and 6 code bits from the input tape are positioned in rows Y and Z and columns 1 through 8 of the control panel. The entry and exit hubs of each of these selectors are connected to normally open contacts of the code conversion relays of the converter, and accordingly there is normally no electrical connection between the entry and exit hubs of each pair. However, each code read by the input tape reader will cause energization of one code conversion relay applicable to the particular permutation of code bits of channels 1, 2 and 3 and will also cause energization of a second code conversion relay applicable to the code bits of channels 4, 5 and 6. Thus each code read by the reader causes two of the sixteen entry-exit selector hubs to be electrically connected, one from the selector group of rows W and X and the other from the selector group of rows Y and Z. For example, the reading of a 1–5–6 code by the input tape reader will cause the "1" entry-exit hubs W2, X2 to be electrically connected and will concurrently cause the "5–6" entry-exit hubs Y7 and Z7 to be electrically connected. Whenever the input code contains no 1, 2 or 3 code bit, the "blank" entry-exit hubs W1, X1 are electrically connected, and the absence of any 4, 5 or 6 code bits from the input code will case the "blank" entry-exit hubs Y1 and Z1 to be electrically connected. The use to be made of the selectors is concerned with programmed skipping over information read from the input tape without utilizing such information. This will be explained more fully hereinafter in connection with the skip operation.

The control panel includes four "power source" hubs S2, S3, S4 and S5 which are energized whenever any code is read by the input tape reader. These power source hubs are used to energize the selectors last described whenever a skip operation is in progress.

The tape skip operation of the converter just mentioned enables the converter completely to skip over or bypass designated portions of the input tape. To accomplish this, two codes in the input tape must be assigned as the tape skip code and the skip restore code. The tape skip code when read will cause the skipping operation to start, and the skip restore code when read will halt the skip operation and cause normal code conversion to resume. The code designated as the tape skip code cannot be converted to an output code for recording in the output tape, whereas the code chosen for the skip restore code can if desired be converted to an output code. To illustrate the skip operation by example, assume that a 3–4–5–6 code is assigned as the tape skip code and a 1–4–6 code as the skip restore code. The control panel includes a tape skip hub X9 which must be energized to initiate the tape skip operation, and includes a skip restore hub Y9 which must be energized to halt the skip operation. The tape skip hub and skip restore hub cannot be energized from normal code exit hubs, which are specifically deenergized during a skip operation, but rather are energized from the power source hubs S2, S3, S4 and S5 through the 1–2–3 bit selectors and the 4–5–6 bit selectors. The tape skip code 3–4–5–6 when read energizes the tape skip hub X9 by means of a connection from the power source hub S4 to the "3" entry hub W4, by a connection from the "3" exit hub X4 to the "4–5–6" entry hub Y8, and by a connection from the "4–5–6" exit hub Z8 to the tape skip hub X9. Thus whenever a 3–4–5–6 code is sensed in the input tape, energization will be supplied through the W4, X4 selector and the Y8, Z8 selector to the tape skip hub X9 to initiate the tape skip operation.

The wiring for the skip restore code 1–4–6 is similar to that just described and includes a connection from the "power source" hub S2 to the "1" entry hub W2, a connection from the "1" exit hub X2 to the "4–6" entry hub Y6, and a connection from the "4–6" exit hub Z6 to the skip restore hub Y9 to energize the latter upon reading the skip restore code 1–4–6 and halt the skip operation. If the 1–4–6 skip restore code is not to be converted to an output code for recording in the output punched tape, the 1–4–6 code control exit hub G16 is wired to the non-punch hub I16 immediately below it. If, on the other hand, the skip restore code is to be converted to an output code, the 1–4–6 code exit hubs G13, G14 and G15 are wired to appropriate code entry hubs and the control exit hub G16 is wired to the proper functional entry hub (i.e., figures precedence, letters precedence, or no precedence) unless the "all codes-no precedence" wiring P8 to Q8 is used in the particular application. Since the tape skip code is not converted to an output code as previously mentioned, the control exit hub for the tape skip code 3–4–5–6 is hub A32 and is wired to the non-punch hub I32 immediately below it.

The code converter includes three special selectors, the special selector No. 1 being included in the control panel section shown in FIG. 1*b*, the special selector No. 2 being included in the control panel section shown in FIG. 1*c*, and the special selector No. 3 being included in the control panel section shown in FIG. 1*d*. The electrical arrangement of these special selectors will be understood more fully hereinafter when the electrical circuit of the converter is described. These selectors may be operated independently of one another, or either or both of the selectors Nos. 2 and 3 may be operated concurrently with selector No. 1 by use of appropriate wiring presently to be described. Each selector is comprised by a relay which for independent operation is energized by energization of a pick entry hub Q13, Q21 or Q29 and is deenergized by energization of a drop entry hub Q15, Q23 or Q31. Independent energization of each relay electrically connects its pick entry hub to a pick exit hub Q14, Q22 or Q30, and upon deenergization of the relay its drop entry hub is connected electrically to a drop exit hub Q16, Q24 or Q32. By completing an electrical connection between the special selector 2 exit-entry hubs S19 and T19, the selector No. 2 relay is energized concurrently with energization of the selector No. 1 relay by energization of the pick entry hub Q13. The selector No. 3 relay likewise includes exit-entry hubs S27 and T27 which when wired together cause the selector No. 3 relay to be energized with the selector No. 1 relay by energization of the pick entry hub Q13 of the latter. Each of these selector relays has three sets of transfer electrical contacts, of which for the selector No. 1 a common contact entry hub (1C, 2C and 3C) completes an electrical connection to an associated normal (N) contact exit hub in the deenergized state of the relay or completes an electrical connection to an associated transfer (T) contact exit hub in the energized state of the relay. For selectors Nos. 2 and 3, corresponding common contact entry hubs are designated 3C, 4C and 5C and these selectors have additional 1C and 2C common contact entry hubs T20, T21 and T28, T29 which upon energization of the selector relay transfer from electrical engagement with normal (N) contact exit hubs to engagement with transfer (T) contact exit hubs. The 1C and 2C entry hubs of these selectors may be electrically connected to their associated pick entry hubs Q21 and Q29 if their "independent" hubs R19, Q19 and R27, Q27 are wired together.

These special selectors last considered are normally used in a manner which will now be considered. The pick entry hub Q13 of the selector No. 1 may be energized from one of the sixty-four code control exits in the code exit section of the control panel. The input code that is used to energize the selector may also be wired to punch an output code, as by wiring the code exists 1, 2 and 3 of the code selected to the proper code entry hubs. The pick exit hub of the selector makes it possible to impulse one of the functional control entry hubs when the input code that picks the selector is read by the input tape reader. Normally these functional control entry hubs would be energized from the control exit hub for the particular input code, but the control exit is used as just explained to energize the pick entry hub of the selector so that the pick exit hub has been provided to energize the desired functional control entry hub. For example, the pick exit hub could be wired to energize a non-punch, figures-precedence, letters-precedence, no precedence, shift to letters, or shift to figures control entry hub depending on the nature of the code conversion in a particular application. Thus if the input code that energizes the selector is not to cause punching of an output code, the pick exit hub should be wired to the non-punch control entry hub. If, on the other hand, the input code that picks the selector is to punch a corresponding output code and the all codes-no precedence P8–Q8 wiring is used, the pick exit may be left unwired.

The drop entry hub (i.e., Q15) is energized from one of the 64 control exits in the code exit section of the control panel in exactly the same manner that the pick entry hub is energized. When the drop entry hub is energized, the selector will be come deenergized if it had previously been energized. The drop exit hub (i.e., Q16) serves the same purpose in relation to the drop entry hub that the pick exit hub serves in relation to the pick entry hub. It is used to energize one of the functional control entry hubs when the code that deenergizes the selector is read. Thus if this code is not to punch an output code, the drop exit hub should be wired to a non-punch control entry hub unless the all codes-no precedence wiring P8–Q8 is used. If the latter wiring is not used and the code which energizes the drop exit hub is to punch an output code, the drop exit hub of the selector should be wired to either a figures-precedence, letters-precedence, no-precedence, shift-to-figures, or shift-to-letters control entry hub.

To illustrate an application of these selectors in the code conversion process, consider for simplicity only the special selector No. 1 and assume that its common contacts T14, T15 and T16 are wired to the respective 1–2–4 code exit hubs H9, H10 and H11. Assume further that its normal hubs S14, S15 and S16 are wired respectively to the code entry hubs K13, J14 and J15, and assume lastly that its transfer hubs R14, R15 and R16 are wired respectively to code entry hubs J13, I14, and I15. With these connections a code 1–2–4 read by the input tape reader will cause the punching of a 2–5–7 output code when the selector is deenergized or will cause the punching of a 1–4–6 code in the output tape when the selector is energized.

The special selector No. 2 and special selector No. 3 can be used in two different manners. They can be used as independent selectors with their own "pick" and "drop" codes or they can be used as extensions of special selector No. 1. In the case of special selector No. 2, for example, there is a set of three jumper connections labelled "independent selector" (Q17–R17, Q18–R18, and Q19–R19). If these three pairs of hubs are wired together, special selector No. 2 becomes an independent selector and is energized and deenergized from its own "pick" and "drop" codes. In this event only transfer entry hubs 3C, 4C and 5C and their associated exit hubs will be used for code switching. Transfer hubs 1C and 2C are not used when the selector is wired for independent operation. The second manner of using the special selector No. 2 is by wiring of its "add to select 1" hubs T19 and S19, in which event this special selector becomes an extension of special selector No. 1 and will be energized and deenergized by the same codes that energize and deenergize special selector No. 1. For this operation the pick entry and drop entry hubs of the special selector No. 2 are not used, but all five sets of the transfer contacts of the special selector No. 2 are usable. Accordingly, the special selector No. 2 may also be wired to provide two different code conversions, dependent upon the energized or deenergized state of this selector, as previously described in connection with special selector No. 1. What has been said with respect to special selector No. 2 applies in all respects with regard to special selector No. 3, which likewise has two different manners of usage as explained in connection with special selector No. 2.

ELECTRICAL CONTROL SYSTEM

The electrical control system of the code converter has a circuit arrangement as shown in FIGS. 2*a*–2*h* which are to be considered together as arranged in FIG. 2.

Figure 2A:
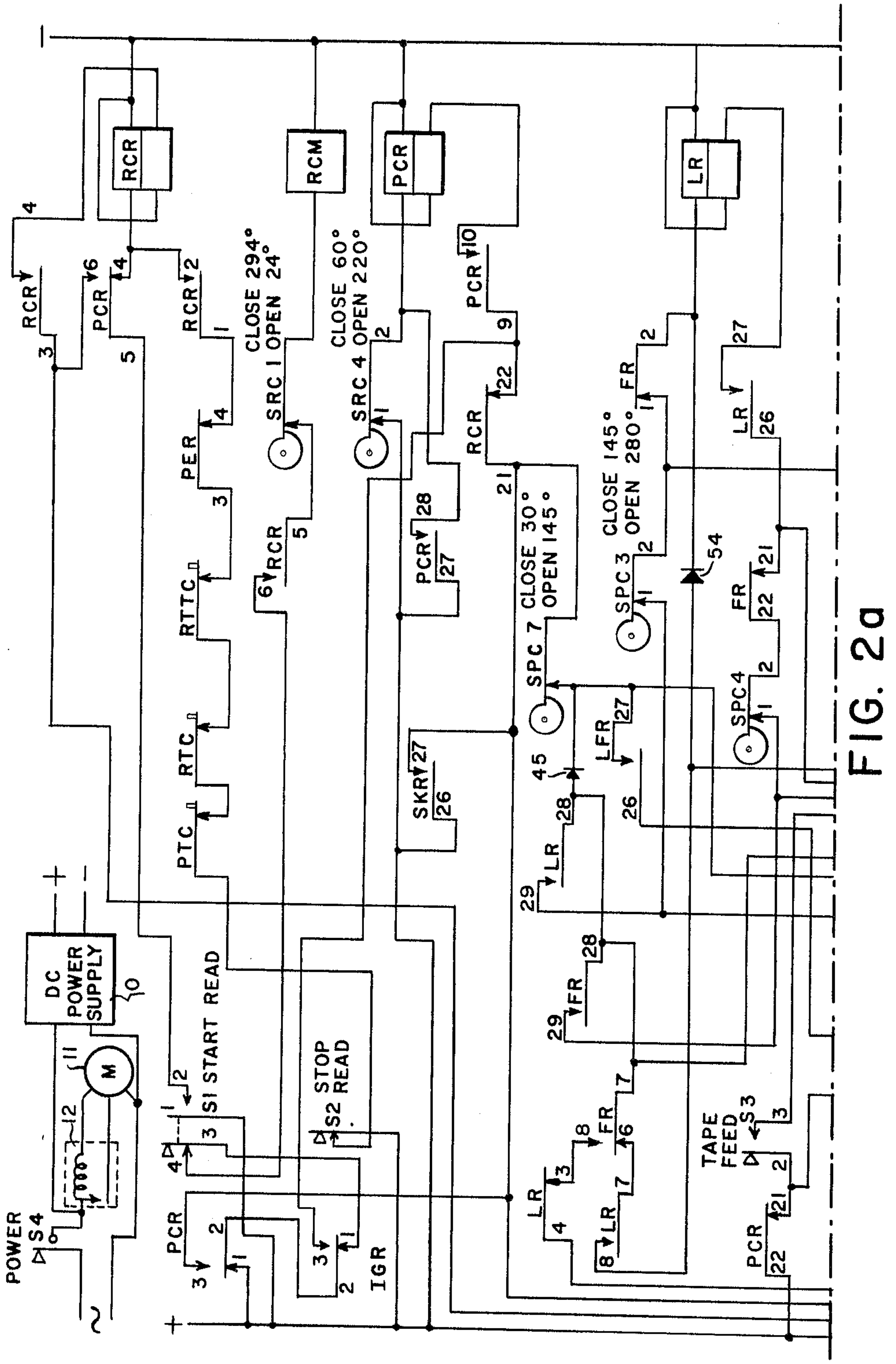

As shown in FIG. 2*a*, a manually actuable power switch S4 of the toggle switch type upon being manually actuated to close its contacts energizes a unidirectional power supply system 10 which furnishes unidirectional power to the control system hereinafter described. Closure of the switch S4 also energizes a motor 11 through a starting relay 12, the motor 11 comprising a common source of power drive for the input tape reader and the output tape punch.

The code converter is usually placed into operation by an initial tape feed operation which feeds a short length of tape through the output tape punch unit, and in doing so punches a series of tape feed codes as earlier described. This tape feed operation is accomplished by manually closing a tape feed switch S3 (FIG. 2*a*) which, through normally closed contacts 21 and 22 of a punch control relay PCR, energizes a tape feed relay TFR (FIG. 2*c*). The latter maintains itself energized through a hold circuit including the normally open but now closed contacts 23 and 24 of the relay TFR and the contacts 1 and 2 of a punch latch contact PLC which are normally closed but open through a portion of each punch cycle. The hold circuit for the tape feed relay TFR insures that this relay shall remain energized, even though the tape feed switch S3 is only momentarily actuated, until the output tape punch has initiated at least one punch cycle of operation. The hold circuit for the tape feed relay TFR also energizes the four tape feed exit hubs Q9–Q12 (FIG. 2*b*) earlier mentioned through the tape feed relay contacts 5–8 and 25–28, and these hubs are wired to selected code entry hubs to create the tape feed code desired in a particular application as earlier explained.

Figure 2B:
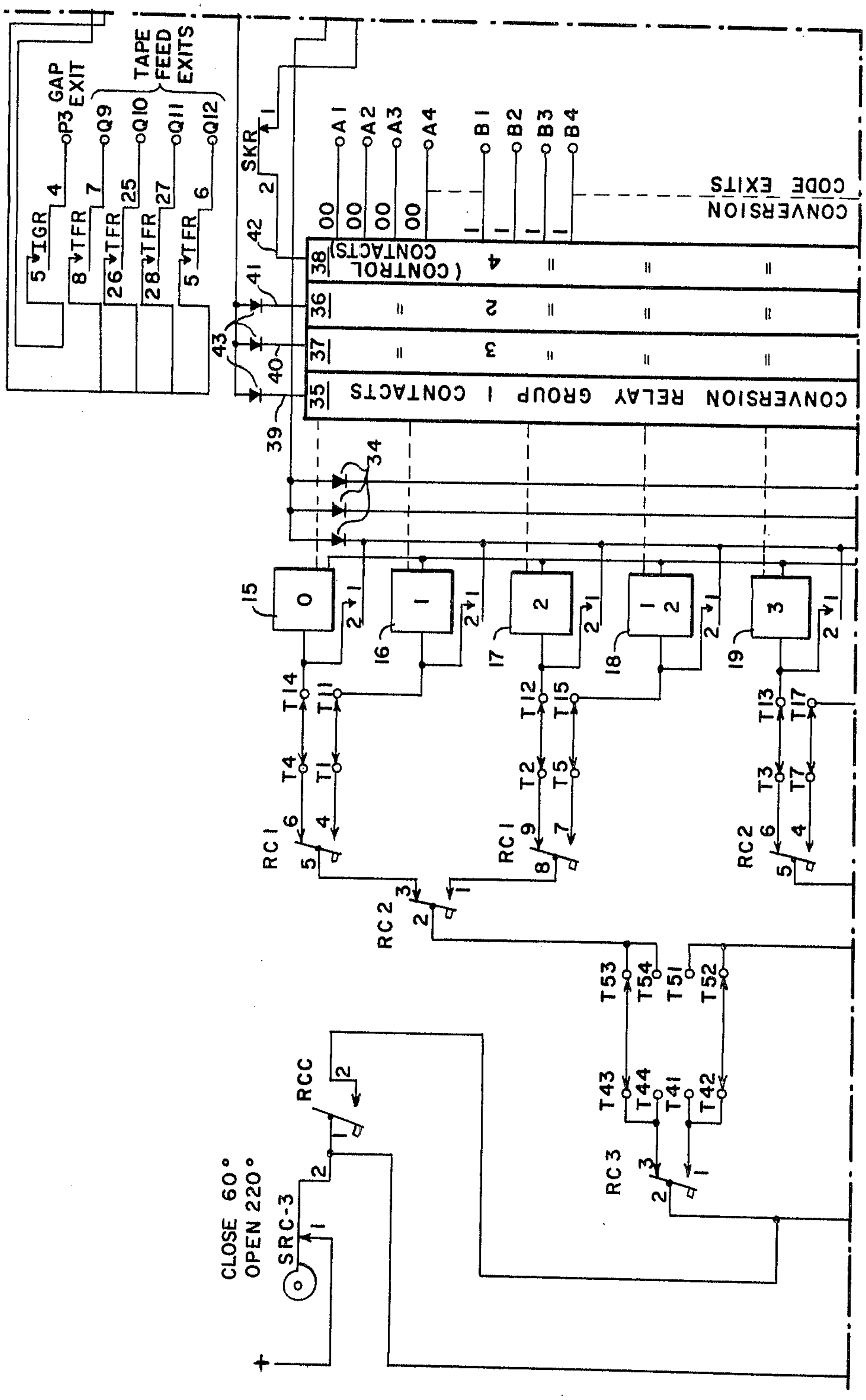
Figure 2C:
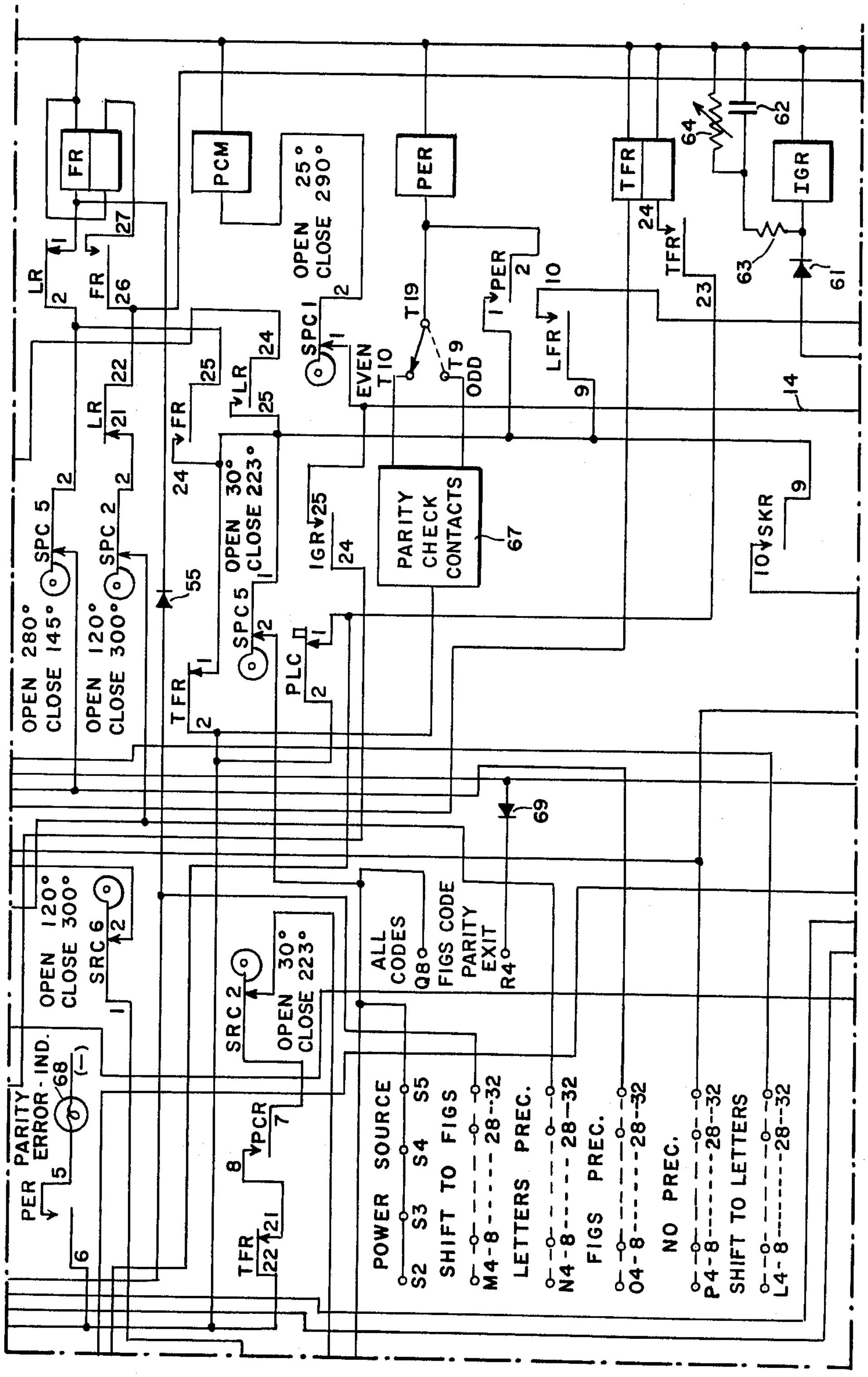
Figure 2D:
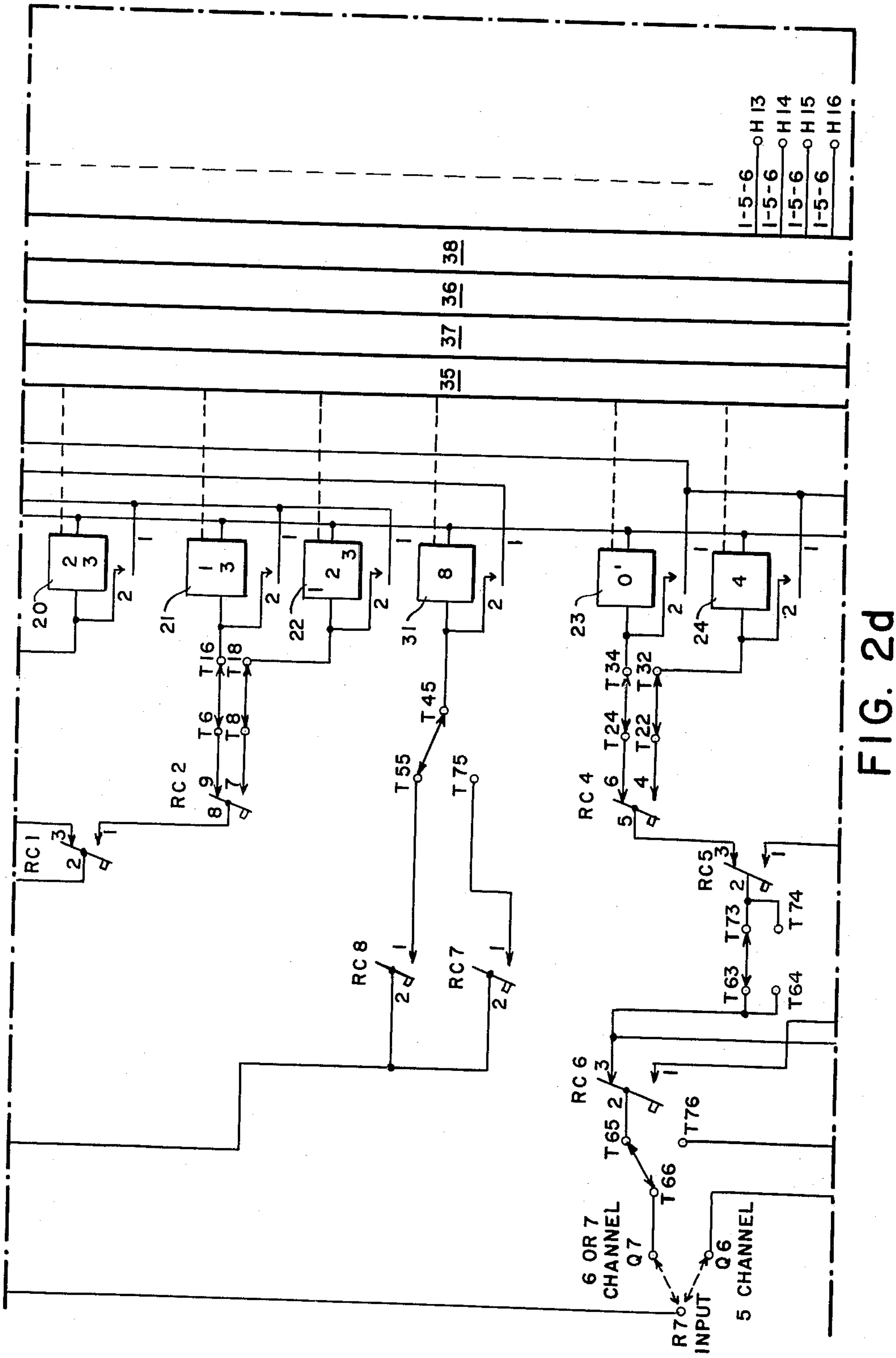
Figure 2E:
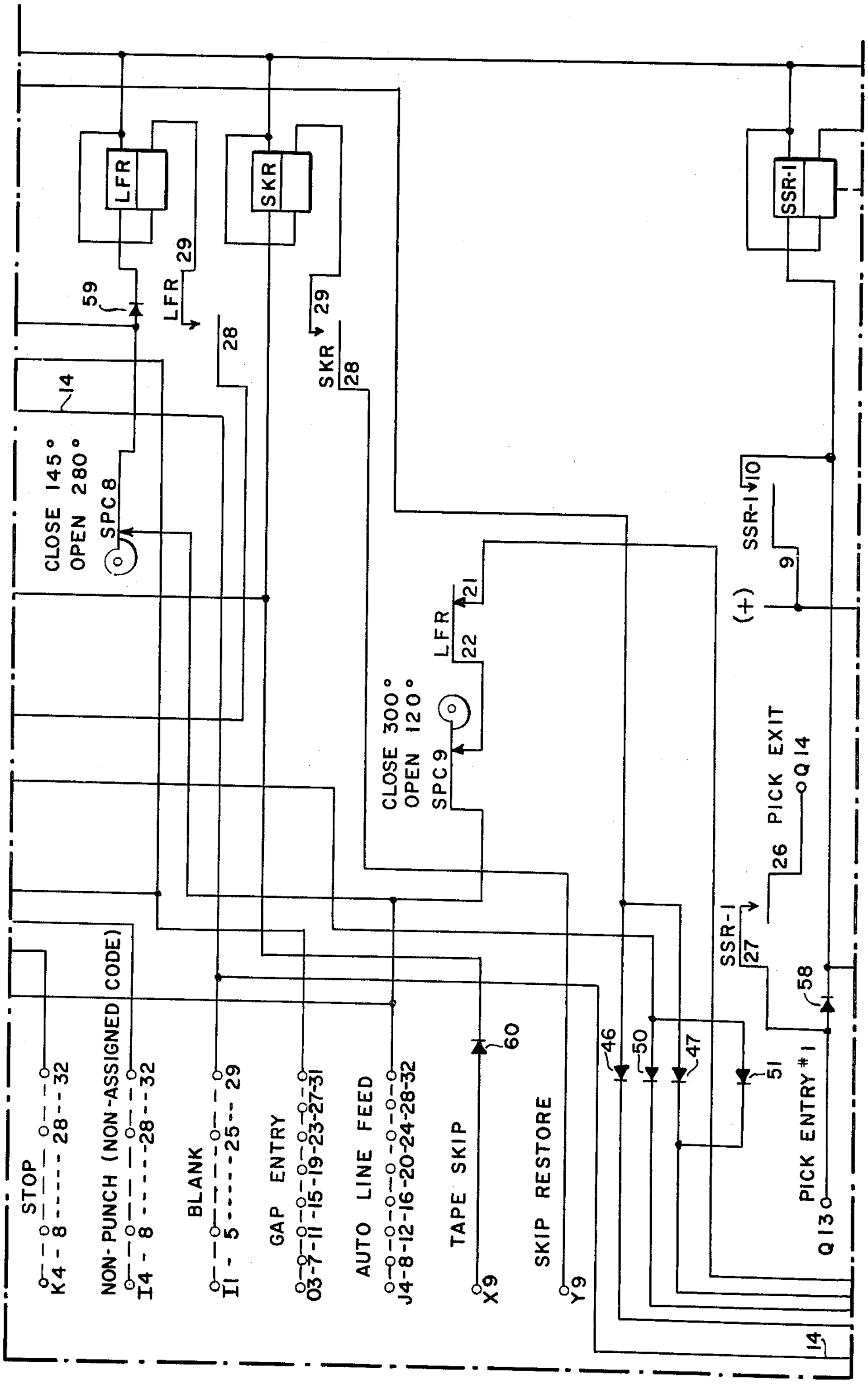
Figure 2F:
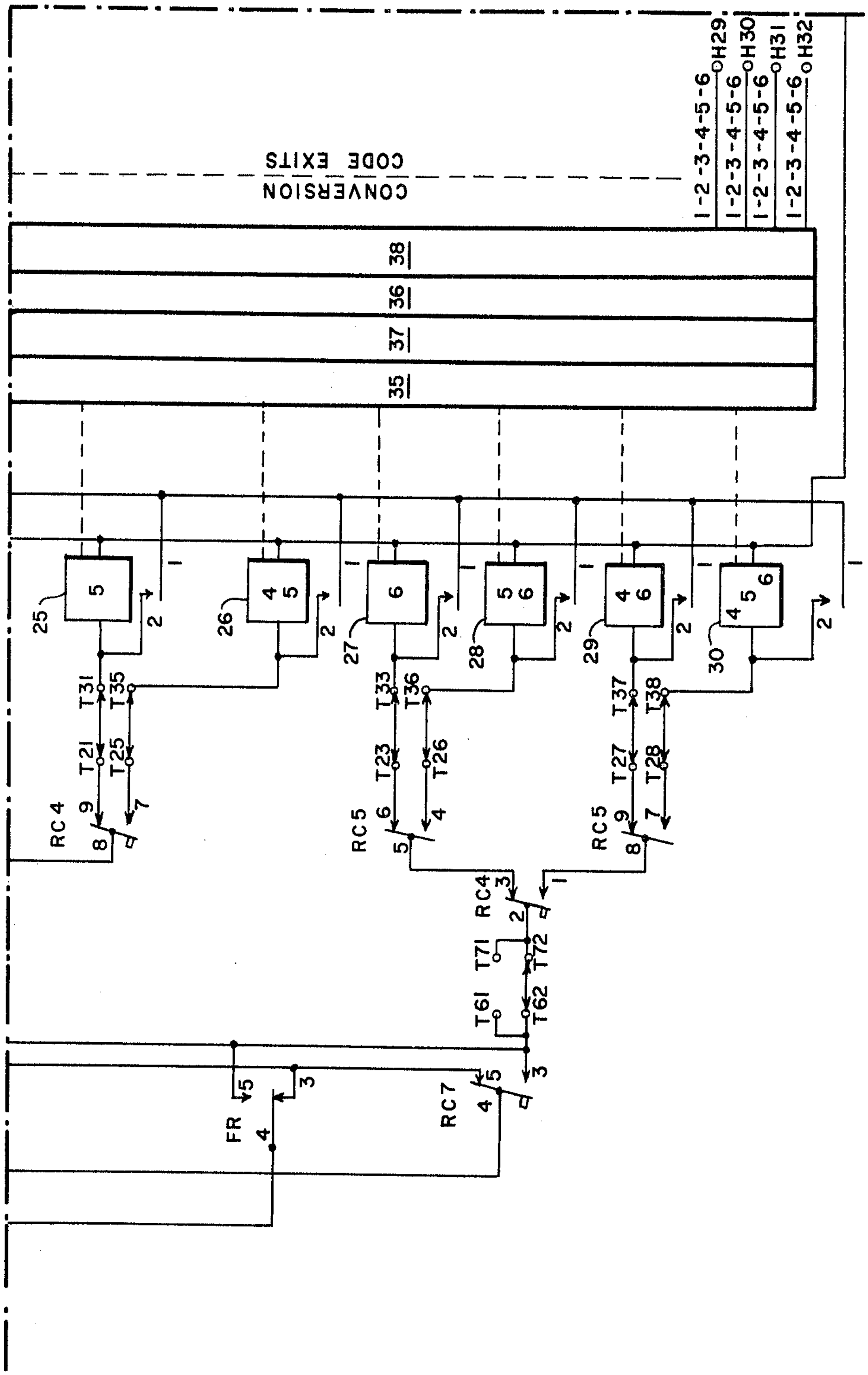
Figure 2A:
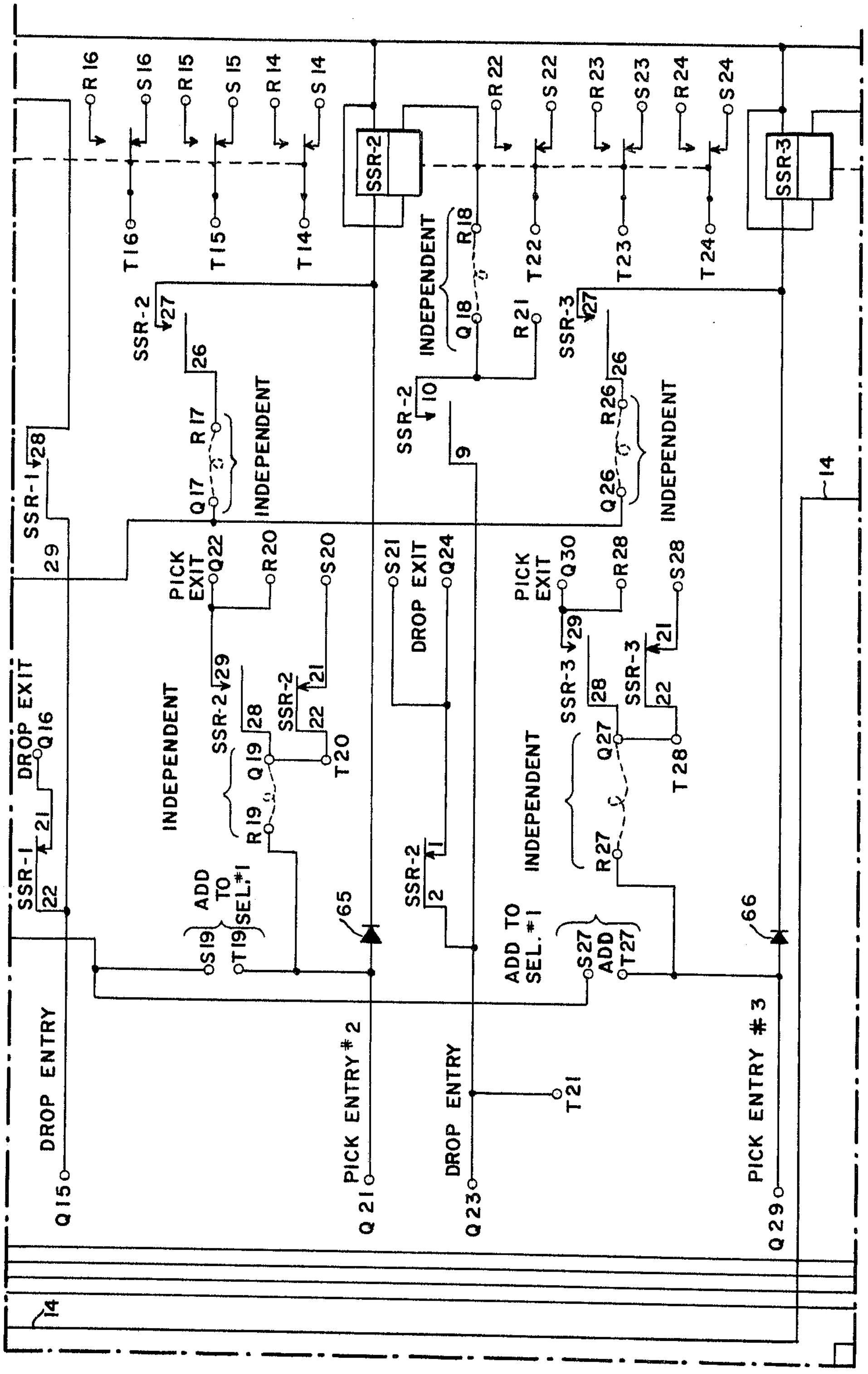
Figure 2H:
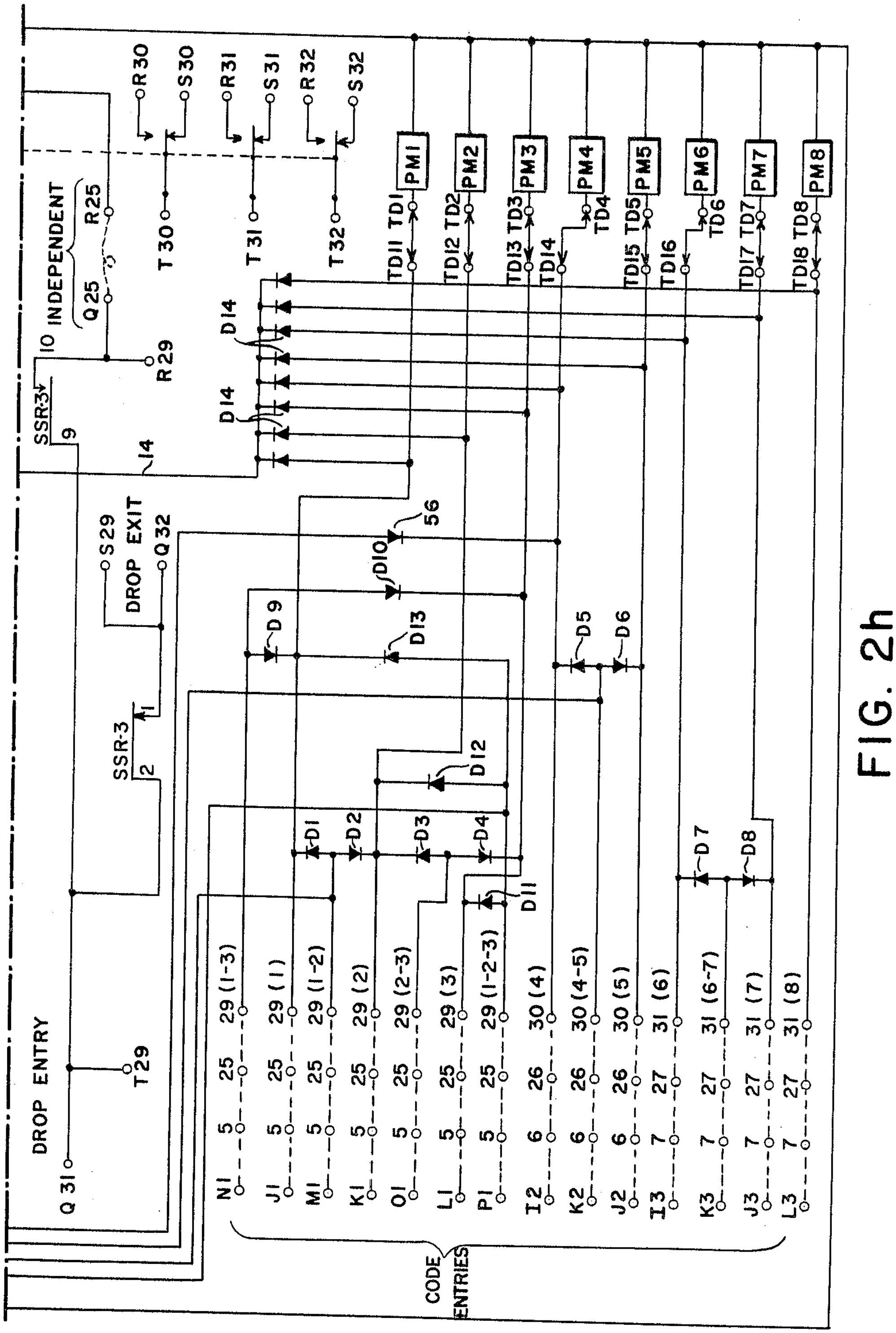

These code entry hubs are shown in FIG. 2*h* and include hubs J1–J29 which are connected through a wired connection between terminals TD1 and TD11 of a terminal board, positioned for convenient access by the operator and provided for a purpose hereinafter explained in connection with an illustrative 8 channel to 5 channel code conversion, to directly energize a "1" code channel punch magnet PM1; hubs K1–K29 which are connected through terminals TD2 and TD12 to energize a "2" code channel punch magnet PM2; hubs L1–L29 which are connected through terminals TD3 and TD13 to energize a "3" code channel punch magnet PM3; hubs I2–I30 which are connected through terminals TD4 and TD14 to energize a "4" code channel punch magnet PM4; hubs J2–J30 which are connected through terminals TD5 and TD15 to energize a "5" code channel punch magnet PM5; hubs I3–I31 which are connected through terminals TD6 and TD16 to energize a "6" code channel punch magnet PM6; hubs J3–J31 which are connected through terminals TD7 and TD17 to energize a "7" code channel punch magnet PM7; and hubs L3–L31 which are connected through terminals TD8 and TD18 to energize an "8" code channel punch magnet PM8. In addition, it will be seen that code entry hubs M1–M29 energize both of the punch magnets PM1–PM2 through diode rectifier devices D1 and D2, that hubs O1–O29 energize the punch magnets PM2 and PM3 through diode rectifier devices D3 and D4, that hubs K2–K30 energize punch magnets PM4 and PM5 through diode rectifiers D5 and D6, that hubs K3–K31 energize punch magnets PM6 and PM7 through diode rectifier devices D7 and D8, that hubs N1–N29 energize the punch magnets PM1 and PM3 through diode rectifier devices D9 and D10, and that hubs P1–P29 energize the punch magnets PM1, PM2 and PM3 through diode rectifier devices D11, D12 and D13. Energization of any of the punch magnets PM1 through PM8 effects through diode rectifier devices D14 concurrent energization of a circuit 14 which extends through cam actuated contacts SPC–1 of the punch to the punch clutch magnet PCM to initiate a cycle of punch operation.

Thus manual closure of the tape feed switch S3 for a short period of time effects energization of the tape feed relay TFR and tape feed exit hubs Q9–Q12, and the latter hubs in turn are wired to energize appropriate code entry hubs to initiate a succession of cycles of the output tape punch to feed out a short initial length of tape punched by a succession of tape feed codes. The earlier described hold circuit for the tape feed relay TFR through its contacts 23 and 24 not only insures the punching of at least one tape feed code even though the tape feed switch S3 is only momentarily closed as earlier explained, but also insures that a cycle of tape feed operation of the punch when once initiated shall continue to completion.

The input tape reader of the converter is placed into operation by manual actuation of a start read switch S1 (FIG. 2*a*) to close its contacts 1 and 2 and thereby energize a read control relay RCR through normally closed contacts 4 and 5 of the punch control relay PCR. The read control relay RCR is maintained energized through its normally open contacts 1 and 2, the normally closed contacts 3 and 4 of a parity error relay PER, the reader tight tape contacts RTTC which are normally closed except during some malfunction which causes the input tape supplied to the input tape reader to become excessively tensioned, reader tape contacts RTC which are normally closed by the presence of an input tape in the reader in readiness to be read, punch tape contacts PTC which are normally closed by the presence of tape in the output tape punch unit in readiness to be punched, and the normally closed contacts of a stop read switch S2.

Manual release of the start read switch S1 to close its contacts 3 and 4 energizes the reader clutch magnet RCM through reader cam actuated contacts SRC1 (closed between 294° of one reader cycle and 24° of the next reader cycle), the now closed contacts 5 and 6 of the read control relay RCR, the now closed contacts 3 and 4 of the start read switch S1, the normally closed contacts 1 and 2 of an intermessage gap relay IGR, and the normally closed contacts 1 and 2 of the punch control relay PCR. The input tape reader thereupon initiates a cycle of read operation, and at 60° of this cycle the punch control relay PCR is energized through reader cam actuated contacts SRC4 (closed between 60° and 220° of each reader cycle). Energization of the punch control relay PCR is maintained through the now closed contacts 27 and 28 of this relay.

At 60° of the initial and each succeeding input tape reader cycle, reader cam actuated contacts SRC3 (FIG. 2*b*) close (and remain closed to 220° of the reader cycle) to apply energization to the reader contact assemblies RC1–RC8 (FIGS. 2*b*, 2*d* and 2*f*). This energizing circuit includes either the reader common contacts RCC (closed from about 77° to about 190° of each reader cycle) or a control panel wire connection, indicated in broken lines in FIG. 2*d*, completed between the exit energizing hub R7 and the 5 channel entry hub Q6 or the 6 or 7 channel entry hub Q7 according to whether the input tape utilizes a 5 channel, 6 channel, 7 channel or 8 channel code. In connection with the use of the converter in converting to eithher a 6 channel or a 7 channel output code, a wire jumper is connected between a terminal T66 and a terminal T65 or 6 channel code conversion or between terminal T66 and a terminal T76 for 7 channel code conversion (these latter terminals being supported upon a terminal board readily accessible to the operator).

The reader contact assemblies RC1–RC3 energize code channel 1, code channel 2 and code channel 3 code conversion relays 15–22 through wire jumpers extending between terminal board terminals T1–T8 and T11–T18 and between terminals T41–T44 and terminals T51–T54 as shown in FIGS. 2*b* and 2*d*. The reader contact assemblies RC4–RC6 energize channel 4, channel 5 and channel 6 code conversion relays 23–30 through jumper wiring between terminal board terminals T21–T28 and T31–T38 and between terminals T61–T64 and T71–T74 as shown in FIGS. 2*d* and 2*f* of the drawings. Energization of this latter group of relays may alternatively be controlled by the reader contact assembly RC7 where the input tape utilizes a 7 channel or 8 channel code, and for this purpose the transfer contact No. 4 of this contact assembly is connected to the terminal T76 earlier mentioned and its stationary contacts are connected in parallel with the stationary contacts of the reader contact assembly RC6 as shown. The energization of the group of code conversion relays 23–30 may also be controlled, when the input tape uses a 5 channel code, through the normally closed contacts 4 and 3 or the normally open contacts 4 and 5 of a figures memory relay FR having its transfer contact 4 connected to the 5 channel entry hub Q6 earlier mentioned and its stationary contacts 3 and 5 connected in parallel with the stationary contacts of the reader contact assemblies RC6 and RC7 as shown. A channel 8 code conversion relay 31 may be energized by the channel 8 reader contact assembly RC8 when a jumper connection is completed between terminal board terminals T45 and T55 or may be energized by the channel 7 reader contact assembly RC7 when a jumper connection is completed between terminal board terminals T45 and T75 (FIG. 2*d*), this code conversion relay being utilized only in connection with input tapes using a 7 channel or 8 channel code.

The energization of the code conversion relays 15–31 by the reader contact assemblies RC1–RC8 as last described results, for each code read by the input tape reader, in the energization of one relay in the relay group 15–22 according to the particular permutation of the 1–2–3 code bits appearing in the code read and in energization of one relay in the relay group 23–30 according to the particular permutation of the 4–5–6 code bits appearing in the code read. For a 7 channel or 8 channel input tape, the code conversion relay 31 may additionally be energized. Assume, for example, that the input tape reader reads a 1–2–3–4–6 code. The appearance in this code of all of the 1–2–3 code bits will, by actuation of all of the reader contact assemblies RC1–RC3, effect energization of the 1–2–3 code conversion relay 22. The 4–6 code bits of the input code will, by actuation of the reader contact assemblies RC4 and RC6, effect energization of the 4–6 code conversion relay 29. By way of further example, an input code having only a channel 5 code bit would effect energization of the code conversion relay 15 by reason of the absence from the code of any channel 1, channel 2 or channel 3 code bit and would effect energization of the code conversion relay 25 by reason of the channel 5 code bit appearing in the code read at this time.

The jumper connections shown in FIGS. 2*b*, 2*d* and 2*f* between the terminals T1–T8 and T11–T18, between the terminals T41–T44 and T51–T54, between the terminals T21–T28 and the terminals T31–T38, and between the terminals T61–T64 and the terminals T71–T74 are those which cause the reader contacts RC1–RC8, considered as representing code channels 1 through 8 with respect to the guide edge of the input tape, to energize the same respective order of code conversion relay. However, these jumper connections permit extreme flexibility in the interchange between the reader contact assembly orders and the code conversion relay orders as may be desirable for convenience in handling any particular code conversion application.

Whenever any of the code conversion relays 15–31 are energized by the reader contact assemblies RC1–RC8 as just described, each is maintained energized for the remainder of the input tape reader cycle through the contacts 1 and 2 of the energized relay and hold circuits which include diode rectifier devices 34 (FIG. 2*b*), tape reader cam actuated contacts SRC2 (FIG. 2*c*) which are closed between 223° of one reader cycle and 30° of the next reader cycle, the now closed contact 7 and 8 of the punch control relay PCR, and the normally closed contacts 21 and 22 of the tape feed relay TFR.

Each of the code conversion relays 15–30 has a bank or assembly of normally open electrical contact pairs, and these are actuated to closed circuit position upon energization of the relay. The contacts of each relay are arranged in four groups indicated in FIGS. 2*b*, 2*d* and 2*f* as group 1 contacts 35, group 2 contacts 36, group 3 contacts 37 and group 4 (control) contacts 38. The electrical contacts of the several relays are electrically interconnected by groups in a manner shown in detail in FIGS. 3*a* to 3*j*, and as thus electrically interconnected establish for each input code read by the input tape reader an electrical circuit between four energizable input circuits 39–42 and four of the Exit 1, Exit 2, Exit 3 and control exit hubs of the code exit hubs heretofore described in connection with the control panel of FIG. 1. In FIGS. 2*b*, 2*d* and 2*f* representative such code exit hubs A1–A4 energized by a "blank" input code, code exit hubs B1–B4 energized by a "1" input code, code exit hubs H13–H16 energized by a 1–5–6 input code, and code exit hubs H29–H32 energized by a 1–2–3–4–5–6 input code are shown as extending to the right of the relay group contacts.

The energizable input circuit 42 for the group 4 (control) contacts is energized near the end of the input tape reader cycle through normally closed contacts 1 and 2 of a skip relay SKR, through reader cam actuated contacts SRC–5 (which are closed from 223° of one reader cycle to 30° of the next reader cycle), and through normally closed contacts 1 and 2 of the tape feed relay TFR. It is through the conversion relay group 4 contacts that early energization is applied to the control exit hubs of the control panel, these hubs totalling 64 in number as earlier explained. This energizing circuit also energizes the power source exit hubs S2, S3, S4 and S5 and the all codes exit hub Q8 as shown in FIG. 2*c*. These early energized exit cotrol hubs may or may not be used in particular code conversion applications, but for the moment it will be assumed that none are used and rather that the all codes exit hub Q8 (energized as just noted through the reader cam actuated contacts SRC–5) is wired to the nearest no precedence control entry hub P8. The reader cam actuated contacts SRC–5 under this assumption then energize, through the no precedence hub P8 and through the output tape punch cam actuated contacts SPC–6 and diode rectifier devices 43 and 45, the three energizable input circuits 39–41 of the conversion relay group 1, group 2 and group 3 contacts. This energization continues until 30° of the next reader cycle when the reader cam actuated contacts SRC–5 open, but it will be assumed for the moment that upon reading the first input code the input tape reader completes its operational cycle and halts at its home or zero degree cyclic point.

The code exit hubs of the conversion relay contact systems are wired to the code entry hubs I2 through P29 of the output punch unit according to the particular code conversion desired, as will be hereinafter explained more fully in connection with several illustrative code conversion examples. Each code exit hub when energized in the manner just explained, and by reason of the energization of two of the code conversion relays 15–30, will remain energized while the input tape reader stands at its home or zero degree cyclic position and will in turn energize any of the code entry hubs of the output punch unit to which it is wired. This effects energization of corresponding ones of the punch magnets PM1–PM8 and the concurrent energization of the punch clutch magnet PCM as earlier explained in connection with the tape feed operation, and a cycle of operation of the output tape punch unit is thereupon initiated to effect punch recording in the output tape of the converted output code.

As the output punch unit begins the cycle of operation last mentioned, the punch cam actuated contacts SPC–7 (FIG. 2*a*) close at 30° of the punch cycle (opening at 145° of the same cycle) to apply energization from the energized no precedence control hub P8 to the reader clutch magnet RCM through a diode rectifier device 45, the now closed contacts 2 and 3 of the punch control relay, the normally closed contacts 1 and 2 of the intergap relay IGR, the normally closed contacts 3 and 4 of the start read switch S1, the now closed contacts 5 and 6 of the reader control relay RCR, and the now closed reader cam actuated contacts SRC–1. This energization of the reader clutch magnet RCM initiates a new cycle of reader operation to read the next code and thereby effect actuation of the reader contact assemblies RC1–RC8, removes energization from the reader clutch magnet RCM when the reader cycle has progressed to 24° to open the reader cam actuated contacts SRC–1, interrupts the hold circuit of the previously energized code conversion relays when the reader has progressed to 30° of its cycle to open the reader cam actuated contacts SRC–2, and at this point also removes energization from the group 1 through group 4 code conversion relay contacts by reason of the opening of the reader cam actuated contacts SRC–5 (FIG. 2*c*). At 60° of this new reader cycle, the reader cam actuated contacts SRC–3 (FIG. 2*b*) close to energize the reader contact assemblies RC1–RC8 and thereby store the newly read code in two of the code conversion relays 15–30 by energization of the latter. Thereafter the code converter continues its operation in the manner just described, reading each new input code and punch recording a corresponding converted code into the output tape. For this purpose, and as earlier mentioned, each code read from the input tape should be wired to appropriate code entry hubs to punch a corresponding output code.

Occasions arise in the use of the code converter where certain codes read by the input tape reader have no equivalent in the converted output code format; that is, these input codes are not assigned to create corresponding output codes. In these instances, each such input code will energize an early exit hub of the control exit group and this hub should be wired to a convenient one of the non-punch (or non-assigned code) hubs I4–I32. The early exit control hub then has the effect of merely initiating a new cycle of reader operation by energization supplied from the non-punch hubs I4–I32 to the reader clutch magnet RCM through the now closed contacts 2 and 3 of the punch control relay PCR, normally closed contacts 1 and 2 of the intergap relay IGR, the normally closed contacts 3 and 4 of the start read switch S1, the now closed contacts 5 and 6 of the reader control relay RCR, and the reader cam actuated contacts SRC–1. No new corresponding cycle of punch operation is effected. Note in this respect, and as earlier mentioned, that each of the sixty-four input codes that the present code converter recognizes should be wired either to appropriate ones of the punch code entry hubs to effect punch recording of a corresponding converted code or to the non-punch hubs I4–I32 to be ignored in the conversion process. Otherwise operation of the converter will halt since there is no initiation of a new punch cycle which in turn initiates a new reader cycle nor is there any independent initiation of a new reader cycle effected as last described by energization of a non-punch hub I4–I32. The converter operation will also halt for similar reasons if the punch fails to record any code corresponding to an assigned converted code. Thus the non-punch hub wiring can serve as a check against forbidden code combinations and also provides a valuable check against certain malfunctions. If the converter operation should be halted in this manner, however, the punch control relay PCR remains in energized state and operation of the converter may only be resumed by manually opening the power switch S4 to deenergize the punch control relay PCR.

In certain instances it is desirable that an input code read by the input tape reader shall be converted to a blank code (a punch feed hole only) in the converted output code format. In this event, the input code will energize an early exit control hub of the control exit group and this hub is wired to one of a plurality of blank control entry hubs I1–I29 whereas none of the Exit 1, Exit 2 or Exit 3 code exit hubs are wired to any code entry hub of the output punch unit. The early exit control hub in energizing the blank control entry hub effects energization of the punch clutch magnet PCM through the punch cam actuated contacts SPC–1 to initiate a new punch cycle during which only a feed hole is punched but no output code is punch recorded.

Any given input code read by the input tape reader may be selected, if desired, to halt the converter operation. For this purpose, the input code when read will energize one of the code exit hubs of the control exit group and this hub with its early energization is wired to a convenient one of the stop hubs K4–K32. The energization of the latter hub reverse energizes the reader control relay RCR through its now closed contacts 3 and 4 and causes the read control relay RCR to move its contacts to deenergized position. The given input code selected as the stop code may also be wired to the code entry hubs of the punch unit to be recorded as a converted output code if desired. In this event the resultant cycle of punch operation is unable to initiate a new cycle of reader operation by energization of the reader clutch magnet RCM in the manner earlier described, such being prevented by the now open contacts 5 and 6 of the deenergized read control relay RCR. This cycle of punch operation does, however, effect deenergization of the punch control relay PCR by reverse energization of the latter through the now closed contacts 9 and 10 of the latter relay and the now closed contacts 21 and 22 of the read control relay RCR when the punch cam actuated contacts SPC–7 close at 30° of the punch cycle (the latter contacts being energized by the previously assumed wiring between the all codes exit Q8 and the no precedence control entry hub P8. The contacts 7 and 8 of the punch control relay PCR thereupon open to interrupt the hold energizing circuit for the energized ones of the code conversion relays 15–31 to restore these relays to their deenergized states. Operation is resumed by manually depressing and releasing the start read switch S1. However, if the input code selected as a stop code is not converted to an output code, the punch unit is not cycled and the punch control relay PCR remains energized. Resumed operation is then effected by opening the power switch S4 to deenergize the relay PCR after which the start read switch S1 is manually depressed and released.

A stop code is not required to be used at the end of the tape passing through the input tape reader. This is for the reason that the end of the tape will be sensed by the opening of the reader tape contacts RTC to interrupt the earlier described hold circuit of the read control relay RCR and thus deenergize this relay. Here again the last output code recorded by the output punch unit will deenergize the punch control relay PCR in the manner last described. This character of converter operation also prevails if the tape transported through the input tape reader should for any reason become so excessively tight as to open the reader tight tape contacts RTTC, or if the punch tape contacts PTC should open upon sensing the end of the tape transported through the output tape punch unit, or if the stop switch S2 is manually actuated to open its contacts. When the converter operation is halted for any of the reasons last mentioned, operation may be thereafter resumed merely by placing a new tape in the input tape reader, or correcting the condition causing the input tape to become excessively tight, by inserting a new supply of tape in the output tape punch unit, or by manually releasing the stop switch S2, and thereafter manually actuating the start read switch S1.

Operation of the converter may also be halted by accidental or deliberate manual actuation of the start read switch S1 to open its contacts 3 and 4 and thus interrupt the energization of the reader clutch magnet RCM. In this event, however the now closed contacts 1 and 2 of the start read switch S1 apply reverse energization to the read control relay RCR through the now closed contacts 5 and 6 of the punch control relay PCR and the contacts 3 and 4 of the read control relay RCR. This causes the read control relay RCR to become deenergized and thereby move their contacts to its deenergized positions, and the punch control relay PCR will also be reverse energized through the now closed read control relay contacts 21 and 22 as the output tape punch completes its cycle of operation to record the output code corresponding to the last input code read and temporarily stored in the code conversion relays.

It is often desirable to convert from a 6 channel, 7 channel or 8 channel input code to a 5 channel output code, such as a standard telecommunications code, requiring the punching of a "shift to letters" code before each letter code or each consecutive series of letters codes and a "shift to figures" code before each figure code or consecutive series of figures code. Each of the sixty-four input letters and figures codes read by the input tape reader and recognized by the present converter will effect energization of a corresponding code exit hub of the control exit group. Each of these control exit hubs corresponding to an input letters code is wired to a convenient one of the letters precedence control entry hubs N4–N32 and each of the control exit hubs which correspond to an input figures code is wired to a convenient one of the figures precedence control entry hubs O4–O32. During conversion to a 5 channel output code, either a letters memory relay LR (FIG. 2*a*) or a figures memory relay FR (FIG. 2*c*) will become energized upon reading the first letters or figures code and will remain energized until the reading of the next respective figures code or letters code.

Thus assume for the moment that the code converter has just been placed in operation so that neither the figures memory relay FR nor the letters memory relay LR has yet been energized, and assume further that the first input code read is a letters code. This input letters code will effect energization of one of the letters precedence control entry hubs N4–N32 and through the latter effect energization of the punch magnets PM1, PM2, PM3, PM4 and PM5 (to punch an output "shift to letters" code) through the punch cam actuated contacts SPC2, the normally closed contacts 21 and 22 of the letters memory relay LR, and through a diode rectifier device 46 to the circuit of the code entry hubs P1–P29 (which effect punching of the 1–2–3 portion of the output "shift to letters" code) and through a rectifier device 47 to the circuit of the code entry hubs K2–K30 (which effect punching of the 4–5 portion of the "shift to letters" output code). The energization of the punch magnets PM1–PM5 last described effects concurrent energization of the punch clutch magnet PCM through the punch cam actuated contacts SPC1 and the diode rectifier devices D14. This initiates a cycle of punch operation to effect punch recording of an output "shift to letters" code. Note, however, that during this cycle of the punch unit no punch code entry hubs are energized since the conversion relay contacts are not yet energized through the diode rectifier devices 43 and the punch cam actuated contacts SPC6. This is for the reason that the contacts last mentioned must be energized from the letters precedence control entry hub N4–N32 and the normally open contacts 28 and 29 of the letters memory relay LR, but the latter relay has not yet been itself energized under the initial start up conditions previously assumed. As the output punch unit proceeds through its cycle of operation to punch record the output "shift to letters" code, the punch cam actuated contacts SPC3 (FIG. 2*a*) close at 145° of the punch cycle and energize the letters memory relay LR through the normally closed contacts 1 and 2 of the figures memory relay FR. The letters memory relay LR maintains itself energized through the normally closed contacts 1 and 2 of the figures memory relay FR, the now closed contacts 24 and 25 of the letters memory relay LR, and the normally closed contacts 1 and 2 of the tape feed relay TFR. This initial cycle of the punch unit does not energize the reader clutch magnet RCM through the punch cam actuated contacts SPC7 since the energizing circuit from the energized one of the letters precedence control entry hubs N4–N32 includes the normally open contacts 28 and 29 of the letters memory relay LR and the latter contacts do not close until after the letters memory relay is energized as last mentioned at 145° of the punch cycle at which time the punch cam actuated contacts SPC7 open.

Thus the reader remains at its home or zero degree cyclic position and maintains the letters precedence control entry hub N4–N32 energized. After the letters memory relay has been energized by the punch cam actuated contacts SPC3 at 145° of the punch cycle, the now closed contacts 28 and 29 of the letters memory relay LR enable the energized one of the letters precedence control entry hubs N4–N32 to energize the conversion relay contact systems <u>35–37</u> through the diode rectifier 45 and punch cam actuated contacts SPC6 which close at 300° of this initial punch cycle and remain closed until 120° of the next punch cycle. Accordingly, the input letters code read by the input tape reader at this time causes the code conversion relay contacts <u>35–37</u> to energize corresponding code exit hubs which are wired to energize the punch code entry hubs according to the code conversion desired. The energized code entry hubs energize the corresponding punch magnets PM1–PM5 and, through the diode rectifier devices D14 and the punch cam actuated contacts SPC1 (which close at 290° near the end of this initial punch cycle), energize the punch clutch magnet PCM to initiate a cycle of punch operation and thereby effect punch recording of a corresponding converted output code. The reader clutch magnet RCM is now energized during this newly initiated operating cycle of the output punch, this energizing circuit extending from the energized one of the letters precedence control entry hubs N4–N32 through the now closed contacts 28 and 29 of the letters memory relay LR, the diode rectifier device 45, the punch cam actuated contacts SPC7, the now closed contacts 2 and 3 of the punch control relay PCR, the normally closed contacts 1 and 2 of the intergap relay IGR, the normally closed contacts 3 and 4 of the start read switch S1, the now closed contacts 5 and 6 of the reader control relay RCR, and the now closed reader cam actuated contacts SRC1.

Upon reading each succeeding input letters code by the input tape reader, the now open contacts 21 and 22 of the letters memory relay LR prevent any further punching of a "shift to letters" code by the output punch unit. Further, the now closed contacts 28 and 29 of the letters memory relay LR cause each succeeding cycle of punch operation to initiate a new cycle of reader operation by energization of the reader clutch magnet RCM from the energized one of the letters precedence control entry hubs N4–N32 (wired to be energized each time an input letters code is read) through the energizing circuit last traced.

Assume now that an input figures code is read by the input tape reader. The earlier mentioned wiring of the corresponding code exit hub in the control exit group now effects energization of a selected one of the figures precedence control entry hubs O4–O32. This energization reverse energizes the letters memory relay through the punch cam actuated contacts SPC–4 (closed from 300° of one punch cycle to 120° of the next punch cycle), the normally closed contacts 21 and 22 of the figures memory relay FR, and the now closed contacts 27 and 26 of the letters memory relay LR. The latter relay thereupon becomes deenergized and moves its contacts to their deenergized positions. At the same time, the punch cam actuated contacts SPC4 and the normally closed contacts 21 and 22 of the figures memory relay FR apply energization both through a diode rectifier device 50 to the energizing circuit of the code entry hubs M1–M29 and through a diode rectifier device 51 to the energizing circuit of the code entry hubs K2–K30 to effect energization of the punch magnets PM1, PM2, PM4 and PM5. This energization of the punch magnets is concurrently applied through diode rectifier devices D14 and the punch cam actuated contacts SPC1 to the punch clutch magnet PCM to initiate a cycle of punch operation during which a "shift to figures" code 1–2–4–5 is punch recorded in the output tape.

The energization of the shift to figures control entry hub M4–M32 does not energize the conversion relay contacts at this time, and even though the letters relay LR has been deenergized to close its contacts 3 and 4, since this energizing circuit includes the yet opened contacts 7 and 8 of the figures memory relay FR which has not yet been energized. However, at 145° of the punch cycle which punch records the output "shift to figures" code, the punch cam actuated contacts SPC5 energize the figures memory relay FR through the normally closed contacts 1 and 2 of the latter, energizing power being obtained from the energized one of the figures precedence control entry hub O4–O32. During the punch cycle in which this occurs, the reader clutch magnet RCM is not energized to initiate a new cycle of reader operation since the energizing circuit from the control entry hubs O4–O32 includes the normally open contacts 28 and 29 of the figures memory relay FR. These contacts do not close until after the latter relay is energized at 145° of the punch cycle by the punch cam actuated contacts SPC5, and by this time the punch cam actuated contacts SPC7 have opened and thus interrupt the energizing circuit for the reader clutch magnet RCM.

At 300° of the punch cycle in which the "shift to figures" output code is punched, the conversion relay contacts are energized from the energized one of the figures precedence control entry hubs O4–O32 through the now closed contacts 28 and 29 of the figures memory relay FR, the diode rectifier device 45, the punch cam actuated contacts SPC6, and the diode rectifier devices 43. The particular input figures code read by the input tape reader at this time now effects energization of appropriate ones of the punch code entry hubs to energize corresponding ones of the punch magnets PM1–PM5, and concurrent energization of the punch clutch magnet PCM, to effect punch recording of a corresponding converted output code. During this punch cycle, the reader clutch magnet RCM is energized from the energized one of the figures precedence control entry hubs O4–O32 through the now closed contacts 28 and 29 of the figures memory relay FR, the diode rectifier device 45, and the punch cam actuated contacts SPC7 to the reader clutch magnet energizing circuit earlier traced.

Upon reading each succeeding input figures code by the input tape reader, the now open contacts 21 and 22 of the figures memory relay FR prevent any further punching of a "shift to figures" code by energization supplied through the diode rectifier devices 50 and 51 as earlier explained. Also, the now closed contacts 28 and 29 of the figures memory relay FR causes each succeeding punch cycle of operation to initiate a new reader cycle of operation by energization of the reader clutch magnet RCM from the energized one of the figures precedence control hubs O4–O32 which as earlier explained are wired to be energized each time an input figures code is read by the input tape reader.

When the next input letters code is read by the input tape reader, one of the letters precedence control hubs N4–N32 is energized to effect punching of an output "shift to letters" code, the concurrent reverse energization of the figures memory relay FR through its now closed contacts 26 and 27, the subsequent punch recording of the converted output letters code, and the subsequent initiation of a further input tape reader cycle of operation in the manner earlier described.

Certain 5 channel output codes are often common to both letters and figures shifts, such as the 5 channel conventional telecommunications code for carriage return, line feed, and space. When any input code falls in this category, the corresponding code exit hub of the control exit group is wired to a convenient one of the no precedence control entry hubs P4–P32. The resulting operation is then that previously described for 6 channel, 7 channel, and 8 channel code conversions and no shift codes are punched.

As just explained, the punching of figures shifts and letters shift output codes into the output tape when converting to a 5 channel code is normally accomplished by automatic operation of the code converter. However there are applications where it is desired to punch into the output tape letters shift codes or figures shift codes at places where they are not required by the logic of the coding itself. For example, assume that the output tape is to be encoded with the following codes: letters shift code, B, figures shift code, tab code, figures shift code, figures shift code. In this encoding the first figures shift code would be one created automatically by operation of the code converter. The second and third figures shift codes would not be automatically created, however, since the logic of the coding is already specified by the encoding of the first figures shift code. In these instances, additional input codes can be used to cause the punching of these extra shift codes which are hereinafter referred to for convenience as "artificial" figures shift codes and letters shift codes.

Assume, for example, that an input code 1–2–3–4–5–6–7 has been selected to cause punching of an artificial letters shift code 1–2–3–4–5 in the output tape (as is often required in 5 channel tape for buffering purposes) and that a 1–2–3–4–5 input code is to cause punching of an artificial figures shift code 1–2–4–5. For this purpose, the control exit hub H32 energized by the 1–2–3–4–5–6 input code is wired to the adjacent shift to letters control entry hub L32, and the control exit hub B32 energized by the input code 1–2–3–4–5 is wired to the shift to figures control entry hub M32. Also the code exit hubs H29 and H30 (energized by the 1–2–3–4–5–6 input code) are wired to the respective code entry hubs P29 and K30 to effect a code conversion to a 1–2–3–4–5 shift to letters output code, and the code exit hubs B29 and B30 (both energized by the input 1–2–3–4–5 code) are wired to the respective code entry hubs M29 and K30 to convert this input code to a 1–2–4–5 figures shift output code. Upon reading a 1–2–3–4–5–6 input code, the shift to letters control entry hub L32 is energized and directly energizes the letters memory relay LR through a diode rectifier device 54. The normally closed contacts 1 and 2 of the letters memory relay LR thereupon open to deenergize the figures memory relay FR if the latter is energized at this time. The normally open contacts 7 and 8 of the letters memory relay LR thereupon close to energize the conversion relay contacts 35–38 from the energized shift to letters control entry hub L32 through a circuit which includes the now closed contacts 6 and 7 of the figures memory relay FR, the diode rectifier device 45, the punch cam actuated contacts SPC6, and the diode rectifier devices 43. Energization of the conversion relay contacts causes the energization of the code entry hubs P29 and K30 to effect punching of an output letters shift code 1–2–3–4–5 and initiate a new cycle of the input tape reader operation.

In similar manner, the reading of an input code 1–2–3–4–5 effects energization of the shift to figures control entry hub M32 and the latter directly energizes the figures memory relay FR through a diode rectifier device 55. The normally closed contacts 1 and 2 of the latter relay open to deenergize the letters memory relay LR if energized at this time, and the normally closed contacts 3 and 4 of the letters relay LR and the now closed contacts 7 and 8 of the figures memory relay FR apply energization to the conversion relay contacts 35–38 through the diode rectifier device 45 and punch cam actuated contacts SPC6 to the diode rectifier devices 43. A figures shift code 1–2–4–5 is thereupon punched into the output tape and a new cycle of operation of the input tape reader is initiated.

In those applications of the code converter where the code of an input tape is to be converted to a standard telecommunications code in the output tape, it is often desirable to create in the output tape a carriage return code (having a code bit in the fourth channel only) followed by a line feed code (having a code bit in the second channel only) whenever a carriage return code is read from the input tape. In the event that several consecutive carriage return codes are read from the input tape, it is desirable that only the first of this series shall create in the output tape this combination of an initial carriage return code followed immediately by a line feed code and that succeeding ones of the input carriage return codes shall create in the output tape only a corresponding line feed code. For example, assume that four consecutive carriage return codes are read from the input tape; the resultant coding of the output tape should then include an initial carriage return code followed by four consecutive line feed codes.

This may be accomplished in the present converter by wiring the control exit hub corresponding to the input carriage return code to a convenient one of the auto line feed control entry hubs J4–J32. The energized one of the latter hubs then applies energization through the punch cam actuated contacts SPC9 (closed at 320° of one punch cycle and opened at 120° of the next punch cycle), normally closed contacts 21 and 22 of a line feed relay LFR, and a diode rectifier device 56 to the punch magnet PM4 and concurrently through one of the diodes D14 and the punch cam actuated contacts SPC1 to the punch clutch magnet. This initiates a cycle of punch operation to record in the output tape a carriage return code. At 145° of this punch cycle, the energization of the energized auto line feed hub J4–J32 is applied through punch cam actuated contacts SPC8 and a diode rectifier device 59 to a line feed relay LFR to energize this relay.

The normally open contacts 9 and 10 of the line feed relay LFR establish a hold circuit for this relay through the normally closed contacts 1 and 2 of the tape feed relay TFR and the diode rectifier device 59.

The line feed relay LFR contacts 26 and 27 close and apply the energization of the energized one of the auto line feed hubs J4–J32 through the punch cam actuated contacts SPC6 at 300° of this punch cycle to the conversion relay contacts 35–37. The input carriage return code is wired to the code entry hubs of the punch unit to create an output line feed code, so that upon energization of the conversion relay contacts as last mentioned the punch magnet PM2 and punch clutch magnet PCM are energized to record in the output tape an immediately succeeding line feed code. At 30° of this second punch punch cycle, the punch cam actuated contacts SPC7 close to apply the energization of the energized one of the auto line feed hubs J4–J32 to the reader clutch magnet RCM to initiate a new cycle of reader operation. During this second cycle of punch operation, the contacts 21 and 22 of the line feed relay LFR are open to prevent energization of the punch magnet PM4 by the energized one of the auto line feed hubs J4–J32. If the next input code read is also a carriage return code, one of the auto line feed hubs J4–J32 is again energized to effect reenergization of the code conversion contacts 35–37 through the now closed contacts 26 and 27 of the line feed relay LFR and the punch cam actuated contacts SPC6. The line feed relay contacts 21 and 22 are open at this time and prevent energization of the punch magnet PM4 by the energized one of the auto line feed hubs J4–J32, so that the second input carriage return code read merely creates and records in the output tape a corresponding line feed code. This same operation prevails for each succeeding input carriage return code read. The next input code following the last of these carriage return codes will have its control exit hub wired to a letters or figures precedence or no precedence control entry hub, and accordingly will effect reverse energization of the line feed relay LFR through its now closed contacts 28 and 29 and cause the contacts of this relay to restore to their deenergized positions.

It was earlier explained in connection with the manner of energization of the code conversion relays by the reader contact assemblies that, in converting from a 5 channel input code to a 6 channel, 7 channel or 8 channel output code, the energized and deenergized states of the figures memory relay FR were used for purposes of interpreting the 5 channel input code. This will be evident from FIGS. 2*d* and 2*f* where an electrical connection is made between the exit hub R7 and the 5 channel entry hub Q6 whenever a 5 channel input tape is read, and this has the result that the movable transfer contact 4 of the figures memory relay FR is electrically connected to the reader cam actuated contacts SRC3. During the reading of an input letters code or succession of letters codes, the figures memory relay FR is deenergized and its normally closed contacts 3 and 4 apply energization from the reader cam actuated contacts SRC3 to the reader contact assembly RC5 in the same manner as though a 6 channel input code were being read (with the exit hub R7 electrically connected to the 6 channel entry hub Q7) and this code had no 6 channel code bit (the reader contact assembly RC6 non-transferred). However, during reading of an input figures code or consecutive series of figures code when the figures memory relay FR is energized, the energization of the reader cam actuated contacts SRC3 is applied through the now closed contacts 4 and 5 of the figures memory relay FR to the reader contact assembly RC4 much in the same manner as though a 6 channel code were being read and the presence of a 6 channel code bit had caused transfer of the reader contact assembly RC6. Thus the energized and deenergized states of the figures memory relay FR enables interpretation of identical 5 channel input codes but which in the input tape are preceded by "shift to letters" and "shift to figures" codes.

It will be seen from FIGURES 2*a* and 2*b* that energization of one of the non-punch (non-assigned code) entry control hubs I4–I32 effects direct energization of the reader clutch magnet RCM through the now closed contacts 2 and 3 of the punch control relay PCR, the normally closed contacts 1 and 2 of the inter-gap relay IGR, the normally closed contacts 3 and 4 of the start read switch S1, the now closed contacts 5 and 6 of the read control relay RCR, and the reader cam actuated contacts SRC1. Thus energization of a non-punch control entry hub merely initiates a new cycle of reader operation without effecting any code conversion and without initiating a cycle of output punch operation. It may be noted in this respect, and as earlier mentioned, that each of the sixty-four codes which the present code converter recognizes should be wired either to the punch code entry hubs to effect punch recording of a corresponding code conversion or should be wired to one of the non-punch hubs I4–I32 to be ignored in the conversion process. Otherwise operation of the converter will halt since there is then no initiation of a new punch cycle, which in turn initiates a new reader cycle, nor is there any independent initiation of a new reader cycle effected as just described by energization of a non-punch hub I4–I32.

It will also be seen from FIGS. 2*a* and 2*b* that energization of one of the blank control entry hubs I1–I29 effects direct energization of the punch clutch magnet PCM through the punch cam actuated contacts SPC1, thus initiating a cycle of punch operation during which only a feed hole is punched and no output code is recorded.

It was previously pointed out that energization of the tape skip control entry hub X9, with subsequent energization of the skip restore hub Y9, enables the converter completely to skip or bypass designated portions of the input tape. In order to accomplish this, two codes of the input tape are assigned as the tape skip code and the skip restore code. The tape skip code when read will cause the skipping operation to start, and the skip restore code will halt the skip operation and cause normal code conversion operations to resume. Energization of the skip code control entry hub X9 is effected as earlier explained through the 1–2–3 bit selectors and the 4–5–6 bit selectors from the power source exit hubs S2–S5 which are energized through the reader cam actuated contacts SRC5 when the input tape reader has completed 223° of its cycle. The energized skip entry hub X9 effects direct energization of the skip relay SKR through a diode rectifier device 60. A hold circuit is thereupon established for this relay through the now closed contacts 9 and 10 of the skip relay SKR and the normally closed contacts 1 and 2 of the tape feed relay TFR. The now closed contacts 26 and 27 of the skip relay SKR energize the circuit of the non-punch control entry hubs I4–I32, and thereby effect direct energization of the reader clutch magnet in the manner earlier described with reference to non-punch hub energization. This causes the input tape reader to progress through successive cycles of reading operation. The normally closed but now open contacts 1 and 2 of the skip relay SKR prevent energization of the conversion relay control group 4 contacts 38 and this in turn prevents any energization of the conversion relay contact groups 35–37 as would otherwise be normally effected through a control entry hub and the punch cam actuated contacts SPC6. Accordingly the input tape reader operates without effecting concurrent code conversions or without operation of the output tape punch. When a skip restore input code is read to energize the skip restore control entry hub Y9 through the 1–2–3 bit selectors and 4–5–6 bit selectors from the power exit hubs S2–S5, the skip control relay SKR is reverse energized through its now closed contacts SKR 28 and 29 to deenergize this relay and restore its contacts to their deenergized positions. The skip relay SKR contacts 1 and 2 now close to permit normal energization of the conversion relay contacts 35–38, and the skip restore code may accordingly be converted to an output code if desired.

It was earlier pointed out that for certain applications of the code converter it is desirable to create intermessage gaps in the output tape comprised by a series of from seven to ten blank codes (the output punch effecting the punching of feed holes only). This is accomplished as earlier explained by energization of one of the gap entry hubs O3–O31, which directly energize an intermessage gap relay IGR through a diode rectifier device 61. The energization of this relay also quickly charges a condenser 62 (having a value, for example, of 100 microfarads) through a resistor 63 of relatively small value (for example 150 ohms), and the condenser upon being thus charged maintains the relay IGR energized until the charge of the condenser is dissipated through an adjustable resistor 64 (having a maximum value, for example, of 10,000 ohms) and through the resistor 63 and the resistance of the winding of the relay IGR. The resistor 64 is adjustable to adjust the energized interval of the relay IGR to the desired number of successive output punch cycles to effect creation of the desired succession of blank codes in the output tape. Since intermessage gap generation is used only with the creation of an output tape utilizing a 6 channel, 7 channel or 8 channel code format, the previously described all codes-no precedence wiring between the all codes exit hub Q8 and the no precedence control entry hub P8 is normally employed.

Energization of the intergap relay IGR deenergizes the punch control relay PCR by energization supplied from the no precedence control entry hub P8 through the diode rectifier device 45, the punch cam actuated contacts SPC7, the now closed contacts 2 and 3 of the punch control relay PCR, the now closed contacts 2 and 3 of the intergap relay IGR, and the now closed contacts 9 and 10 of the punch control relay PCR. Upon deenergization of the punch control relay PCR, the punch clutch magnet PCM is energized through the punch cam actuated contacts SPC1, the now closed contacts 24 and 25 of the relay IGR, and the normally closed contacts 21 and 22 of the punch control relay PCR. This causes the output tape punch to operate through successive cycles until the intergap relay IGR is again deenergized. During this time the reader clutch magnet RCM is deenergized by interruption of its energizing circuit at the contacts 1 and 2 of the intergap relay IGR so that the input tape reader operation is halted.

Upon deenergization of the intergap relay IGR, its contacts 1 and 2 again close to apply energization to the reader clutch magnet RCM through the now closed contacts 1 and 2 of the punch control relay PCR, the now closed contacts 1 and 2 of the relay IGR, the normally closed contacts 3 and 4 of the start read switch S1, the now closed contacts 5 and 6 of the reader control relay RCR, and the reader cam actuated contacts SRC1. At 60° of this newly initiated reader cycle, the reader cam actuated contacts SRC4 reenergize the punch control relay PCR so that normal code conversion operations resume. The contacts 4 and 5 (FIG. 2*b*) of the intergap relay IGR energize the gap exit hub P3 during the period of energization of the intergap relay. This permits the wiring of this exit hub P3 to the adjacent non-punch control entry hub I4 in the event that the input code used to create the intermessage gap is not to be converted to a corresponding output code for recording in the output tape prior to the intermessage gap.

The special selector No. 1, special selector No. 2, and special selector No. 3 previously discussed in reference to the control panel of FIG. 1, have circuit arrangements shown in FIGS. 2*e*, 2*g* and 2*h*. The special selector No. 1 includes a relay SSR–1 which may be energized from the pick entry hub Q13 through a diode rectifier device 58, and which upon being energized may be thereafter deenergized by reverse energization supplied through the drop entry hub Q15 and the now closed contacts 28 and 29 of the relay SSR–1. The special selector No. 2 similarly includes a relay SSR–2 which may be energized from the pick entry hub Q21 through a diode rectifier device 65 and which, upon completion of wiring between its "independent" hubs Q18 and R18, may be deenergized by reverse energization supplied through the drop entry hub Q23 and the now closed contacts 9 and 10 of relay SSR–2. The special selector No. 3 also includes a relay SSR–3 which is energized from the pick entry hub Q29 through a diode rectifier device 66, this relay being similarly deenergized by reverse energization supplied through the drop entry hub Q31, the now closed contacts 9 and 10 of relay SSR–3, and through wiring connecting the "independent" hubs Q25 and R25. The special selector No. 1 relay SSR–1 completes a hold energizing circuit through its normally open contacts 9 and 10, the special selector relay SSR–2 completes a hold energizing circuit through its normally open contacts 26 and 27 and wiring completed between its "independent" hubs Q17 and R17, and the special selector relay SSR–3 likewise completes a hold energizing circuit through its normally open contacts 26 and 27 and wiring between its "independent" hubs Q26 and R26.

The selector No. 1 relay SSR–1 upon becoming energized completes an electrical circuit through its normally open contacts 26 and 27 between the pick entry hub Q13 and the pick exit hub Q14, and in the deenergized state of this relay an electrical circuit is completed through the normally closed contacts 21 and 22 of relay SSR–1 between the drop entry hub Q15 and the drop exit hub Q16. The relay SSR–1, the selector relay SSR–2, and the relay SSR–3 each has three sets of transfer contacts connected directly to common, normal and transfer hubs identified by the row and column position which they occupy on the control panel of FIG. 1.

The selector No. 2 relay SSR–2 has normally closed selector contacts 21 and 22 which in the deenergized state of this relay electrically connect the "1C" transfer entry common terminal hub T20 and independent hub Q19 to the normal exit hub S20, and has normally open transfer contacts 28 and 29 which in the energized state of the relay connect the entry common hub T20 to the exit transfer hub R20 and to the pick exit hub Q22. The relay SSR–2 has its "2C" transfer entry common hub T21 electrically connected ot the drop entry hub Q23, has normally closed contacts 1 and 2 which in the deenergized state of the relay connect the last-mentioned hubs Q23 and T21 to the normal exit hub S21 and the drop exit hub Q24, and includes normally open contacts 9 and 10 which in the energized state of this relay connect the transfer entry common hub T21 and drop entry hub Q23 to the transfer exit hub R21 and the independent hub Q18.

The selector No. 3 relay SSR–3 has a similar complement of normally open and normally closed and similar circuit arrangement to the selector No. 2 relay just described.

The selector No. 2 and selector No. 3 arrangements are operated independently of the selector No. 1 arrangement by completing in the No. 2 and No. 3 selectors wiring between the three sets of independent hubs provided for each as indicated in broken lines. If either of these selectors is not operated independently, wiring completed between the "add to select No. 1" exit and entrance hubs S19, T19 or S27, T27 causes the selector to be energized concurrently with the selector No. 1 by energizing potential applied to the pick entry hub Q13. In this event, the hold energization circuit for the relay SSR–1 through its normally open contacts 9 and 10 also provides a hold circuit for the concurrently operated selector relay through its associated diode rectifier 65 or 66 so that deenergization of the relay SSR–1 also effects deenergization of the concurrently operated selector relay. Each of the selector relays SSR–2 and SSR–3 operates three sets of transfer contacts terminating in entry and exit hubs individually identified in FIGS. 2*g* and 2*h*.

The present code converter has provision for effecting either an even or odd parity check on each converted code punch recorded in the output tape. This parity checking also provides a check against failure to punch any converted code when one should have been punched in the output tape. To this end, a parity check contact system 67 (FIG. 2*c*), hereinafter described in more detail, may be connected as desired through an even parity check terminal T10 or an odd parity check terminal T9 to a terminal T19 connected to a parity error relay PER. The terminals T9, T10 and T19 are provided on a terminal board easily accessible to the operator. Failure of the output punch unit to punch a converted code having an even number of code bits will cause the parity check contact system 67 to energize the terminal T10 which, if wired to the terminal T19, energizes the parity error relay PER. Similarly, failure of the output punch unit to punch a converted code having an odd number of code bits causes the parity check contact systems 67 to energize the terminal T9 which by wiring to the terminal T19 will effect energization of the parity error relay PER.

The parity error relay PER when energized establishes a hold circuit through its contacts 1 and 2 and the contacts 1 and 2 of the tape feed relay TFR. This hold circuit requires a tape feed operation, effected as earlier described by manual actuation of the tape feed switch S3, in order to restore the parity error relay PER to its deenergized state. While the parity error relay PER is energized, its now closed contacts 5 and 6 energize a parity indicator lamp 68 (FIG. 2*c*) to provide a visual indication that a parity error or punch failure has occurred. Operation of the input tape reader is also halted by opening of the parity error relay PER contacts 3 and 4 to interrupt the hold circuit of the read control relay RCR, thus causing the contacts 5 and 6 of the latter relay to open and prevent further energization of the reader clutch magnet RCM. This halt of the input tape reader operation leaves the punch control relay PCR in energized state. Resumption of operation is accordingly effected by opening the power switch S4 for a short interval to deenergize the punch control relay PCR, by manual actuation of the tape feed switch S3 to effect at least one cycle of tape feed operation of the punch unit and concurrently to deenergize the parity error relay PER, and by manual actuation and release of the start read switch S1 to reenergize the read control relay RCM and the punch control relay PCR. The converter may be operated without parity checking, of course, by omitting any wiring between the terminal T19 and either of the terminals T9 or T10.

In conversion applications involving the creation of a 5 channel output tape, it is possible to utilize the benefit of the parity checking operation just described by creating an artificial parity check code bit applicable to each converted code recorded in the output tape. This is accomplished by so wiring the code entry hubs of the control panel that a seventh channel code bit is added to any output code which has an even number of bits in its format. Thus a 1–2 output code becomes a 1–2–7 code, a "blank" output code becomes a seven code, a 1–4 output code becomes a 1–4–7 code, etc. The output tape used for a five channel output code does not have sufficient physical width to receive any seventh channel code punching even though the seventh channel punch pin of the punch unit is operated. Nevertheless the parity check contacts associated with the seventh channel punch pin are actuated with actuation of this pin, so that the parity check contact system 67 checks for odd parity of each recorded output code including the artificial seventh channel code bit. It was previously explained that, in creating a five channel output tape, a 1–2–3–4–5 letters shift code and a 1–2–4–5 figures shift code is automatically recorded prior to each letter or series of letters read from the input tape and prior to each figure or series of figures read from the input tape. The letters shift code has five code bits in its format and thus has odd parity, and the automatically created figures shift code has an artificial seventh channel parity check code bit added to it by wiring the seventh bit code entry hub J3 to the figures code parity exit hub R4 which is energized through a diode rectifier 69 concurrently with the previously described energization of the diode rectifier devices 50 and 51 in effecting the automatic recording of a figures shift output code. Thus, for parity checking purposes, the automatically recorded figures shift output code is changed from a 1–2–4–5 code to a 1–2–4–5–7 odd parity code. It is for this purpose that the figures code parity exit hub R4 is provided on the control panel.

Figure 3A:
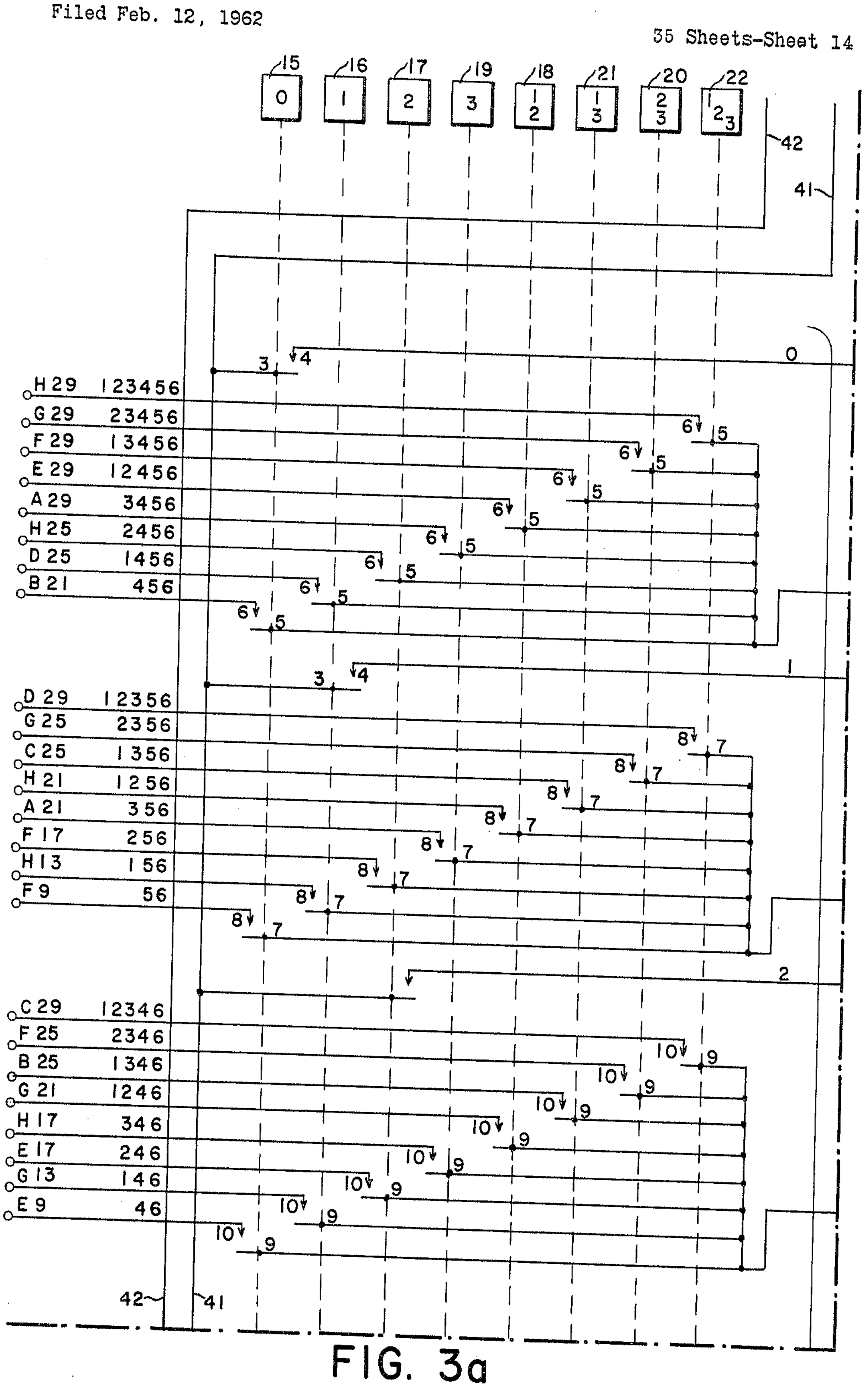
Figure 3B:
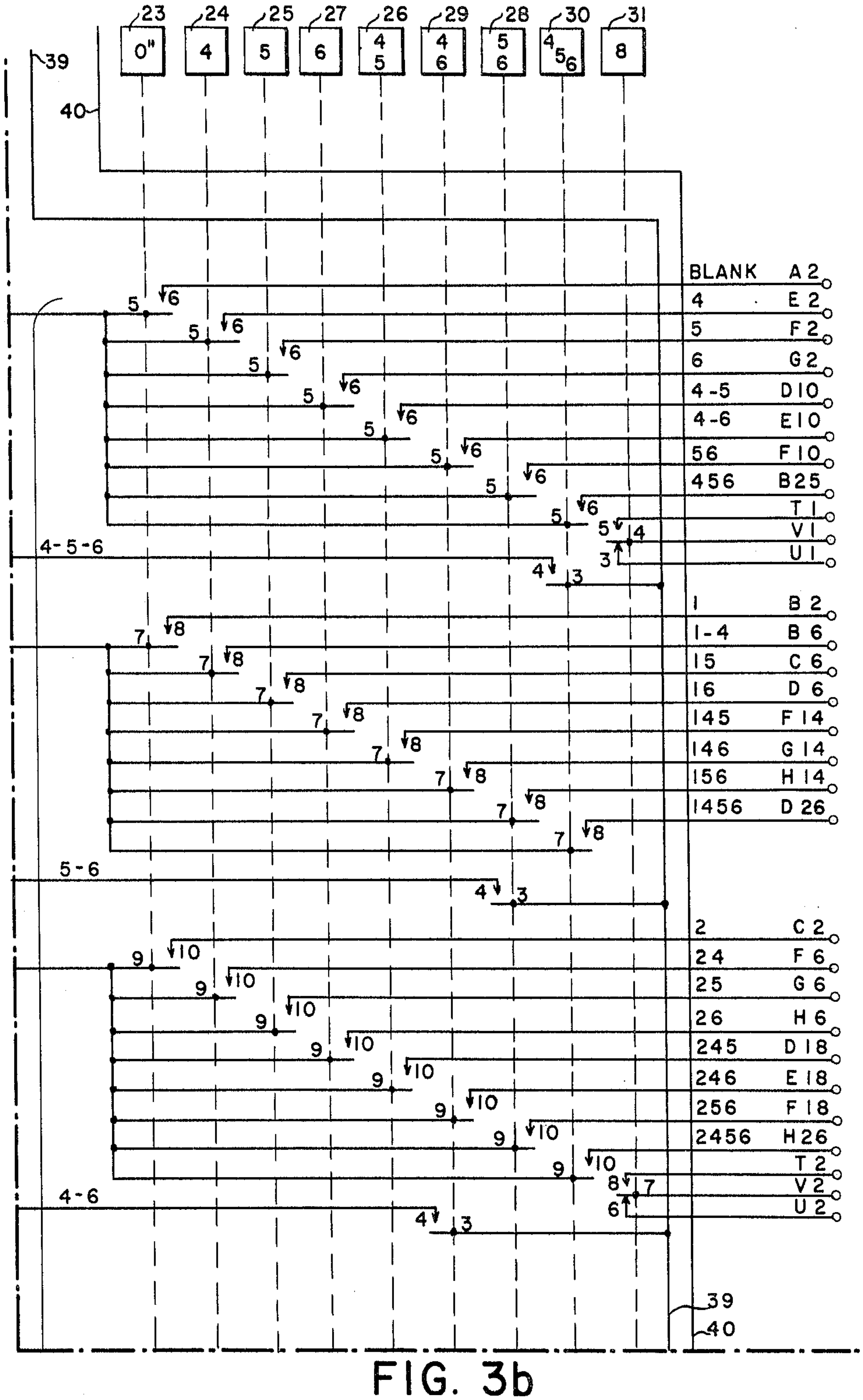
Figure 3C:
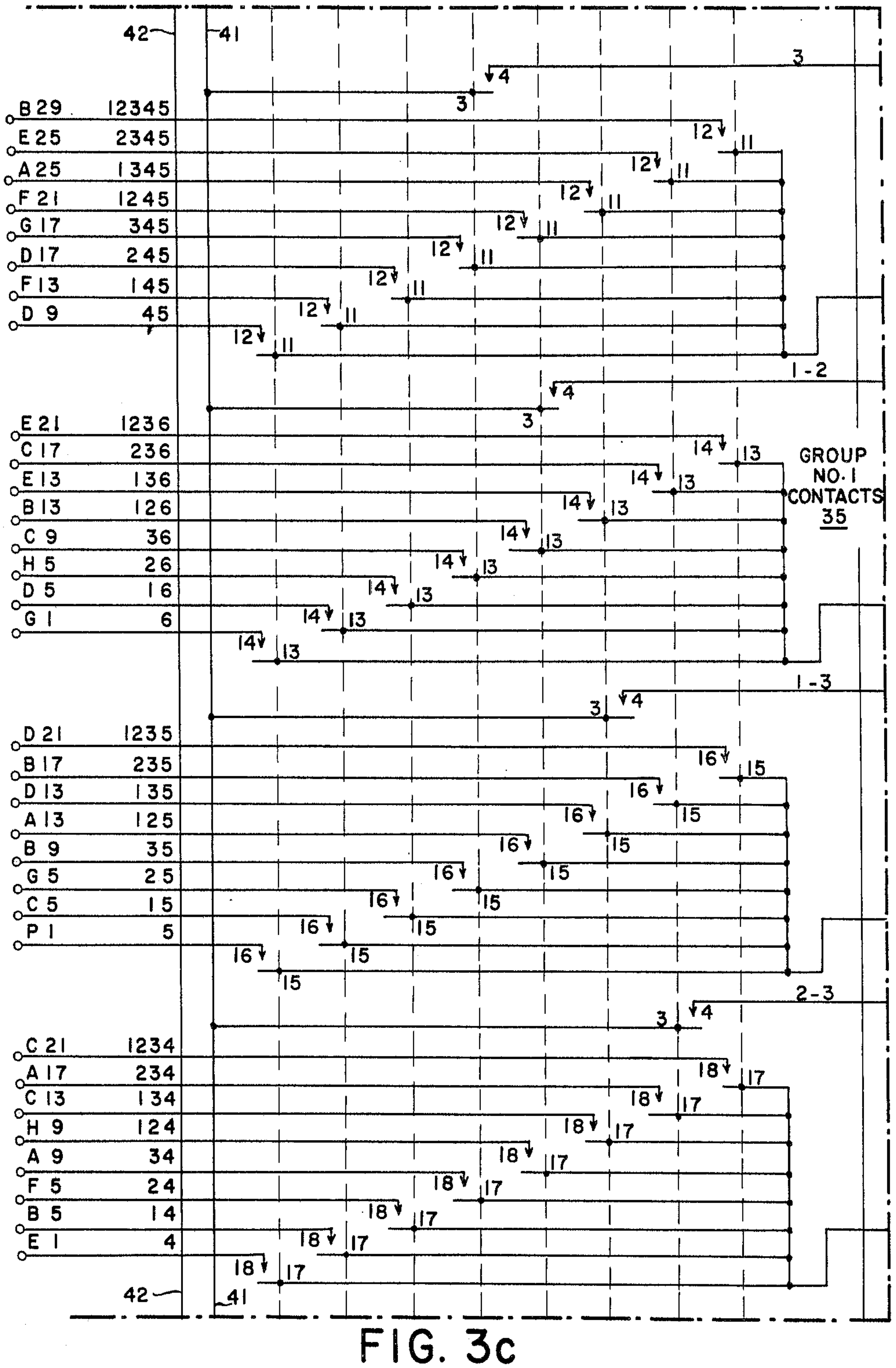
Figure 3D:
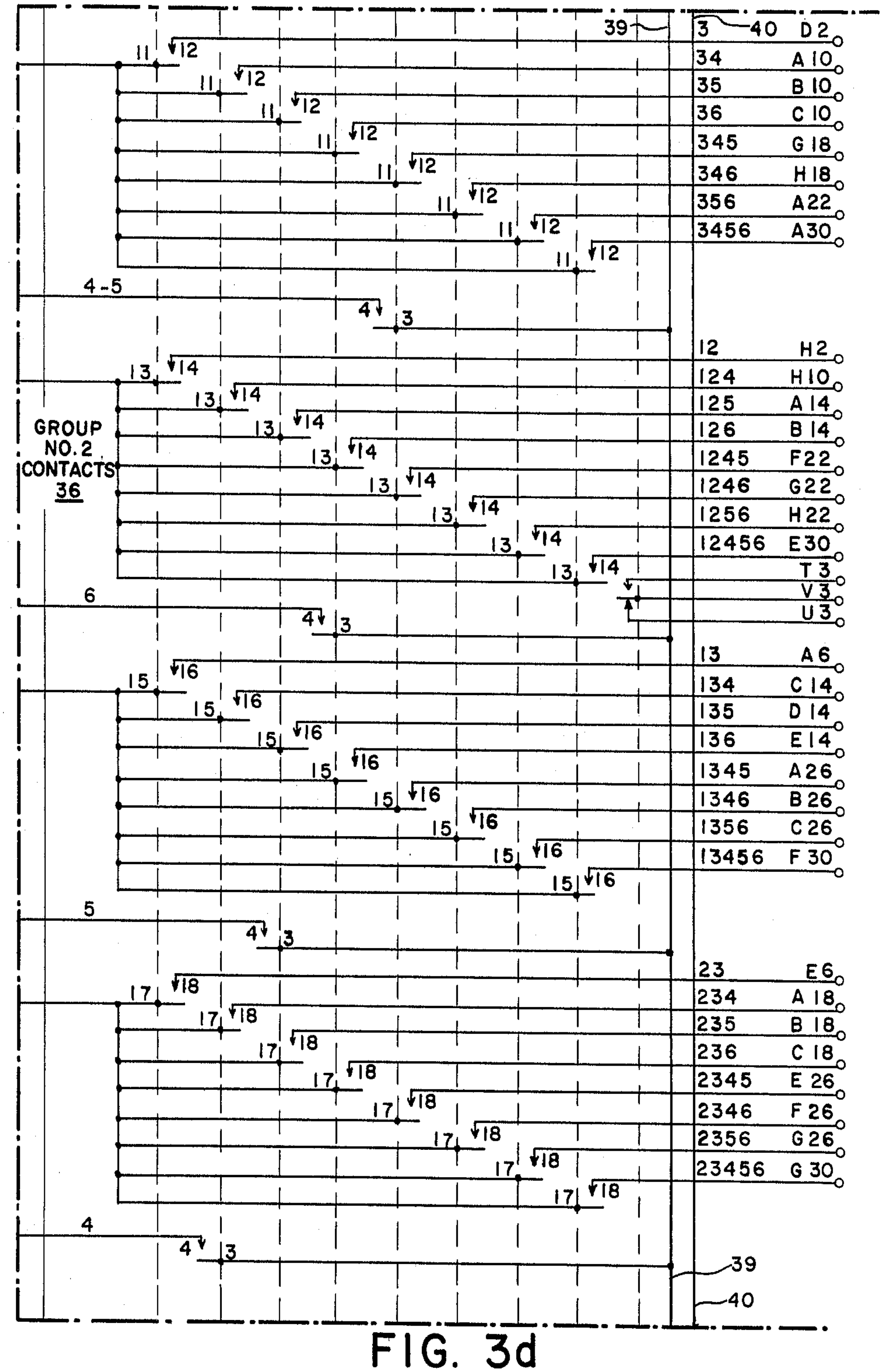
Figure 3E:
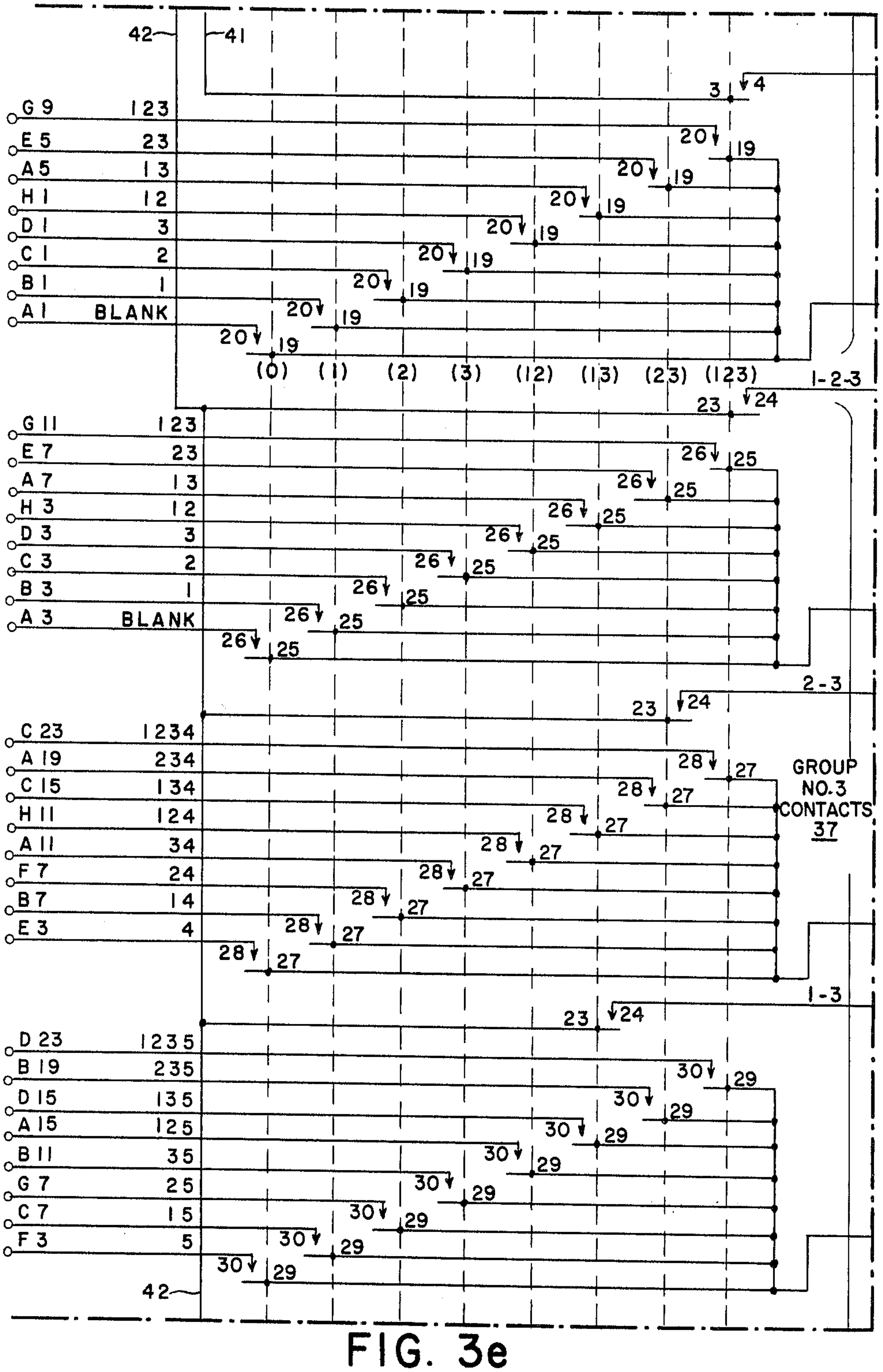
Figure 3F:
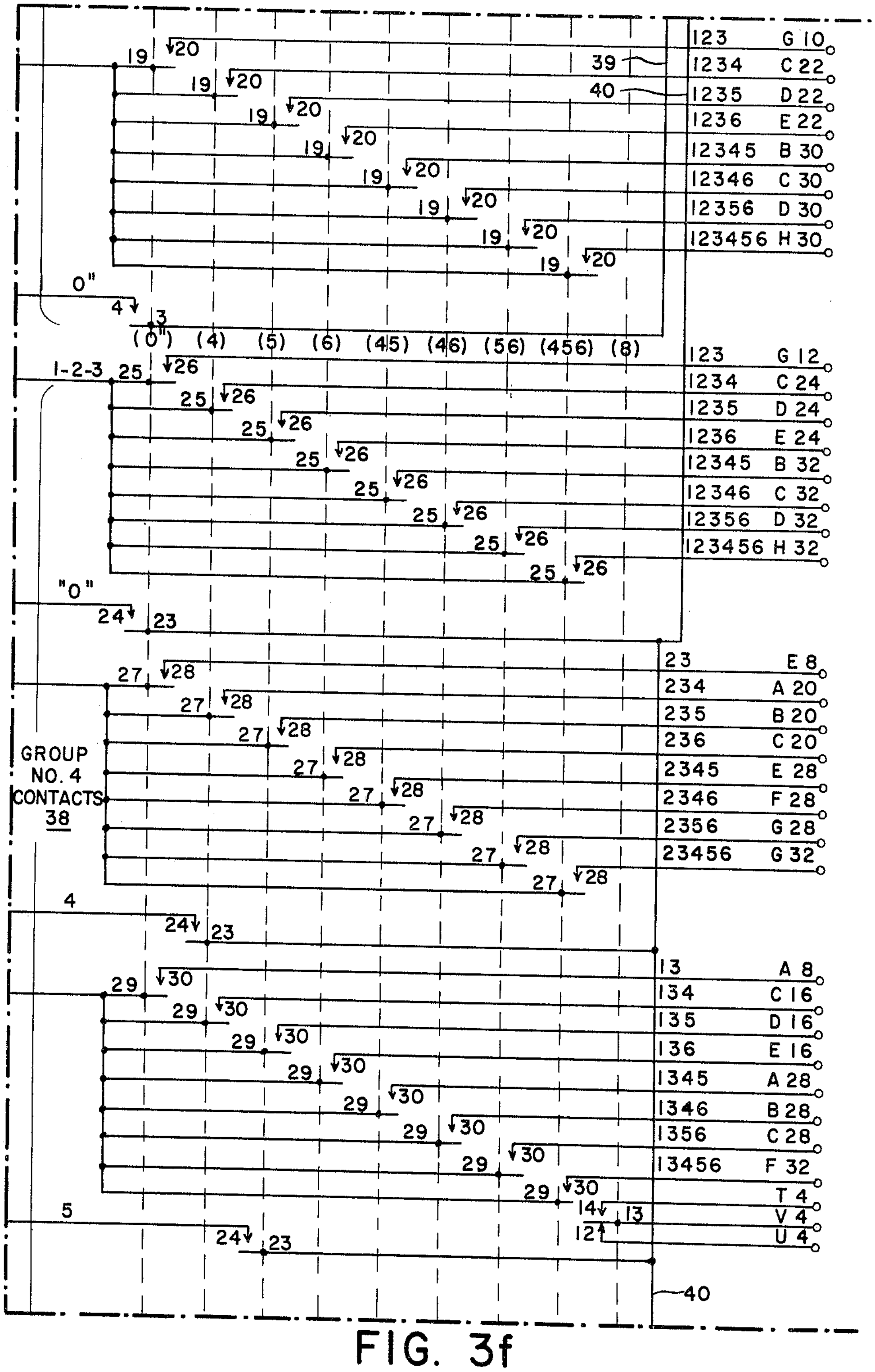
Figure 3G:
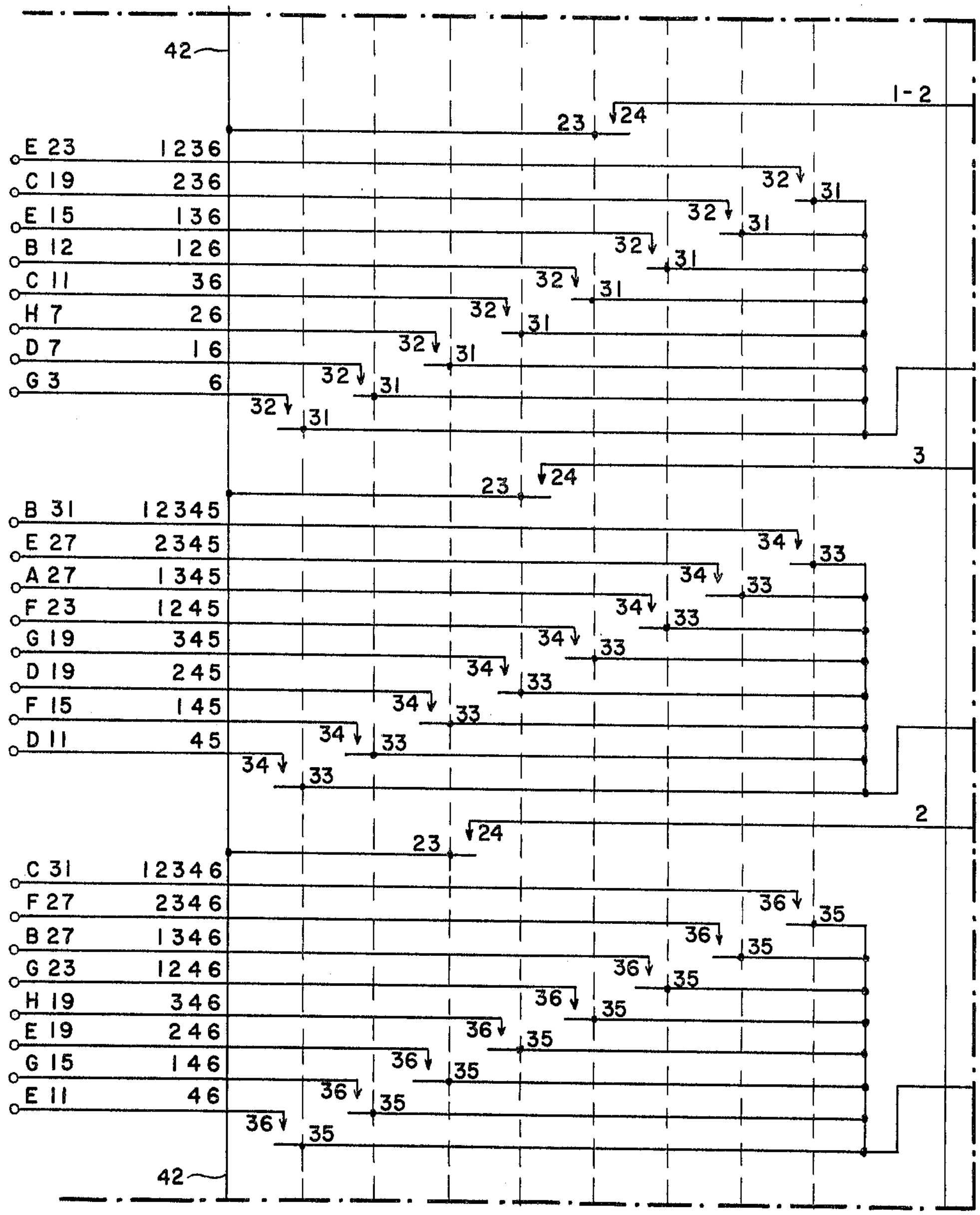
Figure 3H:
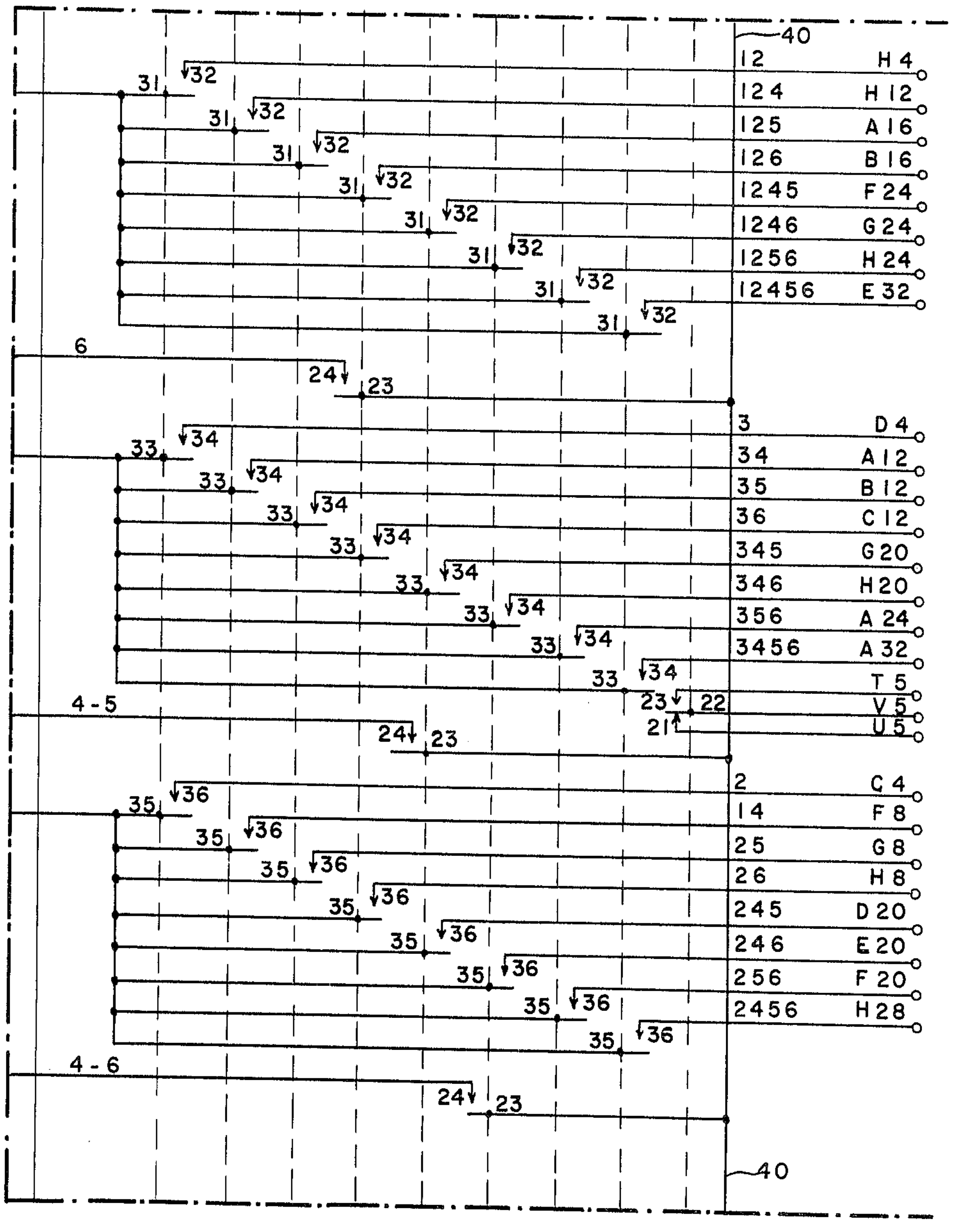
Figure 3I:
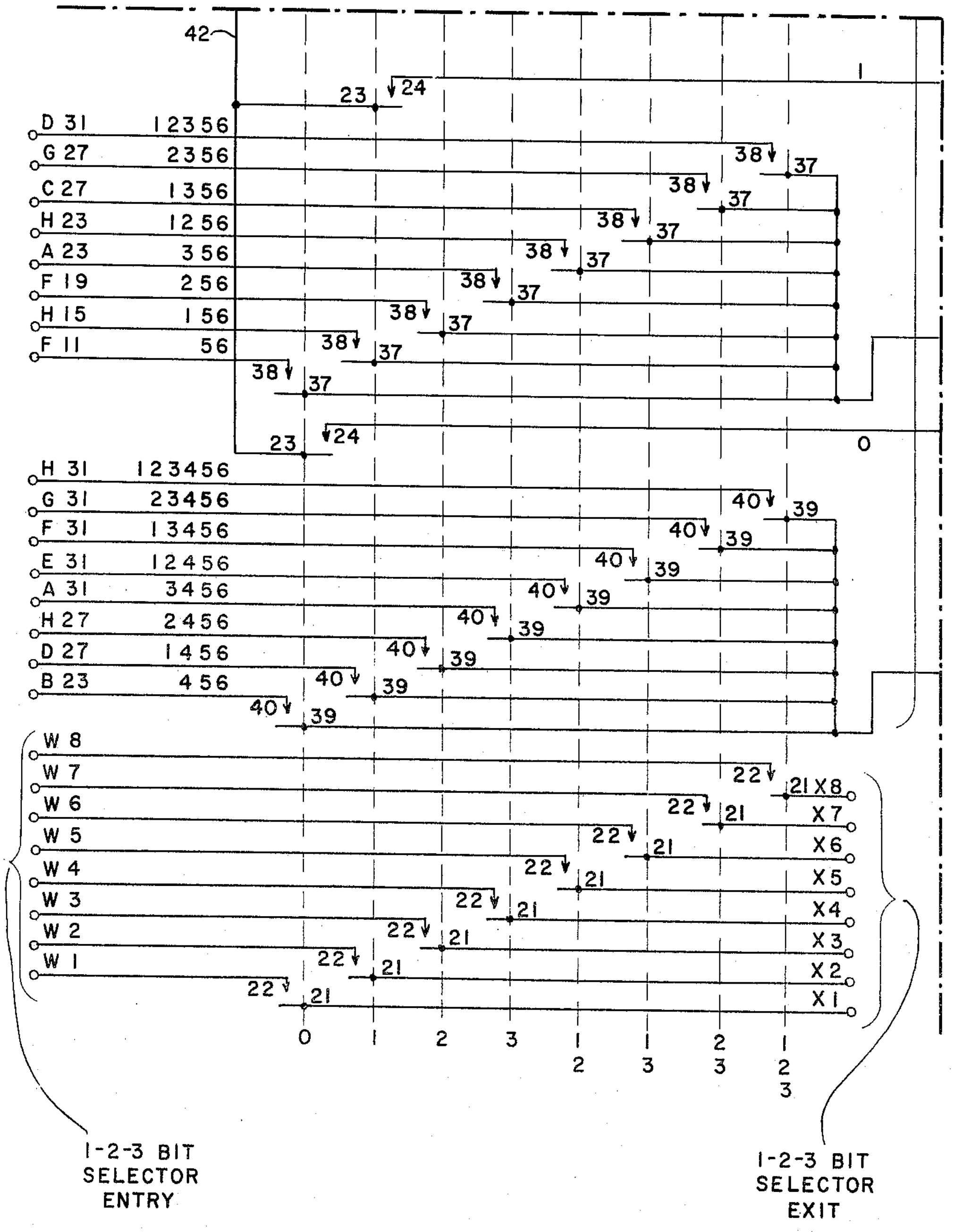
Figure 3J:
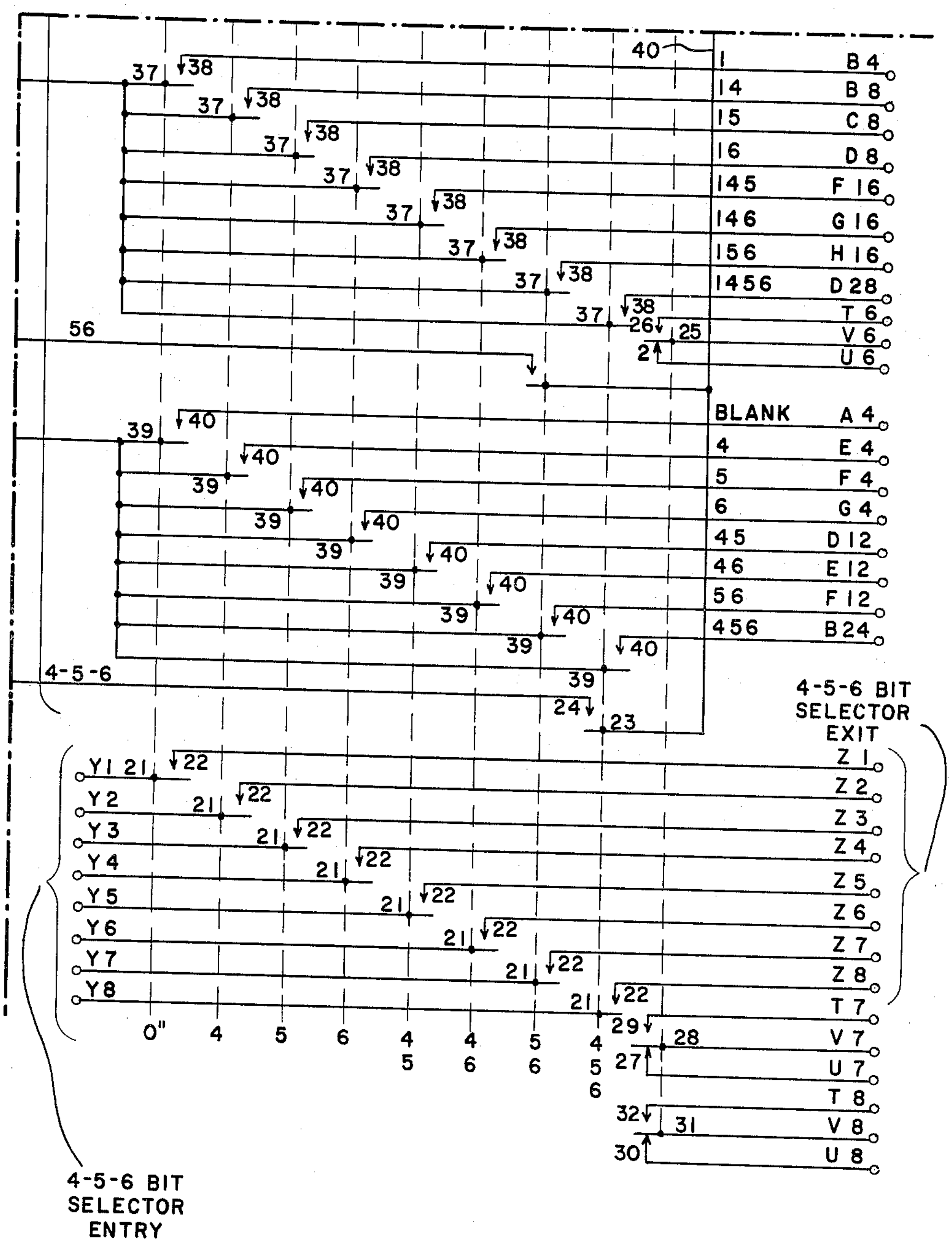
Figure 5A:
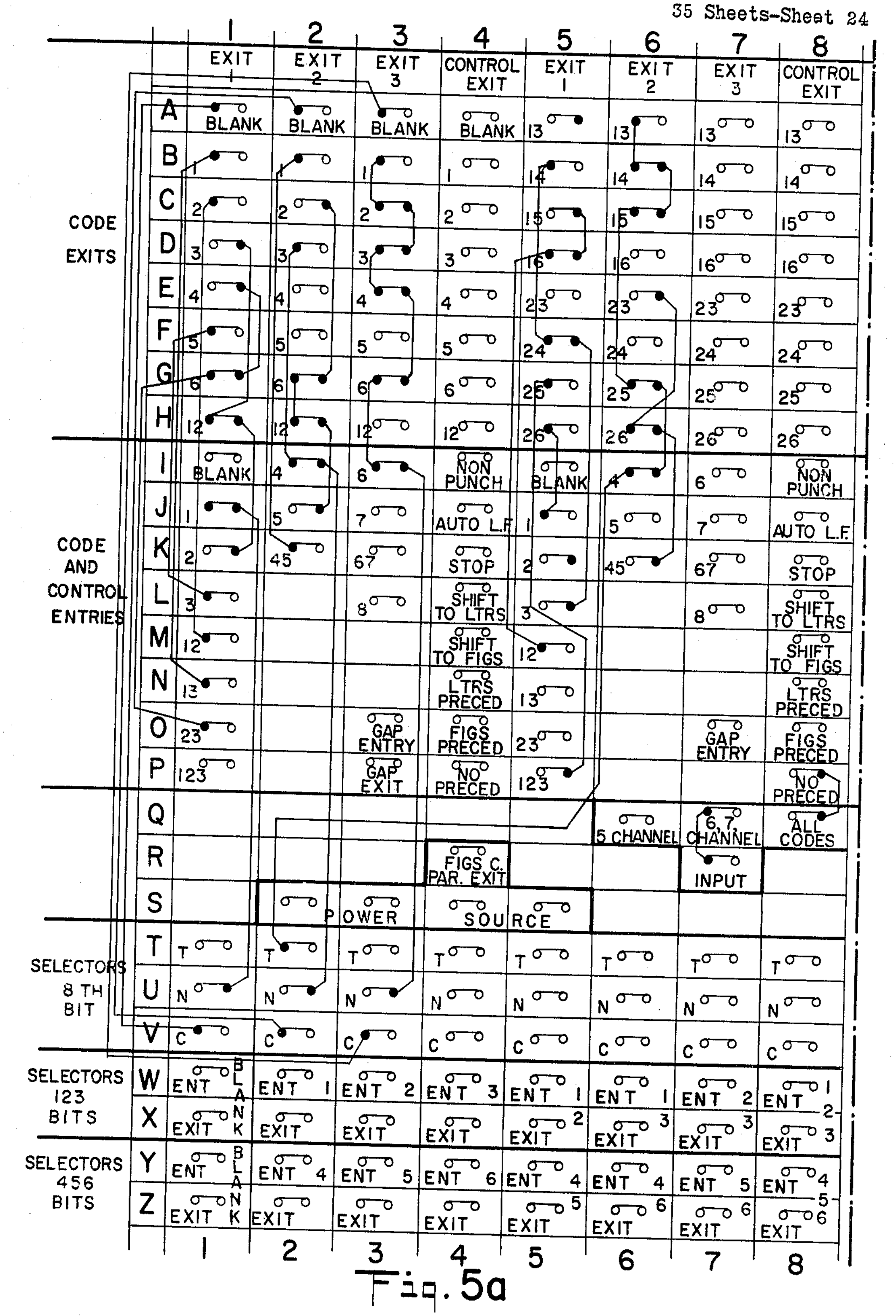
Figure 5B:
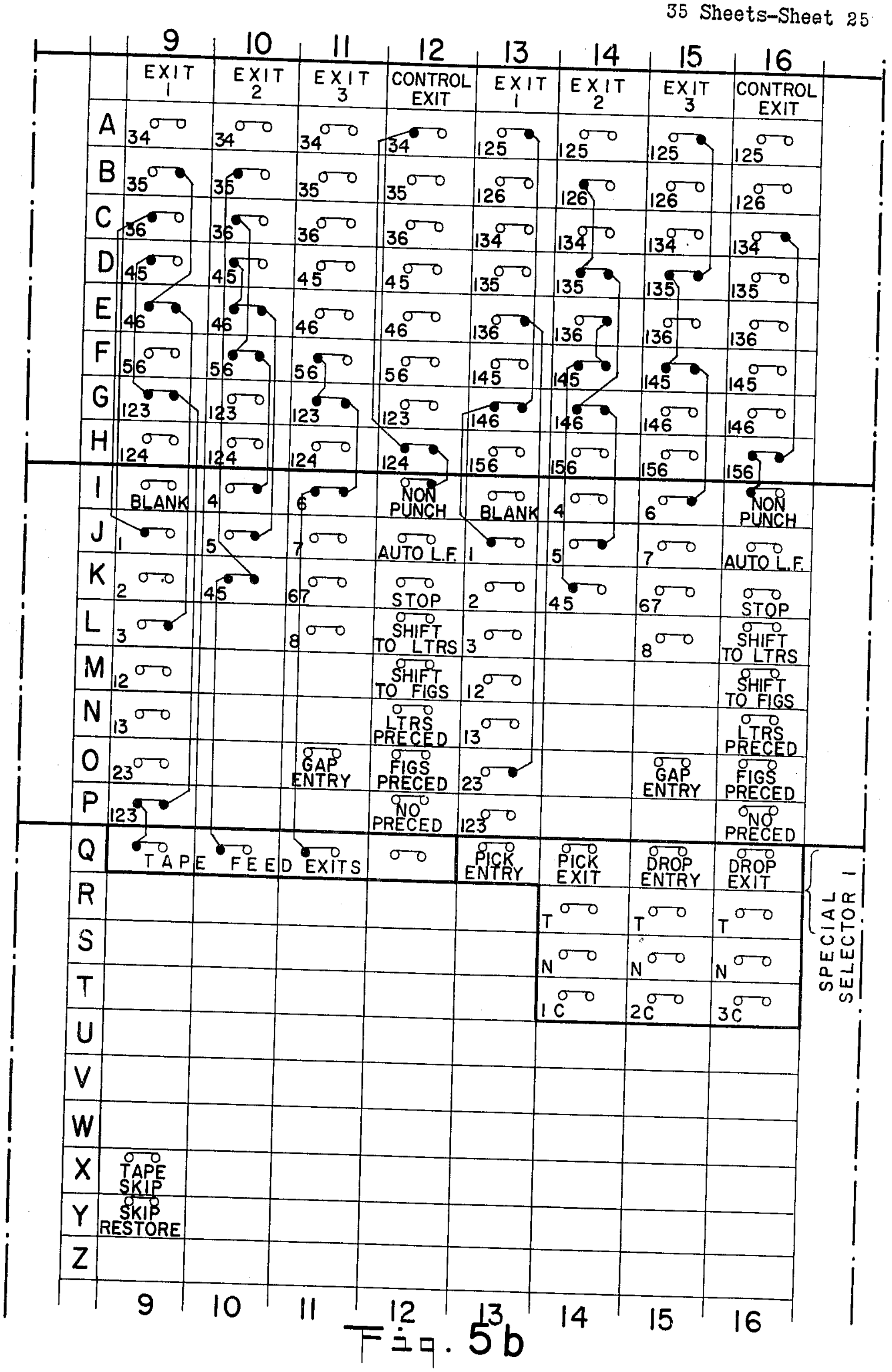
Figure 5C:
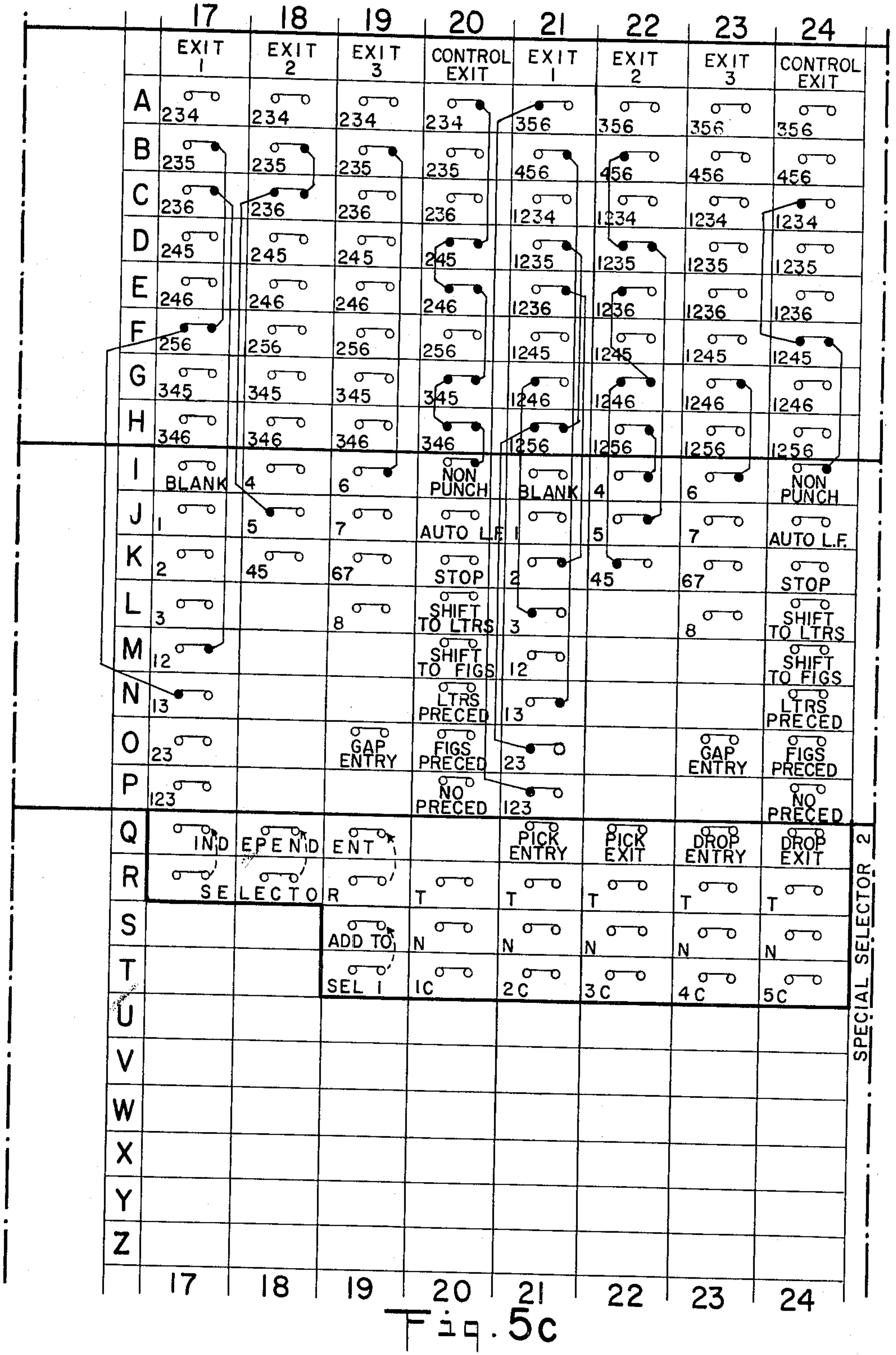
Figure 5D:
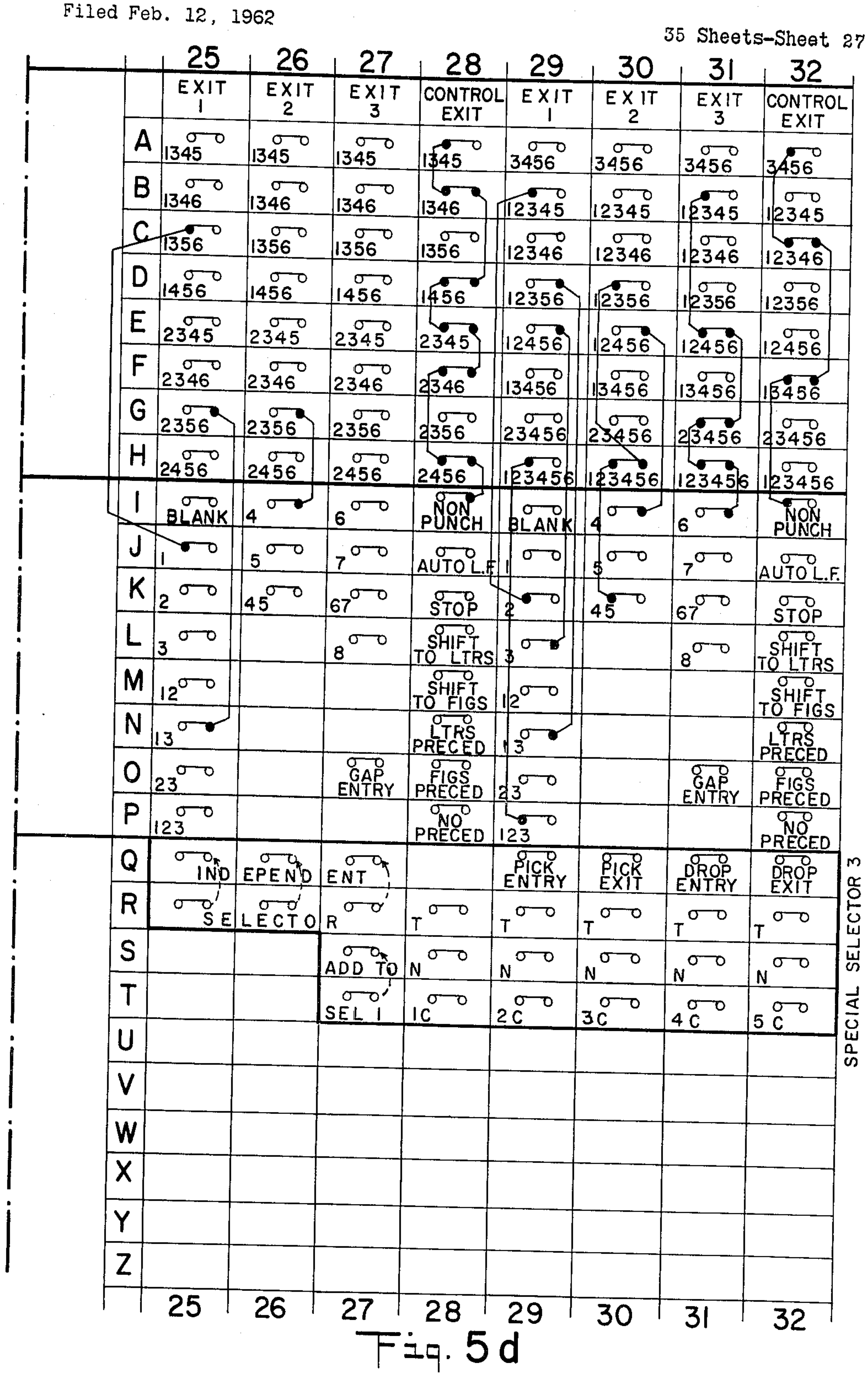
Figure 6A:
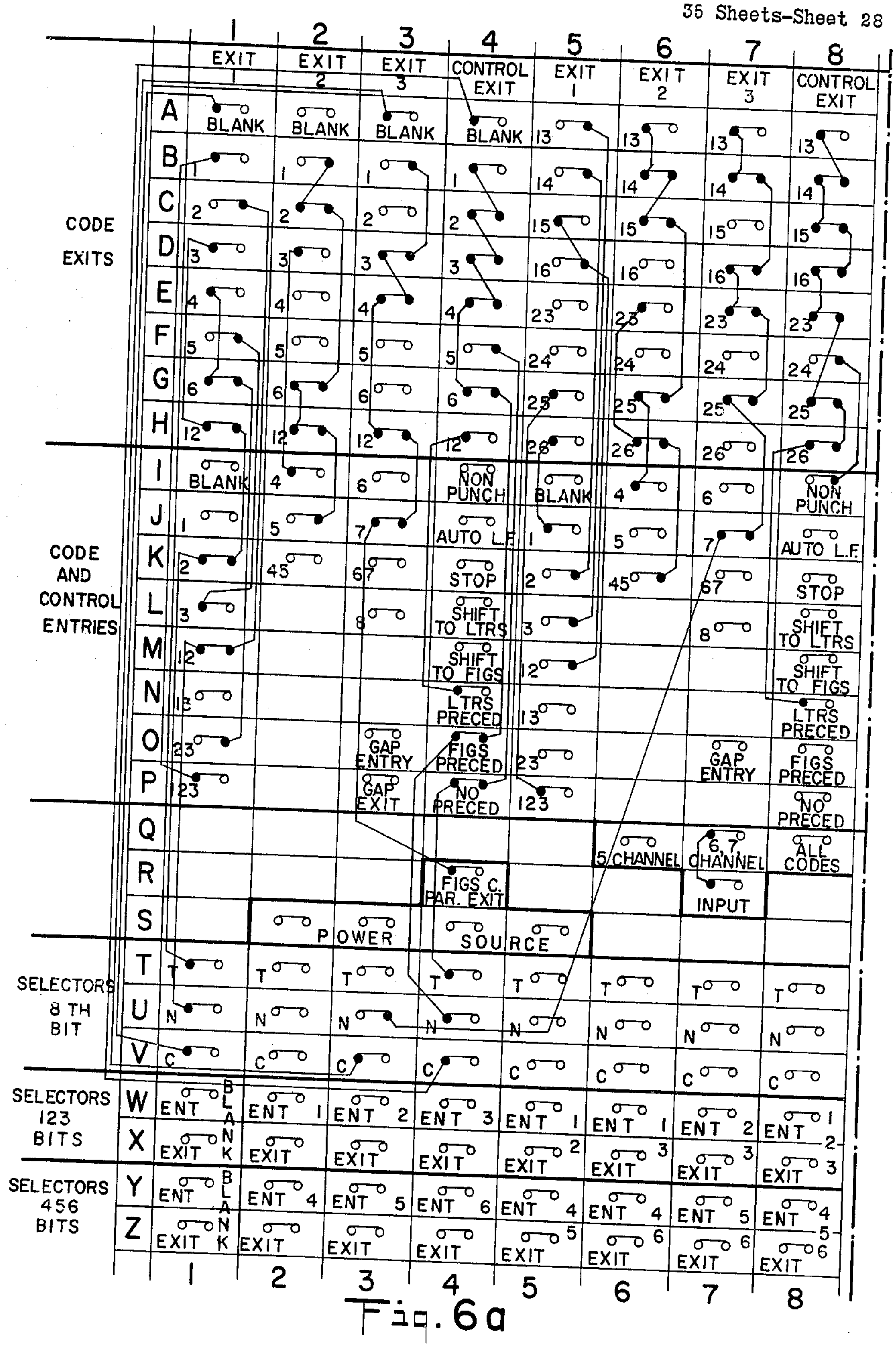
Figure 6B:
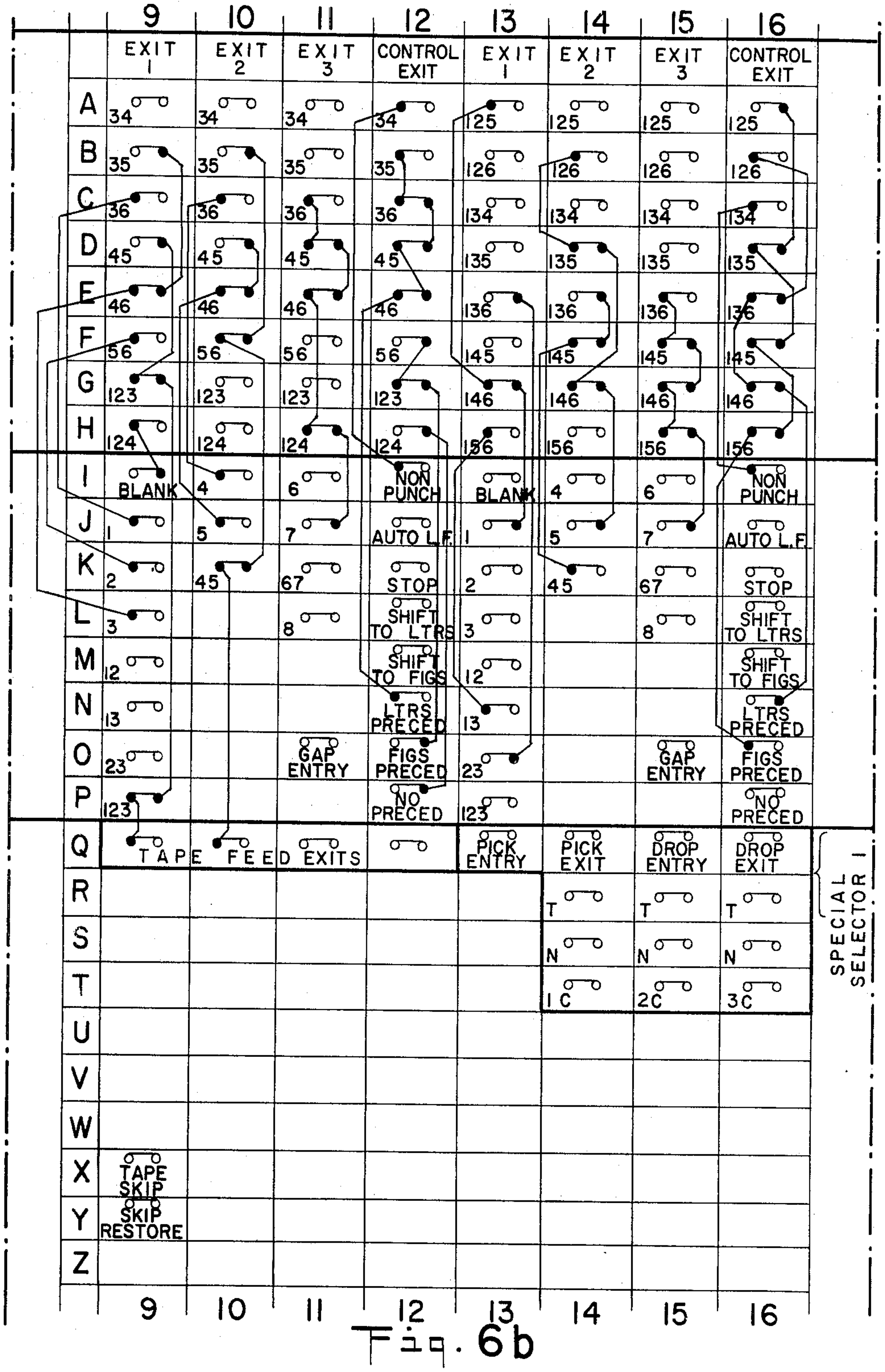
Figure 6C:
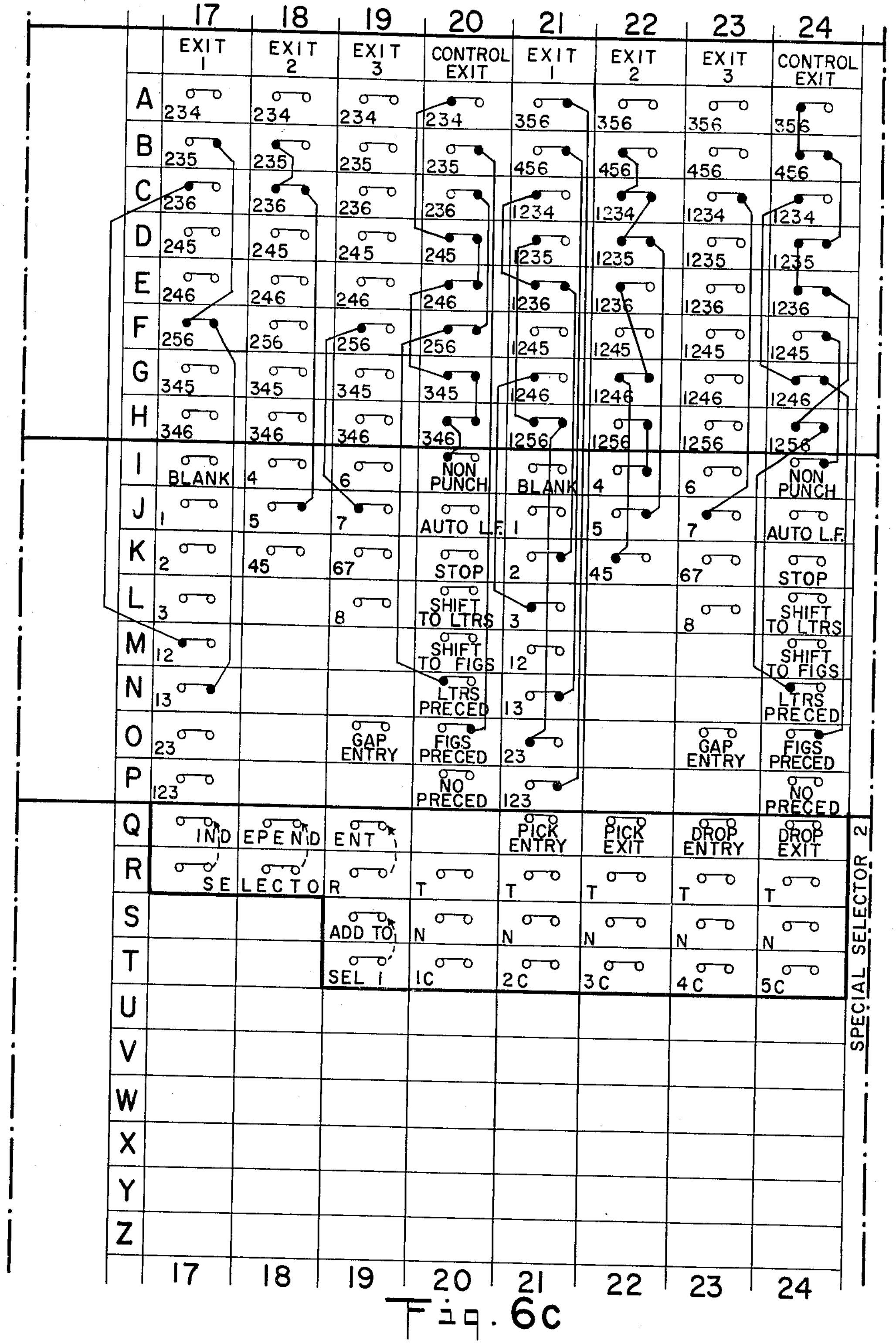
Figure 6D:
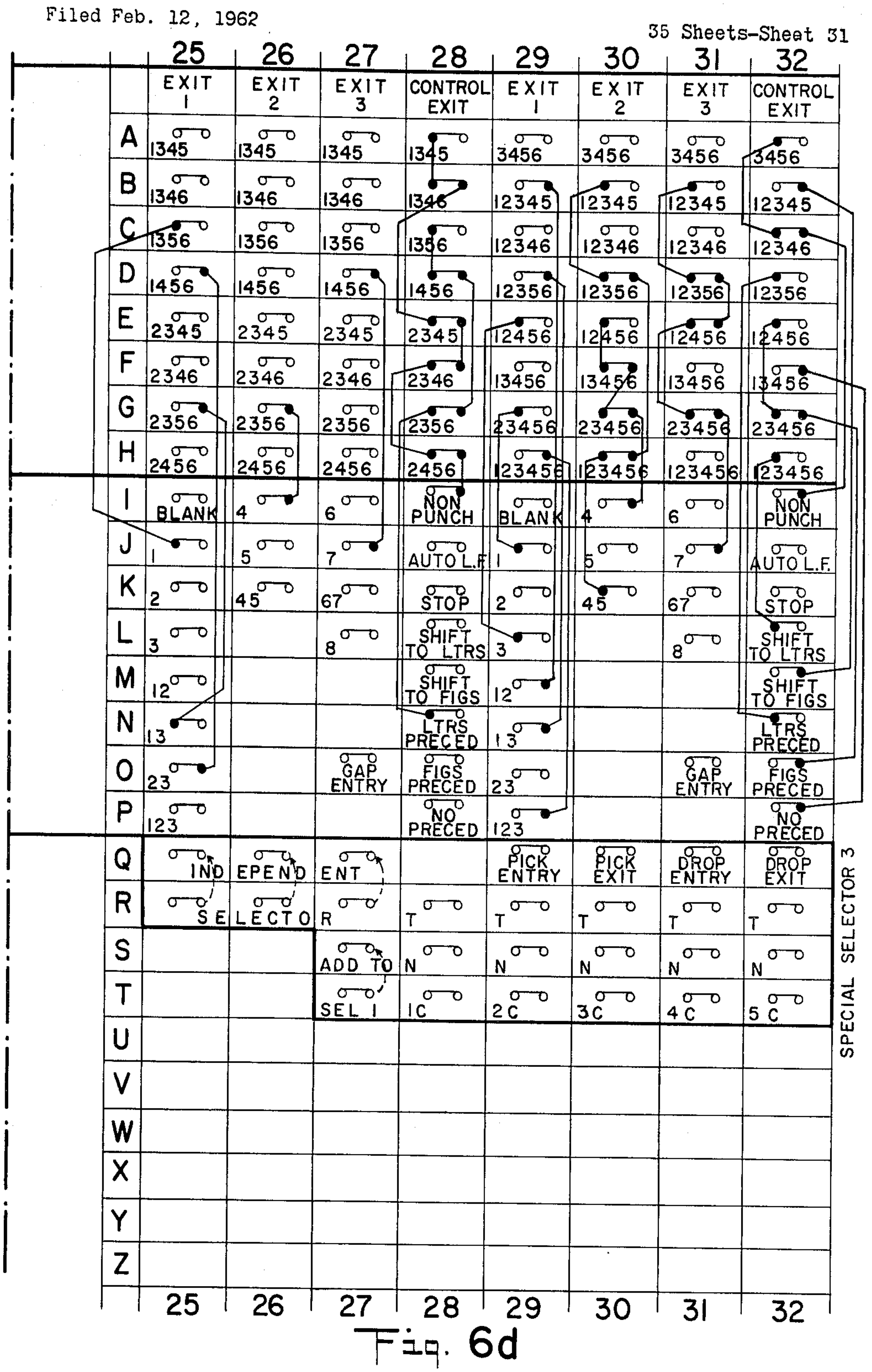

The detailed arrangement and electrical interconnections of the conversion relay contact groups 35–38 are shown in FIGS. 3*a*–3*j* arranged as shown in FIG. 3. In particular, the group I contacts 35 are shown in FIGS. 3*a*, 3*c* and 3*e*; the group II contacts are shown in FIGS. 3*b*, 3*d* and 3*f*; the group III contacts 37 are shown in FIGS. 3*e*, 3*g* and 3*i*; and the group IV control contacts 38 are shown in FIGS. 3*f*, 3*h* and 3*j*. The logic employed in the relay contact arrangements and electrical interconnections will become evident from the following examples of code exit hub group energizations effected by two assumed input codes read by the input tape reader.

In the first example, it will be assumed that the input tape reader reads a blank code for code channels 1 through 6 and accordingly that the code conversion relays 15 and 23 are energized by this input blank code. The blank code exit hub A1 (FIG. 3*e*) is energized from the energizable input circuit 39 through the now closed contacts 3 and 4 (FIG. 3*f*) of the relay 23 and the now closed contacts 19 and 20 (FIG. 3*e*) of the relay 15. The blank code exit hub A2 (FIG. 3*b*) is energized from the energizable input circuit 41 through the now closed contacts 3 and 4 (FIG. 3*a*) of the relay 15 and the now closed contacts 5 and 6 (FIG. 3*b*) of the relay 23. The blank code exit hub A3 (FIG. 3*e*) is energized from the energizable input circuit 40 through the now closed contacts 23 and 24 (FIG. 3*f*) of the relay 23 and the now closed contacts 25 and 26 (FIG. 3*e*) of the relay 15. The blank code control exit hub A4 (FIG. 3*j*) is energized from the input energizable circuit 42 through the now closed contacts 23 and 24 (FIG. 3*i*) of the relay 15 and the now closed contacts 39 and 40 (FIG. 3*j*) of the relay 23. Thus energization of the code conversion relays 15 and 23 in response to the reading of a blank input code results in energization of the four blank code exit hubs A1, A2, A3 and A4 by individual ones of the four energizable input circuits 39–42.

Assume as a second example that a 1–4–5 input code energizes the code conversion relays 16 and 26. The 1–4–5 code exit hub F13 is energized from the energizable input circuit 39 through the now closed contacts 3 and 4 (FIG. 3*d*) of the relay 26 and the now closed contacts 11 and 12 (FIG. 3*c*) of the relay 16. The 1–4–5 code exit hub F14 (FIG. 3*b*) is energized from the energizable input circuit 41 through the now closed contacts 3 and 4 (FIG. 3*a*) of the relay 16 and the now closed contacts 7 and 8 (FIG. 3*b*) of the relay 26. The 1–4–5 code exit hub F15 (FIG. 3*g*) is energized from the energizable input circuit 40 through the now closed contacts 23 and 24 (FIG. 3*h*) of the relay 26 and the now closed contacts 33 and 34 (FIG. 3*g*) of the relay 16. The 1–4–5 code control exit hub F16 (FIG. 3*j*) is energized from the energizable input circuit 42 through the now closed contacts 23 and 24 (FIG. 3*i*) of the relay 16 and the now closed contacts 37 and 38 (FIG. 3*j*) of the relay 26. Thus again, as in the case of the first example considered, it will be evident that the 1–4–5 input code in energizing the code conversion relay 16 and 26 causes four code exit hubs to be energized by individual ones of the energizable input circuit 39–42.

The arrangement of the 1–2–3 bit selector contacts applicable to the code conversion relays 15–22 are shown in FIG. 3*i*, and it will be evident that these contacts merely complete an electrical connection between one of the selector entry hubs W1–W8 and a corresponding one of the selector exit hubs X1–X8. The 4–5–6 bits selector contacts applicable to the code conversion relay 23–30 are shown in FIG. 3*j*, and again it will be evident that these contacts merely complete an electrical connection between the selector entry hubs Y1–Y8 and a corresponding one of the selector exit hubs Z1–Z8.

The eighth bit selectors, of which there are eight in number all actuated by the eighth channel code conversion relay 31, are shown in FIGS. 3*b*, 3*d*, 3*f*, 3*h* and 3*j* and it will be seen that each of these selectors merely comprises a set of transfer contacts of which a movable common contact engages a normal contact in the deenergized state of the relay 31 but moves to engagement with a transfer contact upon energization of the relay 31. These contacts all terminate in entry and exit hubs of the control panel as shown in the several drawing figures last enumerated.

The electrical circuit arrangement of the parity check contact system 67 is shown in FIG. 4. This system includes a plurality of transfer switches of which there is one individual to and actuated by the feed hole punch F and by each of the channel 1 through channel 8 code bit punches of the output tape punch unit. These transfer switches have their contacts electrically interconnected as shown to complete an electrically continuous circuit between the positively energized input circuit conductor 70 and the odd parity output terminal T9 whenever a blank code (no code bits) or a code having an even number of code bits is punch recorded in the output tape, and likewise to complete an electrically continuous circuit between the positive input conductor 70 and the even parity output terminal 10 whenever the output code has an odd number of code bits in its format. Thus it will be evident that the odd parity output terminal T9 is energized, to energize the parity error relay and provide a parity error indication as previously described in connection with FIG. 2, whenever an output code of required odd parity is actually punch recorded in error as an even parity code or as a blank code. Similarly, the even parity output terminal T10 is positively energized whenever an even parity output code is actually punch recorded as an odd parity output code.

FIGS. 5*a*, 5*b*, 5*c* and 5*d*, arranged in the same manner as FIGS. 1*a*–1*d*, illustrate the complete wiring of the control panel of FIG. 1 in an illustrative application of the present code converter as used to convert an eight channel input code set forth below in Table A to a six channel output Graphotype code also set forth in Table A. In the eight channel code of Table A, the channels are numbered starting at the guiding edge of the input tape as 1 2 3 4 5 6 7 8. The Graphotype code system, on the other hand, numbers the channels from the guiding edge of the tape as 5 4 3 2 1 6. Accordingly, and to avoid possible confusion in wiring the control panel, it is preferable that the jumper connections between the punch unit terminals TD1–TD5 (FIG. 2*h*) on the one hand and TD11–TD15 on the other hand be replaced by the following terminal wiring: TD11–TD5, TD12–TD4, TD13–TD3, TD14–TD2 and TD15–TD1. With this changed wiring, the difference in the channel numbering between the eight channel code and the Graphotype code may be ignored. Thus energization of the code entry hub J1, for example, will effect energization of the punch magnet PM5 and record a code bit in the fifth channel in the output tape so that the channel numbering of the Graphotype code is preserved by this internal wiring of the output punch unit.

In this illustrative application, the parity error relay PER (FIG. 2*c*) is disabled by omitting any wiring connection between the terminal T19 and either of the terminals T9 ro T10. It may be noted from FIG. 5*a* that the input hub R7 is wired to the 6, 7 channel hub Q7 since the input tape utilizes an eight channel code. Also since the output Graphotype code involves no figures shift or letters shift codes, it will be noted that the all codes hub Q8 is wired to the no precedence control entry hub P8. All codes designated in Table A as "unassigned" are wired to a convenient non-punch control entry hub. For example, the 3–4–7 input code is nonassigned and the control exit hub for the 3–4 code (hub A12) is wired to the non-punch hub below it (I12); in this it should be remembered that the code exits section of the control panel does not take into consideration the seventh channel of the input tape so that there is no 3–4–7 code exit hub on the control panel and it is for this reason that the 3–4 code exit hub A12 is used. This will be of no consequence since the 3–4 code itself is an invalid code in the eight channel code system of Table A. It will further be noted that the blank code exit hubs A1, A2 and A3 are wired to the common hubs V1, V2 and V3 of the eighth bit selectors so that, as earlier explained, the energization of the code exit hubs for the blank code may be used to energize the eighth bit normal exit hubs U1, U2 and U3 to create a 1–4–6 output code when a hyphen code (7 bit alone) is read from the input tape or alternatively to energize the eighth bit selector transfer exit hub T2 to create the Graphotype carriage return code (4 alone) when a carriage return code (8 alone) is read from the input tape.

*Table A*

| 8 Channel Code | | 6 Channel Graphotype Code | | 5 Channel Code | |
|---|---|---|---|---|---|
| Code | Function | Code | Function | Code | Function |
| 1 | 1 | 13456 | 1 | F1235(6) | 1. |
| 2 | 2 | 1256 | 2 | F125(6) | 2. |
| 3 | 4 | 246 | 4 | F24(6) | 4. |
| 4 | 8 | 236 | 8 | F23(6) | 8. |
| 5 | Space | 3 | Space | L3, F3(6) | Space. |
| 6 | Zero | 2356 | Zero | F235(6) | Zero. |
| 7 | | 146 | | F12(6). | |
| 127 | L | 25 | L | L25 | L. |
| 137 | N | 34 | N | L34 | N. |
| 147 | R | 24 | R | L24 | R. |
| 157 | J | 124 | J | L124 | J. |
| 167 | A | 12 | A | L12 | A. |
| 237 | O | 45 | O | L45 | O. |
| 247 | Control | 2 | Line Space | xxxx. | |
| 257 | K | 1234 | K | L1234 | K. |
| 267 | B | 145 | B | L145 | B. |
| 347 | ON1 | xxxx | | xxxx. | |
| 357 | M | 345 | M | L345 | M. |
| 367 | D | 14 | D | L14 | D. |
| 457 | Q | 1235 | Q | L1235 | Q. |
| 467 | H | 35 | H | L35 | H. |

*Table A*—Continued

| 8 Channel Code | | 6 Channel Graphotype Code | | 5 Channel Code | |
|---|---|---|---|---|---|
| Code | Function | Code | Function | Code | Function |
| 567 | & | 46 | & | F245(6) | &. |
| 123 | 7 | 1236 | 7 | F123(6) | 7. |
| 124 | Stop | xxxx | | L Blank or F(6). | Stop. |
| 125 | 3 | 16 | 3 | F1(6) | 3. |
| 126 | T | 5 | T | L5 | T. |
| 134 | Skip Res | xxxx | | xxxx. | |
| 135 | 5 | 56 | 5 | F5(6) | 5. |
| 136 | V | 2345 | V | L2345 | V. |
| 145 | 9 | 456 | 9 | F45(6) | 9. |
| 146 | Z | 15 | Z | L15 | Z. |
| 156 | / | xxxx | | F1345(6) | /. |
| 234 | Control | xxxx | | F13(6) | BELL. |
| 235 | 6 | 1356 | 6 | F135(6) | 6. |
| 236 | W | 125 | W | L125 | W. |
| 245 | Control | xxxx | | xxxx. | |
| 246 | Control | xxxx | | xxxx. | |
| 256 | S | 13 | S | L13 | S. |
| 345 | N.P | xxxx | | xxxx. | |
| 346 | P.R | xxxx | | xxxx. | |
| 356 | U | 123 | U | L123 | U. |
| 456 | Y | 135 | Y | L135 | Y. |
| 12347 | Form Feed | xxxx | | F25(6) | Form Feed. |
| 12357 | P | 235 | P | L235 | P. |
| 12367 | G | 245 | G | L245 | G. |
| 12457 | | xxxx | | xxxx. | |
| 12467 | . | 3456 | . | F345(6) | . |
| 12567 | C | 234 | C | L234 | C. |
| 13457 | AID | xxxx | | xxxx. | |
| 13467 | Control | xxxx | | xxxx. | |
| 13567 | E | 1 | E | L1 | E. |
| 14567 | I | xxxx | | L23 | I. |
| 23457 | Control | xxxx | | xxxx. | |
| 23467 | ON2 | xxxx | | xxxx. | |
| 23567 | F | 134 | F | L134 | F. |
| 24567 | | xxxx | | xxxx. | |
| 34567 | | xxxx | | xxxx. | |
| 12345 | Data Select | 26 | Plate Discharge. | L1245 (Note 1). | Figures Code. |
| 12346 | Punch Off | xxxx | | xxxx. | |
| 12356 | X | 1345 | X | L1345 | X. |
| 12456 | , | 346 | , | F124(6) | ,. |
| 13456 | Control | xxxx | | L4 or F4(6) | (Note 1) Car. Ret. |
| 23456 | Tab | 6 | Tab | F14(6) | Tab. |
| 1234567 | Tape Feed | 123456 | Code Delete | F12345(6) (Note 1). | Letters Code. |
| 8 | Car. Ret | 4 | Car. Ret | L2 or F2(6) | Line Feed. |
| xxxx | | xxxx | | F15(6) | Tab. |
| xxxx | | xxxx | | F34(6) | 7/8. |
| xxxx | | xxxx | | F35(6) | #. |
| xxxx | | xxxx | | F134(6) | 1/4. |
| xxxx | | xxxx | | F145(6) | 5/8. |
| xxxx | | xxxx | | F234(6) | 1/8. |
| xxxx | | xxxx | | F1234(6) | 1/2. |
| xxxx | | xxxx | | F2345(6) | 3/8. |

Note 1.—Unassigned when converting from 5 channel to 8 channel.

xxxx=unassigned.

FIGS. 6*a*, 6*b*, 6*c* and 6*d*, arranged in the same manner as in FIGS. 1*a*–1*d* illustratate the control panel wiring in a second illustrative application of the present code converter as used in concerting from the 8 channel input code of Table A to the 5 channel telecommunications code set forth in Table A. In this code conversion application, the output code channels are numbered from the guiding edge of the tape as 5 4 3 2 1 so that the wiring of the code entry hubs to the punch magnets PM1–PM5 of the output punch unit is that last described in connection with the conversion to the Graphotype code.

It will be noted in connection with this application of the code converter that the 5 channel codes as tabulated in Table A are preceded by an "F" or an "L." The legend "F" signifies that the 5 channel output code when punched should be preceded by a figures shift code 1–2–4–5 unless the last precedence code punched into the tape was a figures code. The legend "L" signifies that the output code when punched should be preceded by a letters shift code 1–2–3–4–5 unless the last precedence code recorded was a letters code. As earlier explained, the recording of figures shift and letters shift codes in the output tape is automatically accomplished by the code converter, and accordingly the input tape does not normally require any codes to effect the punching of these shift codes. However, and as also earlier explained, artificial shift codes are quite often required in the 5 channel tape for buffering purposes and the control panel wiring of FIG. 6 uses the 8 channel data select code 1–2–3–4–5 to create an artificial figures code in the output tape and the 8 channel tape feed code 1–2–3–4–5–6–7 to effect punching of an artificial letters code.

It may also be noted that the control panel of FIG. 6 has been so wired that the 8 channel carriage return code (8) effects punching of the 5 channel line feed code (2) and that the 8 channel control code 1–3–4–5–6 effects punching of the 5 channel carriage return code (4). Thus an 8 channel sequence of codes comprising the control code last mentoned followed by three carriage return codes will cause punching of the 5 channel sequence "CR, LF, LF and LF."

The control panel wiring of FIG. 6 uses the seventh channel of the output tape punch to provide an odd count parity check of each output code punched, the punch error relay PER (FIG. 2*c*) in this case being wired by a jumper connection between the terminals T9 and T19 to be energized by odd parity error. While the seventh channel punch pin of the punch unit will be actuated in this operation, it will not perforate the output tape which has a physical width only wide enough to receive the 5 channel code. In this connection, it may be noted that the figures code parity exit hub R4 is wired to the channel 7 code entry hub J3 in order that odd count parity may be maintained for the automatically punched figures shift code so that for parity purposes this automatically punched code is changed from a 1–2–4–5 code to a 1–2–4–5–7 code.

It was earlier explained that the present code converter does not recognize the seventh channel code bit of the input tape. Accordingly it will be noted that, with respect to the numerous eight channel input codes which include a 7 channel code bit, the control panel wiring of FIG. 6 recognizes and utilizes only the remaining channel 1–6 code bits of each such code. For example the 8 channel input control code 2–4–7 is wired as unassigned by connecting the control exit hub F8 of the 2–4 code to the non-punch control entry hub I8 below it so that in this instance the 2–4 code exits F5, F6, F7 and F8 are used to recognize the 2–4–7 input code (the 2–4 input code itself will not be encountered in the input tape as it is an invalid code).

Note in connection with the control panel wiring of FIG. 6 that the control code exit of each input code must be wired to one of the following hubs: shift to letters, shift to figures, letters precedence, figures precedence, or no precedence. Only the two codes which are assigned to cause artificial letters shift codes and figures shift codes have their control code exit hubs wired to the respective shift to letters control entry hub or shift to figures control entry hub. The figures precedence control hubs will be energized by the control code exit of all codes read from the input tape which are to punch codes in the output tape assigned to figures shift, and the letters precedence control hubs will be similarly energized by the control code exits of all codes read from the input tape which are to punch codes in the output tape assigned to figures shift. The no precedence hubs will be energized by the control code exit of all codes read from the input tape and which are assigned to punch codes common to both the letters and figures shift codes such as, for example, the space code, carriage return code, line feed code, and stop code. Note that the 8th bit selectors are wired in the manner earlier described to differentiate between a hyphen and a carriage return code read from the input tape.

FIGS. 7*a*, 7*b*, 7*c* and 7*d*, arranged in the same manner as FIGS. 1*a*–1*d*, illustrate the wiring of the control panel in a further code conversion application of the present code converter wherein the 5 channel telecommunications code of Table A as read from an input tape is converted to the 8 channel code of Table A for recording in an output tape. For this application, the wiring of the code entry hubs to the punch magnets of the punch unit is that shown in FIG. 2*h*. However, since the channel numbering of the telecommunications code from the guide edge of the tape is different from that of the 8 channel code as previously noted in connection with FIGS. 5 and 6, it is convenient to remove the wiring between the terminal board terminals T1–T8, T11–T18, T21–T28, T31–T38, T41–T44, T51–T54, T61–T64 and T71–T74 as shown in FIGS. 2*b*, 2*d* and 2*f* and rewire these terminals according to the terminal connections set forth in Table B.

*Table B*

JUMPER WIRE

| From: | To | From: | To |
|---|---|---|---|
| T1 | T31 | T13 | T23 |
| T2 | T32 | T14 | T24 |
| T3 | T33 | T15 | T25 |
| T4 | T34 | T16 | T26 |
| T5 | T35 | T17 | T27 |
| T6 | T36 | T18 | T28 |
| T7 | T37 | T41 | T71 |
| T8 | T38 | T51 | T61 |
| T11 | T21 | T44 | T74 |
| T12 | T22 | T54 | T64 |

This change of wiring will cause the code designations shown in association with the code exits hub sections of the control panel to correspond exactly to the Graphotype and telecommunications code channel numbering system, and this change accordingly avoids possible confusion in wiring the control panel to effect the code conversions desired. Thus the reading of code bits in channels 1, 2, 3, 4 and 5 of the telecommunications code (or Graphotype code) will control energization of the code converter relays 15–30 in precisely the same manner as the reading of code bits in respective channels 5, 4, 3, 2 and 1 of an 8 channel code.

It will be noted that those telecommunications codes of Table A which are shown as being assigned to figures shift all have the 6th bit included and enclosed in parentheses. It was earlier explained that when a 5 channel input tape was read by the input tape reader the hub R7 of the control panel is wired to the 5 channel control entry hub Q6 so that the figures relay of the converter in its energized and deenergized states effectively adds a six channel code bit to all figures input codes but not to input letters codes so that 32 sets of code exit hubs are energized by the input letters codes and 32 additional code exit hubs are energized by the input figures codes. For the input carriage return code (4), the input line feed code (2), the input space code (3), and the input stop code (blank), which are common to both the figures shift and letters shift, both sets of code exit hubs which are energized during a letters shift and during a figures shift are wired to identical code entry hubs so that the same converted output code will be created in both instances.

Figure 7A:
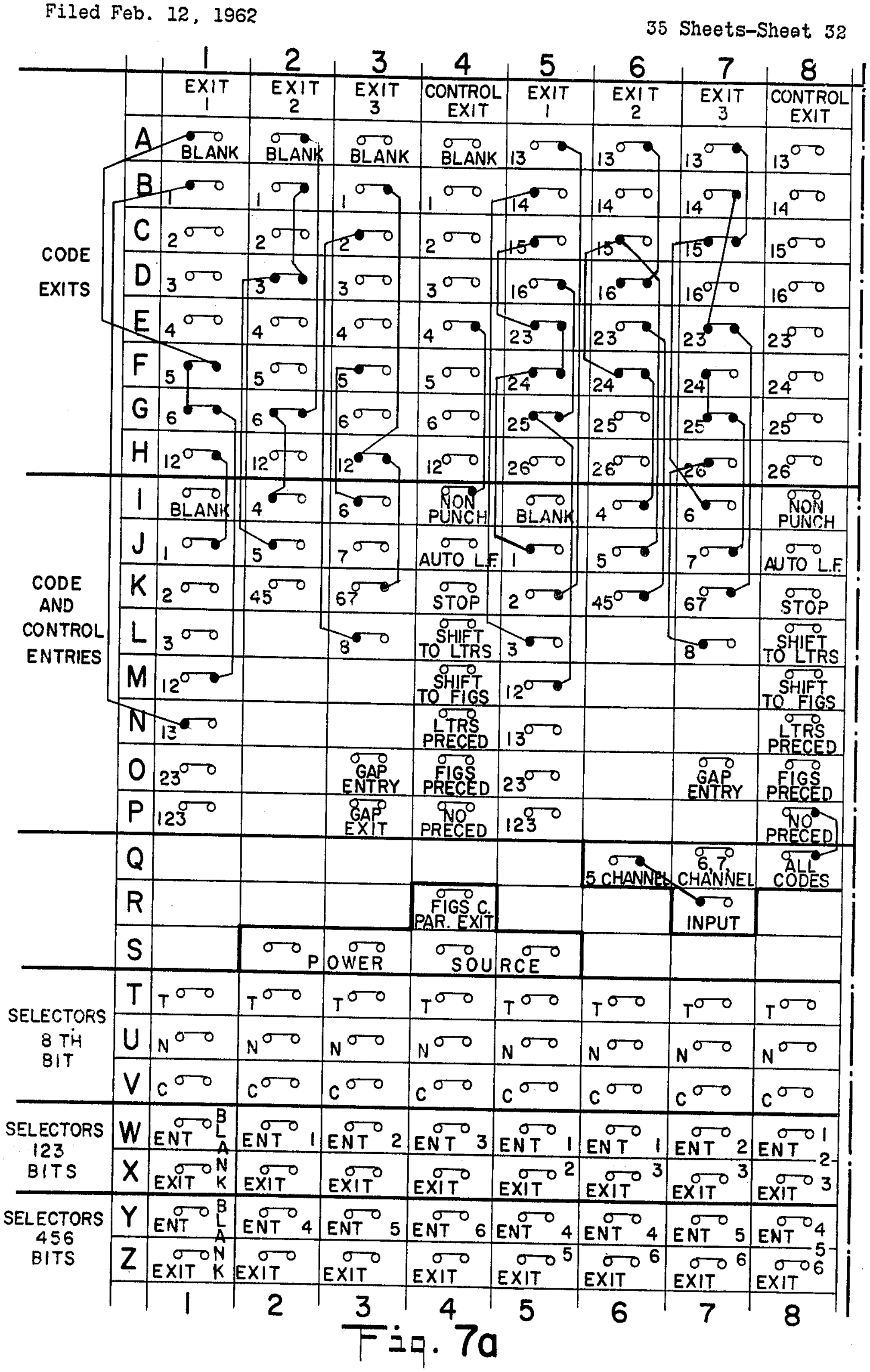
Figure 7B:
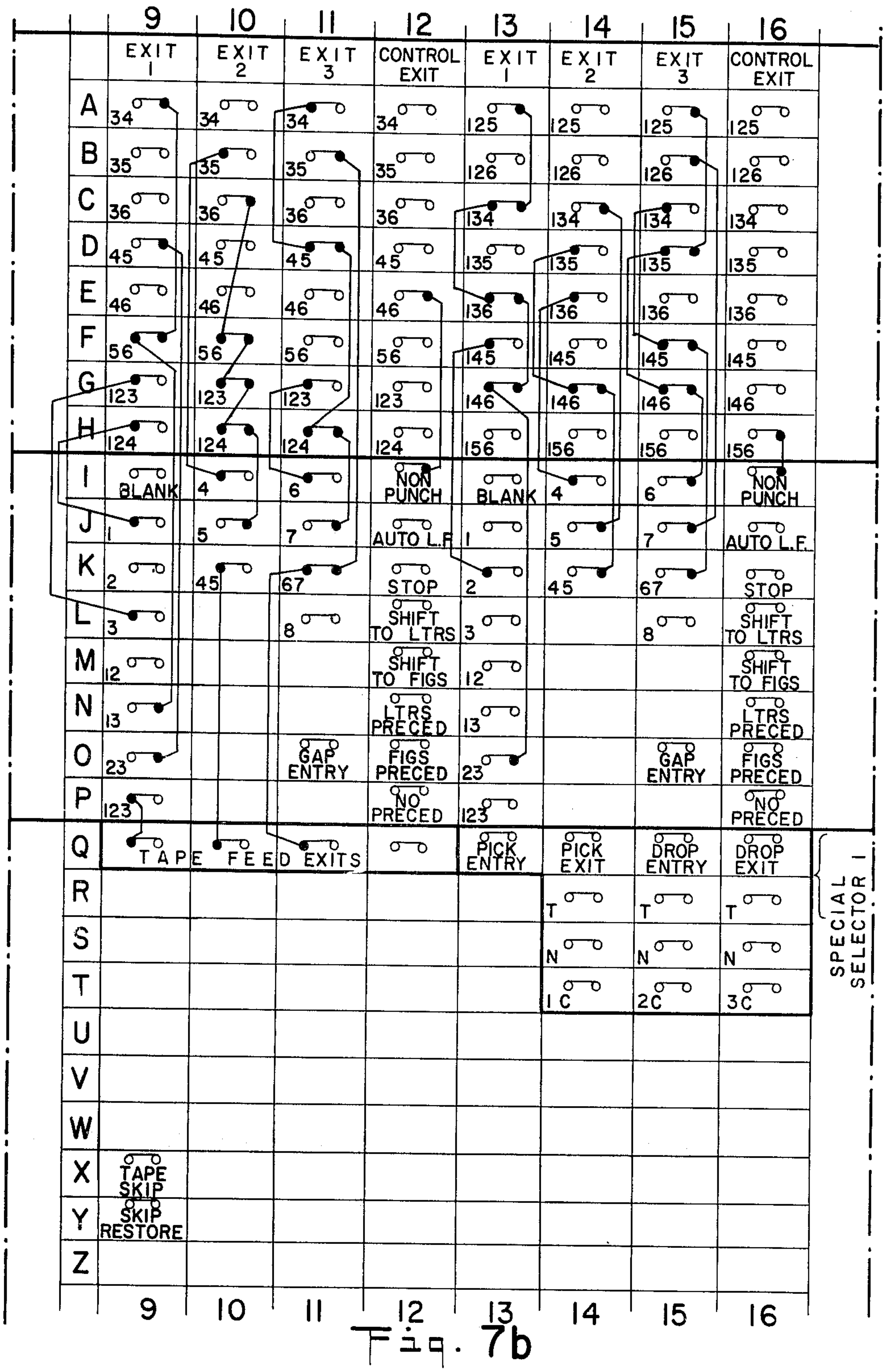
Figure 7C:
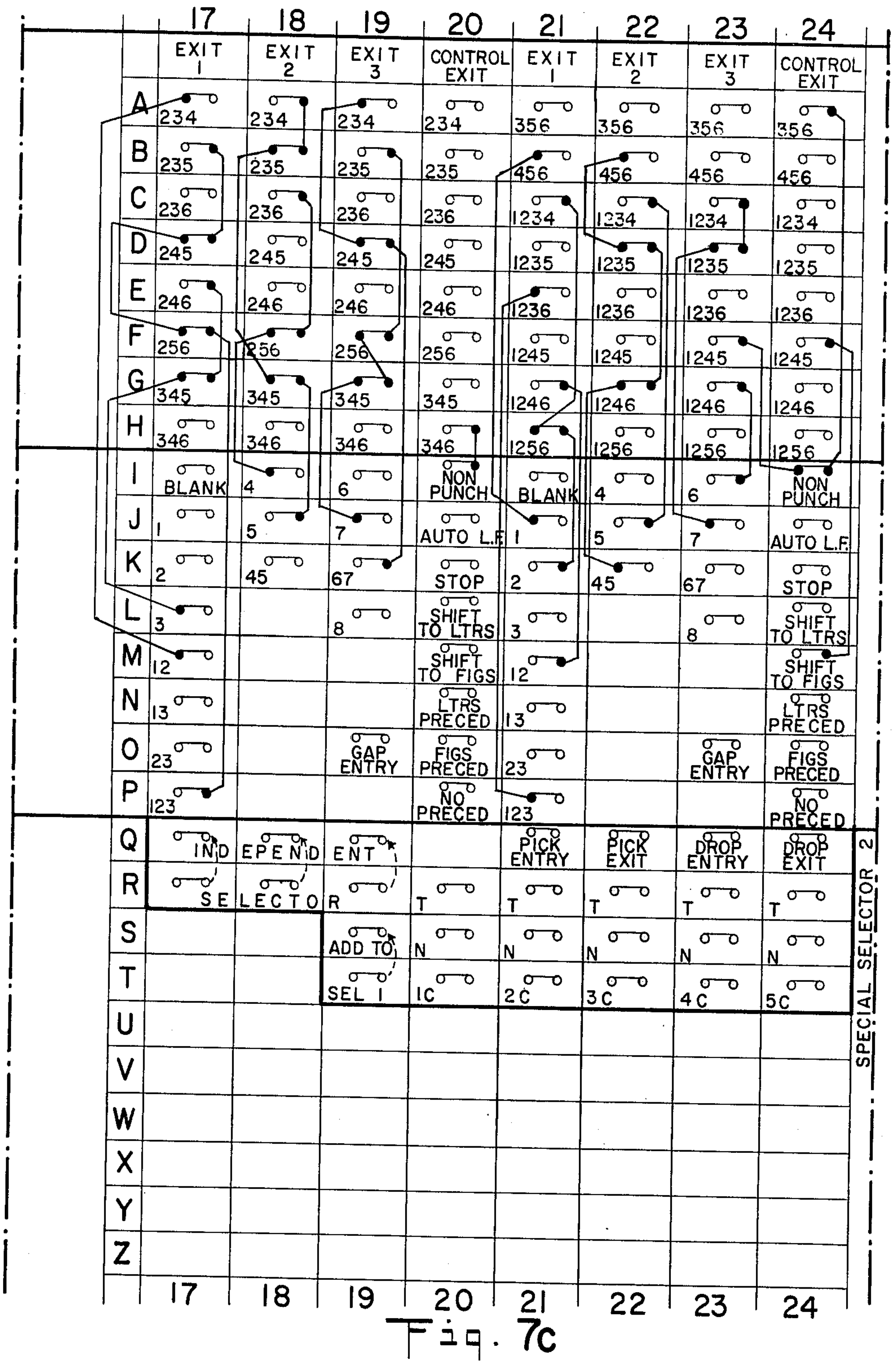
Figure 7D:
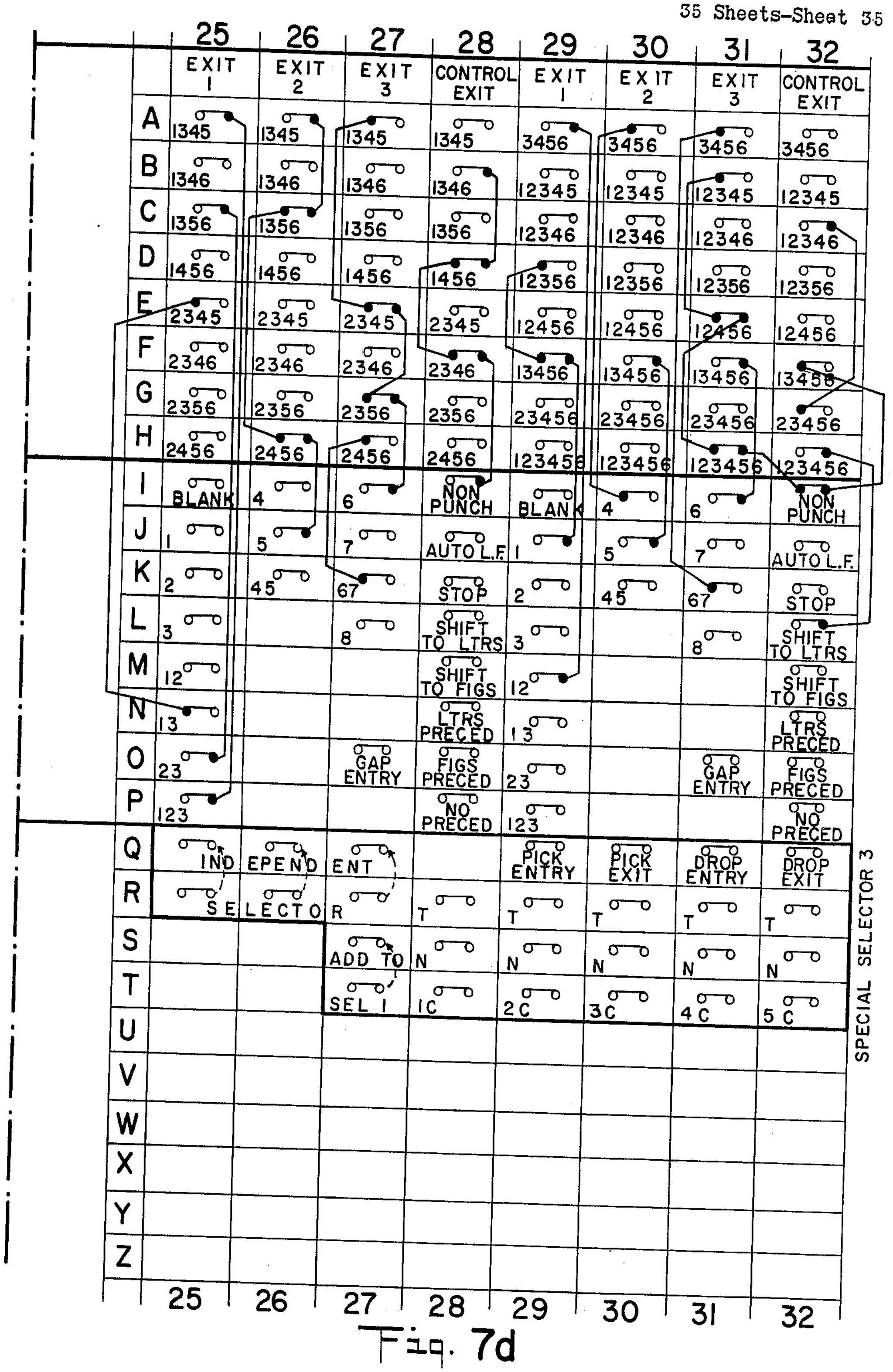

It may be noted in FIG. 7*a* that the all codes exit hub Q8 is wired to the no precedence control entry hub P8 since there are to be no precedence codes punched into the output tape (precedence hubs refer to the punching of precedence codes in the output tape and have no effect on the reading of precedence code in the input tape). Note in this respect that Table A lists the figures code as L 1–2–4–5 which refers to the code exit hubs that are energized when reading a figures input code while in letters shift, but this code while not indicated in Table A will be read as F 1–2–4–5 (6) when read in the figures shift. Likewise while Table A lists the letters code as F 1–2–3–4–5 (6) as indicative of the code entry hubs which will be energized when a letters code is read in figures shift, the letters code when read in letters shift is simply 1–2–3–4–5. Accordingly it will be noted from FIG. 7 that all four of the code exits energized by the letters shift and figures shift codes are wired to non-punch hubs since neither of the shift codes is to cause punching of a corresponding code in the output tape. The code converter then passes over these codes without halting. However, the shift codes while they do not create corresponding output codes are nevertheless used to energize and deenergize the figures and letters memory relays. Thus it will be noted that the control code exit H32 for the code 1–2–3–4–5–6 is wired to the shift to letters control entry hub L32, and that the control exit hub F24 of the 1–2–4–5 code is wired to the shift to figures control entry hub M24 whereas the code exits 1–2–3–4–5 and 1–2–4–5–6 are not so wired. The reason that the latter code exits are not wired is that these are the exits for the letters code sensed with the code converter already in the letters condition and for the figures input code sensed with the converter already in the figures condition, and under these conditions there is no reason to energize any shift entries since the converter is already in the proper shift.

The 8 channel code of Table A is an odd parity code, and accordingly parity checking of each recorded output code in this application of the code converter may be effected by wiring a jumper from the odd parity terminal T9 (FIG. 2*c*) of the parity check contact system to the terminal T19 by which to energize the parity error relay PER upon any failure of an output code to be recorded with an odd number of code bits in its format.

It will be apparent from the foregoing description of the invention that a code converter embodying the invention is characterized by unusual flexibility and diversity of the nature and extent of code conversions which may be accomplished by it, and is one possessing high accuracy, reliability and efficiency of code conversion operations. The present code converter has the further advantage that in effecting code conversions it may, under control of appropriate codes recorded in the input tape, pass over or skip selectable portions of the information read from the input tape without effecting any code conversion of this information or the recording thereof in an output tape. A code converter embodying the invention has the further advantage that its operation will automatically halt to await manual supervisory action should a spurious or erroneous or non-assigned code be read from the input tape or should a condition be detected which would lead to an error in creating the output tape.

While a specific form of invention has been described for purposes of illustration, it is contemplated that numerous changes may be made without departing from the spirit of the invention.

What is claimed is:

1. A code converter comprising, means adapted to receive successive multi-bit code groups of permutational code form which by number and positional order of code bits within each such group represent an individual item of coded information, means responsive to the number and code-bit order positioning of the code bits appearing in each of two preselected code-bit sub-groups within each received code-bit group for providing a binary-to-decimal evaluation of each said sub-group, and means for utilizing said evaluations to convert the initial codes with which said received items of information are represented to new permutational codes differing from said initial codes.

2. A code converter comprising, means adapted to receive successive multi-bit code groups of permutational code form which by number and positional order of code bits within each such group represent an individual item of coded information, means responsive to the number and code-bit order positioning of the code bits appearing in each of two preselected code-bit sub-groups within each received code-bit group for providing control indicia indicative of the binary-to-decimal evaluation of each said sub-group, and means for utilizing said control indicia to convert the initial codes with which said received items of information are represented to new permutational codes differing from said initial codes.

3. A code converter comprising, means adapted to receive successive multi-bit code groups of permutational code form which by number and positional order of code bits within each such group represent an individual item of coded information, means responsive to the number and code-bit order positioning of the code bits appearing in each of two preselected code-bit sub-groups within each received code-bit group for establishing control effects indicative of the binary-to-decimal evaluation of each said sub-group, and means for utilizing said control effects to convert the initial codes with which said received items of information are represented to new permutational codes differing from said initial codes.

4. A code converter comprising, means adapted to receive successive multi-bit code groups of permutational code form which by number and positional order of code bits within each such group represent an individual item of coded information, means responsive to the number and code-bit order positioning of the code bits appearing in each of two preselected code-bit sub-groups within each received code-bit group for selectively energizing individual ones of plural energizable control circuits according to the binary-to-decimal evaluation of each said sub-group, and means controlled by the energizations of said control circuits for converting the initial codes with which said received items of information are represented to new permutational codes differing from said initial codes.

5. A code converter comprising, means adapted to receive successive multi-bit code groups of permutational code form which by number and positional order of code bits within each such group represent an individual item of coded information, means responsive to the number and code-bit order positioning of the code bits appearing in each of two preselected code-bit sub-groups within each received code-bit group for selectively energizing for each said sub-group individual ones of plural control means according to the binary-to-decimal evaluation of said each sub-group, and means controlled jointly by said control means for converting the initial codes with which said received items of information are represented to new permutational codes differing from said initial codes.

6. A code converter comprising, means adapted to receive successive multi-bit code groups of permutational code form which by number and positional order of code bits within each such group represent an individual item of coded information, means responsive to the number and code-bit order positioning of the code bits appearing in each of two preselected code-bit sub-groups within each received code-bit group for selectively energizing for each said sub-group individual ones of plural electrical relays according to the binary-to-decimal evaluation of each said sub-group, and means controlled by said relays for converting the initial codes with which said received items of information are represented to new permutational codes differing from said initial codes.

7. A code converter comprising, means adapted to receive successive multi-bit code groups of permutational code form which by number and positional order of code bits within each such group represent an individual item of coded information, means responsive to the number and code-bit order positioning of the code bits appearing in each of two preselected code-bit sub-groups within each received code-bit group for providing a binary-to-decimal evaluation of each said sub-group, and means responsive to said evaluations for recording said received items of information by use of a new permutational code form differing from the initial code form.

8. A code converter comprising, means for reading a first record medium to derive therefrom successive multi-bit code groups of permutational code form which by number and positional order of code bits within each such group represent an individual item of coded information, means responsive to the number and code-bit order positioning of the code bits appearing in each of two preselected code-bit sub-groups within each derived code-bit group for providing a binary-to-decimal evaluation of each said sub-group, and means responsive to said evaluations for recording in a second record medium said items of information by use of a new multi-bit permutational code form differing from the initial code form.

9. A code converter comprising, means for reading a first record medium to derive therefrom successive multi-bit code groups of permutational code form which by number and positional order of code bits within each such group represent an individual item of coded information, means controlled by said reading means according to the number and code-bit order positioning of the code bits appearing in each of two preselected code-bit sub-groups within each derived code-bit group for selectively energizing individual ones of plural electrical control circuits according to the binary-to-decimal evaluation of each said sub-group, and means controlled by energized ones of said control circuits for recording in a second record medium said items of information by use of a new multi-bit permutational code form differing from the initial code form.

10. A code converter comprising, means for reading a record medium to derive therefrom successive multi-bit code groups of permutational code form which by number and positional order of code bits within each such group represent an individual item of coded information, plural control means selectively controlled by said reading means according to the number and code-bit order positioning of the code bits appearing in each of two preselected code-bit sub-groups within each derived code-bit group to provide by control means selection a binary-to-decimal evaluation of each said sub-group, and means controlled by said control means for recording in a second medium said items of information by use of a new multi-bit permutational code form differing from the initial code form.

11. A code converter comprising, means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each derived code-bit group to provide by relay selection a binary-to-decimal evaluation of each said sub-group, and means controlled by said relays for recording in a second record medium said items of information by use of a new multi-bit permutational code form differing from the initial code form.

12. A code converter comprising, means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each derived code-bit group to provide by relay selection a binary-to-decimal evaluation of each said sub-group, plural electrical circuits selectively energized by said relays according to a binary-to-decimal evaluation of each said derived code group, and means controlled by said electrical circuits for converting the initial codes with which said items of information are represented to new multi-bit permutational codes differing from said initial codes.

13. A code converter comprising, means for reading a record medium to derive therefrom successive multi-bit code groups of permutational code form which by number and positional order of code bits within each such group represent an individual item of coded information, a plurality of multi-contact electrical relays selectively energized in pairs by said reading means according to the number and code-bit order positioning of the code bits appearing in each of two preselected code-bit sub-groups within each derived code-bit group to provide by pairs of relay selective energizations a binary-to-decimal evaluation of each said sub-group, plural electrical control circuits energized selectively by contacts of pairs of energized relays according to a binary-to-decimal evaluation of each said derived code group, and means controlled by said electrical circuits for converting the initial codes with which said items of information are represented to new multi-bit permutational codes differing from said initial codes.

14. A code converter comprising, means for reading a record medium to derive therefrom successive multi-bit code groups of permutational code form which by number and positional order of code bits within each such group represent an individual item of coded information, a plurality of electrical relays selectively energized by said reading means according to the number and code-bit order positioning of the code bits appearing in each of two preselected code-bit sub-groups within each derived code-bit group to provide by relay selection a binary-to-decimal evaluation of each said sub-group, plural electrical circuits selectively energized by said relays according to a binary-to-decimal evaluation of each said derived code group, and means controlled by the energizations of said electrical circuits for recording in a second record medium said items of information by use of a new multi-bit permutational code form differing from the initial code form.

15. A code converter comprising, means for reading a record medium having information recorded as successive multi-bit code groups of permutational code form which by number and positional order of code bits within each such group represent an individual item of coded information, said reading means including a plurality of electrical transfer contact assemblies corresponding in number to a preselected number of code channels in said code form and individually actuated between transfer and non-transfer positions by the respective presence and absence of a code bit in an individual code channel of each said successive code-bit group, a plurality of electrical relays selectively energized by said contact assemblies according to the number and code-bit order positioning of the code bits appearing in each of two preselected code-bit sub-groups within each code-bit group to provide by relay selective energization a binary-to-decimal evaluation of each said sub-group, and means controlled by said relays for recording in a second record medium said items of information by use of a new multi-bit permutational code form differing from the initial code form.

16. A code converter comprising, reading means for reading a first record medium having successive items of coded information recorded as successive multi-bit code groups utilizing a permutational code form having preselected positional orders and numbers of code bits within each group thereof, means responsive to the code bits read by said reading means in each of two preselected code-bit sub-groups within each code-bit group for deriving a control actuation individual to each said sub-group and individually indicating both the number and code-bit positioning of the code bits appearing in said each sub-group, and translating means controlled by said derived control actuations for converting said successive code-bit groups read by said reading means to corresponding code-bit groups of a different permutational code form used in further translation of said successive items of information.

17. A code converter comprising, reading means for reading a first record medium having successive items of information recorded as successive multi-bit code groups utilizing a combinational code form having preselected positional order of code bits within each group thereof, means responsive to the code bits read by said reading means in each of two preselected code-bit sub-groups within each code-bit group for deriving a control actuation individual to each said sub-group and individually indicating both the number and code-bit positioning of the code bits appearing in said each sub-group, translating means controlled by said derived control actuations for converting each of said successive code-bit groups read by said reading means to corresponding code-bit groups of a different combinational code form used in further translation of said successive items of information, and means responsive to particular derived control actuations for which there is no code assignment in said last-named code form for causing said reading means to read the succeeding code-bit group without response to said particular control actuations by said translating means.

18. A code converter comprising, reading means for reading a first record medium having successive items of information recorded as successive multi-bit code groups utilizing a combinational code form having preselected positional order of code bits within each group thereof, means responsive to the code bits read by said reading means in each of two preselected code-bit sub-groups within each code-bit group for deriving a control actuation individual to each said sub-group and individually indicating both the number and code-bit positioning of the code bits appearing in said each sub-group, and translating means controlled by said derived control actuations for converting each of said successive code-bit groups read by said reading means to corresponding code-bit groups of a different combinational code form used in further translation of said successive items of information including conversion of preselected code-bit groups read by said reading means to blank codes in said different code form.

19. A code converter comprising, reading means for reading a first record medium having successive items of information recorded as successive multi-bit code groups utilizing a combination code form having preselected positional order of code bits within each group thereof, means responsive to the code bits read by said reading means in each of two preselected code-bit subgroups within each code-bit group for deriving a control actuation individual to each said sub-group and individually indicating both the number and code-bit positioning of the code bits appearing in said each sub-group, translating means controlled by said derived control actuations for converting each of said successive code-bit groups read by said reading means to corresponding code-bit groups of a different combinational code form used in further translation of said successive items of information, and means responsive to preselected code-bit groups read by said reading means for halting the operations of said reading means and said translating means.

20. A code converter comprising, cyclically operable means for reading a record medium to derive therefrom successive multi-bit code groups of permutational code form which by number and positional order of code bits within each such group represent an individual item of coded information, a plurality of electrical relays selectively energized by said reading means at approximately the mid cycle of operation thereof and according to the number and code-bit order positioning of the code bits appearing in each of two preselected code-bit sub-groups within each derived code-bit group to provide by relay selection a binary-to-decimal evaluation of each said sub-group, cyclic operable means having each cycle initiated by energization of said relays and having a recording operation controlled thereby to record in a second record medium said items of information by use of a new multi-bit permutational code form differing from the initial code form, and means responsive to initiation of each cycle of operation of said recording means for initiating a further cycle of operation of said reading means.

21. A code converter comprising, means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each received code-bit group to provide by relay selection a binary-to-decimal evaluation of each said sub-group, means controlled by said relays for recording in a second record medium said items of information by use of a new multi-bit permutational code form differing from the initial code form and utilizing letters shift codes and figures shift codes, and means for additionally controlling said recording means to provide automatic recording of a letters shift code preceding the recording of each letters code or succession of letters codes and to provide automatic recording of a figures shift code preceding the recording of each figures code or succession of figures codes.

22. A code converter comprising, cyclically operable means for reading a record medium to derive therefrom successive multi-bit code groups of permutational code form which by number and positional order of code bits within each such group represent an individual item of coded information, a plurality of electrical relays selectively controlled by said reading means during each operating cycle thereof and according to the number and code-bit order positioning of the code bits appearing in each of two preselected code-bit sub-groups within each received code-bit group to provide by relay selection a binary-to-decimal evaluation of each said sub-group, cyclically operating means having each cycle of operation thereof initiated under control of said relays and having a recording operation controlled by said relays for recording in a second record medium said items of information by use of a new multi-bit permutational code form differing from the initial code form and utilizing letters shift codes and figures shift codes, means operative during each cycle of operation of said recording means for initiating a cycle of operation of said reading means, and means for additionally controlling said reading means and said recording means to halt said reading means for one operating cycle and during said halt to provide automatic recording of a letters shift code preceding the recording of each letters code or succession of letters codes and to provide automatic recording of a figures shift code preceding the recording of each figures code or succession of figures codes.

23. A code converter comprising, means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each received code-bit groups to provide by relay selection a binary-to-decimal evaluation of each said sub-group, means controlled by said relays for recording in a second record medium said items of information by use of a new multi-bit permutational code form differing from the initial code form and utilizing letters shift codes and figures shift codes, means for additionally controlling said recording means to provide automatic recording of a letters shift code preceding the recording of each letters code or succession of letters codes and to provide automatic recording of a figures shift code preceding the recording of each figures code or succession of figures codes, all of said codes recorded in said second medium having in conjunction with a non-recorded parity code bit a preselected type of odd-even parity, and means responsive to the number of code bits in each code recorded and to said parity code bits for providing an error indication upon any departure from said preselected type of parity.

24. A code converter comprising, means for reading a record medium to derive therefrom successive multi-bit code groups of permutational code form which by number and positional order of code bits within each such group represent an individual item of coded information including letters shift codes and figures shift codes, a plurality of electrical relays selectively controlled by said reading means according to the number and code-bit order positioning of the code bits appearing in each of two preselected code-bit sub-groups within each received code-bit group to provide by relay selection a binary-to-decimal evaluation of each said sub-group, means controlled by said relays for recording in a second record medium said items of information by use of a new multi-bit permutational code form differing from the initial code form, and means controlled by preselected ones of said relays for continuing the operation of said reading means past each said letters shift code and each said figures shift code without the recording of corresponding codes by said recording means.

25. A code converter comprising, means for reading a record medium to derive therefrom successive multi-bit code groups of permutational code form which by number and positional order of code bits within each such group represent an individual item of coded information including letters shift codes and figures shift codes, a plurality of electrical relays selectively controlled by said reading means according to the number and code-bit order positioning of the code bits appearing in each of two preselected code-bit sub-groups within each received code-bit group to provide by relay selection a binary-to-decimal evaluation of each said sub-group, means controlled by said relays for recording in a second record medium said items of information by use of a new multi-bit permutational code form differing from the initial code form, and means responsive to the reading of each letters shift code and each figures shift code for modifying the ensuing selective control by said reading means over the ones of said relays which evaluate one of said code-bit sub-groups to provide dual evaluations of said derived code groups.

26. A code converter comprising, means for reading a record medium to derive therefrom successive multi-bit code groups of permutational code form which by number and positional order of code bits within each such group represent an individual item of coded information including letters shift codes and figures shift codes, a plurality of electrical relays selectively controlled by said reading means according to the number and code-bit order positioning of the code bits appearing in each of two preselected code-bit sub-groups within each received code-bit groups to provide by relay selection a binary-to-decimal evaluation of each said sub-group, means controlled by said relays for recording in a second record medium said items of information by use of a new multi-bit permutational code form differing from the initial code form, relay means actuated to one operative state upon reading a letters shift code and actuated to a second operative state upon reading a figures shift code, and means controlled by the operative states of said relay means for modifying in accordance therewith the control by said reading means over a sub-group-evaluation group of said relays to provide dual evaluations of said derived code groups.

27. A code converter comprising, means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each received code-bit group to provide by relay selection a binary-to-decimal evaluation of each said sub-group, means controlled by said relays for recording in a second record medium said items of information by use of a new multi-bit permutational code form differing from the initial code form, and means controlled by said relays in response to a derived skip code and ensuing derived skip restore code for respectively terminating and restoring control by said relays over said recording means while continuing the operation of said reading means and thereby pass over a quantity of coded information read from said first-named record medium.

28. A code converter comprising, means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each received code-bit group to provide by relay selection a binary-to-decimal evaluation of each said sub-group, means controlled by said relays for recording in a second record medium said items of information by use of a new multi-bit permutational code form differing from the initial code form, and means controlled by said relays in response to a derived inter-message gap code for halting the operation of said reading means during a preselected interval and for causing said recording means during said interval automatically to record in said second medium a preselected number of inter-message gap codes.

29. A code converter comprising, cyclic operating means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each received code-bit group to provide by relay selection a binary-to-decimal evaluation of each said sub-group, means controlled by said relays for recording in a second record medium said items of information by use of a new multi-bit permutational code form differing from the initial code form, and means controlled by said relays in response to a derived carriage return code or to the first of a succession of derived carriage return codes for halting the operation of said reading means for one operating cycle and for causing said recording means to record in said second medium a carriage return code and a line feed code.

30. A code converter comprising, means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each received code-bit group to provide by relay selection a binary-to-decimal evaluation of each said sub-group, means controlled by said relays for recording in a second record medium said items of information by use of a new multi-bit permutational code form differing from the initial code form, and means controlled by said relays in response to a derived stop code for automatically halting the operations of said reading and recording means.

31. A code converter comprising, means for reading a record medium to derive therefrom successive multi-bit code groups of permutational code form which by number and positional order of code bits within each such group represent an individual item of coded information, a plurality of electrical relays selectively controlled by said reading means according to the number and code-bit order positioning of the code bits appearing in each of two preselected code-bit sub-groups within each received code-bit group to provide by relay selection a binary-to-decimal evaluation of each said sub-group, and means controlled by said relays for recording in a second record medium preselected ones of said items of information by use of a new multi-bit permutational code form differing from the initial code form and for causing said reading means to read past each remaining item of information which is not assigned a permutation code in said new code form.

32. A code converter comprising a tape reader for reading an input punched tape having data information recorded as successive multi-bit code aperture groups of permutational code form which by number and positional order of code bits within each such group represent an individual item of coded information, said reader including a plurality of electrical transfer contact assemblies corresponding in number to a preselected number of code channels in said code form and individually actuated between transfer and non-transfer positions by the respective presence and absence of a code bit aperture in an individual code channel of each said successive code-bit aperture groups, reader cyclically operated cam-actuated contacts for supplying at approximately the mid cycle of each cycle of reader operation energization to the transfer contact of at least one preselected pair of transfer contacts of said reader contact assemblies, said contact assemblies being arranged in at least two code-bit sub-groups and having within each such sub-group an ascending permutational Christmas-tree configuration of electrical connections from the stationary contacts of a contact assembly to the transfer contacts of two other contact assemblies to provide upon energization by said cam-actuated contacts binary-to-decimal evaluation energization of individual ones of plural electrical output circuits, a plurality of electrical relays arranged in groups corresponding to each said contact assembly sub-groups and individually energized by individual ones of said electrical output circuits, each of said relays including multiple normally-open contacts operated to closed contact positions upon energization of said each relay, each of plural contacts of each relay included in a group individual to each reader-contact-assembly sub-group providing electrical connection of a relay-contact input circuit through individual contacts of individual groups of contacts of the relays in the groups associated with the other reader-contact-assembly sub-groups to individual binary-to-decimal evaluation indicative output circuits, a tape punch having punch code-bit magnets connected individually and by diode rectifier isolated groups to said indicative output circuits in conformity with a new permutational code form differing from the code form with which information is recorded in the punched tape read by said reader, a cyclic control punch clutch magnet energized concurrently with any of said punch magnets to initiate a cycle of punch operation, a cyclic control reader clutch magnet energizable to initiate a cycle of reader operation, and punch cyclically operated cam-actuated contacts for energizing said relay contact input circuits and said reader clutch magnet at approximately the zero cyclic position of said punch.

References Cited by the Examiner

UNITED STATES PATENTS

| | | | |
|---|---|---|---|
| 2,657,272 | 10/1953 | Dimond | 340—347 X |
| 2,706,215 | 4/1955 | Van Duuren | 340—347 |
| 2,907,524 | 10/1959 | Cali | 340—172.5 |
| 2,921,132 | 1/1960 | Fivel | 340—347 X |
| 3,111,648 | 11/1963 | Marsh et al. | 340—172.5 |

ROBERT C. BAILEY, *Primary Examiner.*